(12) United States Patent
Zhen

(10) Patent No.: US 12,152,363 B2
(45) Date of Patent: Nov. 26, 2024

(54) RETAINING-WALL PANEL SYSTEM AND FLEXIBLE REINFORCEMENT MECHANICAL CONNECTION METHOD THEREFOR

(71) Applicant: ZHEN'S CORPORATION, Calgary (CA)

(72) Inventor: Hardwin Zhanhong Zhen, Calgary (CA)

(73) Assignee: ZHEN'S CORPORATION, Calgary (CA)

( * ) Notice: Subject to any disclaimer, the term of this patent is extended or adjusted under 35 U.S.C. 154(b) by 0 days.

(21) Appl. No.: 18/036,050

(22) PCT Filed: Jun. 10, 2021

(86) PCT No.: PCT/CA2021/050793
§ 371 (c)(1),
(2) Date: May 9, 2023

(87) PCT Pub. No.: WO2022/133575
PCT Pub. Date: Jun. 30, 2022

(65) Prior Publication Data
US 2024/0018737 A1      Jan. 18, 2024

Related U.S. Application Data

(60) Provisional application No. 63/155,934, filed on Mar. 3, 2021, provisional application No. 63/129,519, filed on Dec. 22, 2020.

(51) Int. Cl.
*E02D 29/02* (2006.01)

(52) U.S. Cl.
CPC ..... *E02D 29/0233* (2013.01); *E02D 29/0266* (2013.01); *E02D 2300/0085* (2013.01); *E02D 2600/30* (2013.01)

(58) Field of Classification Search
CPC ............ E02D 29/0233; E02D 29/0266; E02D 2300/0085; E02D 2600/30; E02D 29/0241; E02D 29/0225
See application file for complete search history.

(56) References Cited

U.S. PATENT DOCUMENTS 3,925,994 A * 12/1975 Broms ................ E02D 29/0233
404/31
4,117,686 A    3/1978 Hilfiker
(Continued)

FOREIGN PATENT DOCUMENTS

JP       3714885 B2    11/2005

OTHER PUBLICATIONS

ISA/CA International Search Report and Written Opinion for PCT/CA2021/050793, Canada, Sep. 9, 2021.
(Continued)

*Primary Examiner* — Carib A Oquendo
(74) *Attorney, Agent, or Firm* — Locke Lord LLP; Tim Tingkang Xia, Esq.

(57) ABSTRACT

A load-retention panel having an anchor rod on a load-bearing side thereof forming a horizontal slot therebetween. A securing rod having a diameter greater than or equal to a width of the slot and seated against the load-retention panel and the anchor rod on a first side of the slot. A first section of a flexible sheet extends between the anchor rod and the securing rod and wraps about the anchor rod and the securing rod on opposite sides thereof. The distal end of the flexible sheet extends away from the load-retention panel into and within a landfilling material. The flexible sheet may further wrap about a combination of the anchor rod, the securing rod, and the first section of the flexible sheet with
(Continued)

its proximal and distal ends extending through the slot from the first side thereof, and out of the slot from an, opposite second side.

20 Claims, 45 Drawing Sheets

(56) References Cited

U.S. PATENT DOCUMENTS

| | | | |
|---|---|---|---|
| 4,324,508 | A | 4/1982 | Hilfiker |
| 4,929,125 | A | 5/1990 | Hilfiker |
| 4,993,879 | A | 2/1991 | Hilfiker |
| 5,259,704 | A | 11/1993 | Orgorchock |
| 6,086,288 | A | 7/2000 | Ruel et al. |
| 8,764,348 | B2 | 7/2014 | Ruel et al. |
| 10,337,162 | B2 | 7/2019 | Ruel et al. |
| 10,494,783 | B2 * | 12/2019 | Jarvie ............... E02D 17/18 |
| 2006/0239783 | A1 | 10/2006 | Kallen |

OTHER PUBLICATIONS

Office Action issued by the Canadian Intellectual Property Office for Application No. 3, 121,976, May 17, 2022.

* cited by examiner

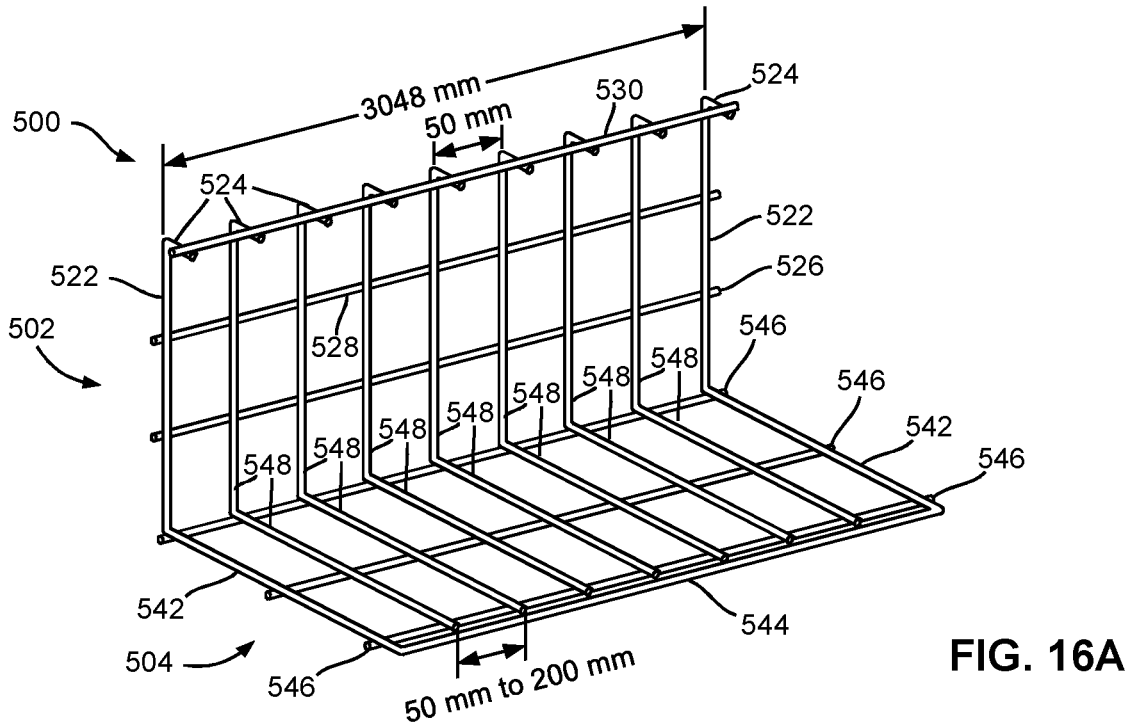
FIG. 16A
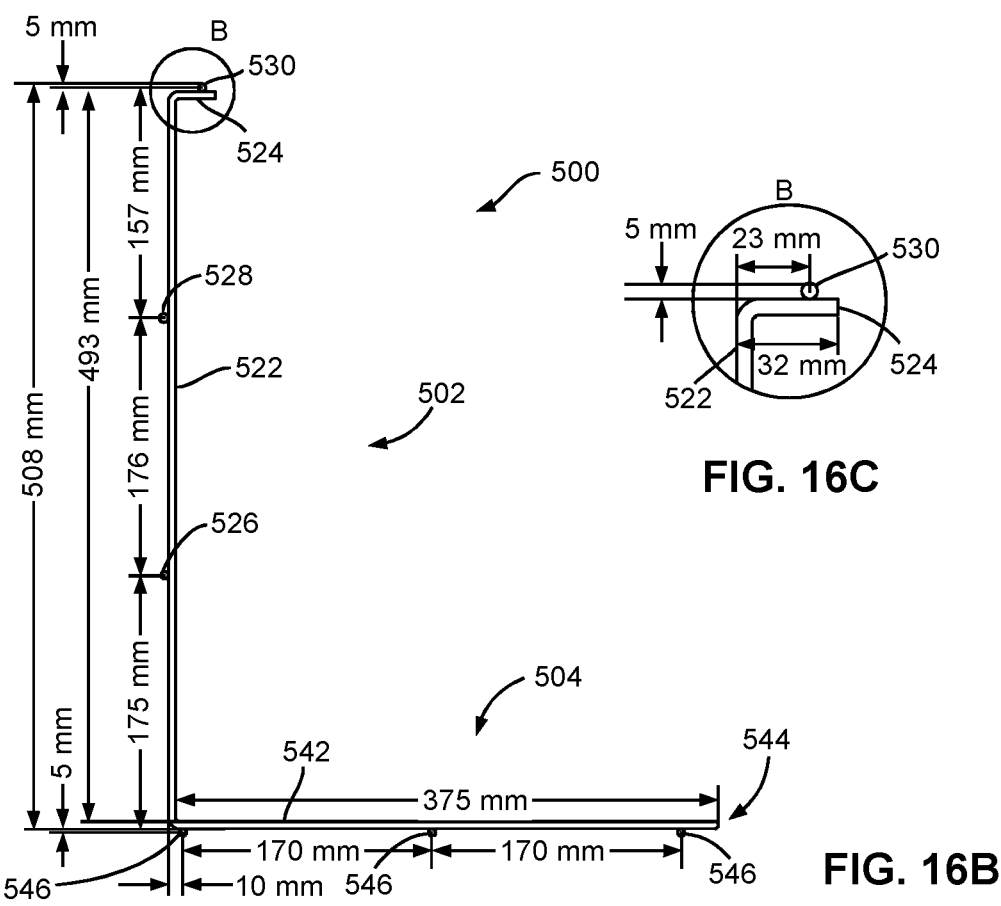
FIG. 16C
FIG. 16B

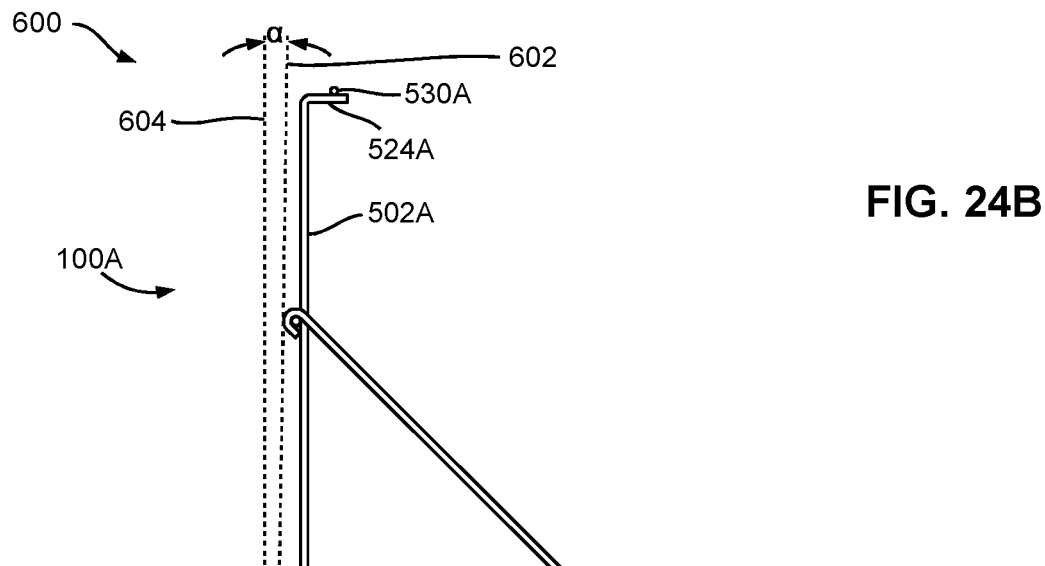
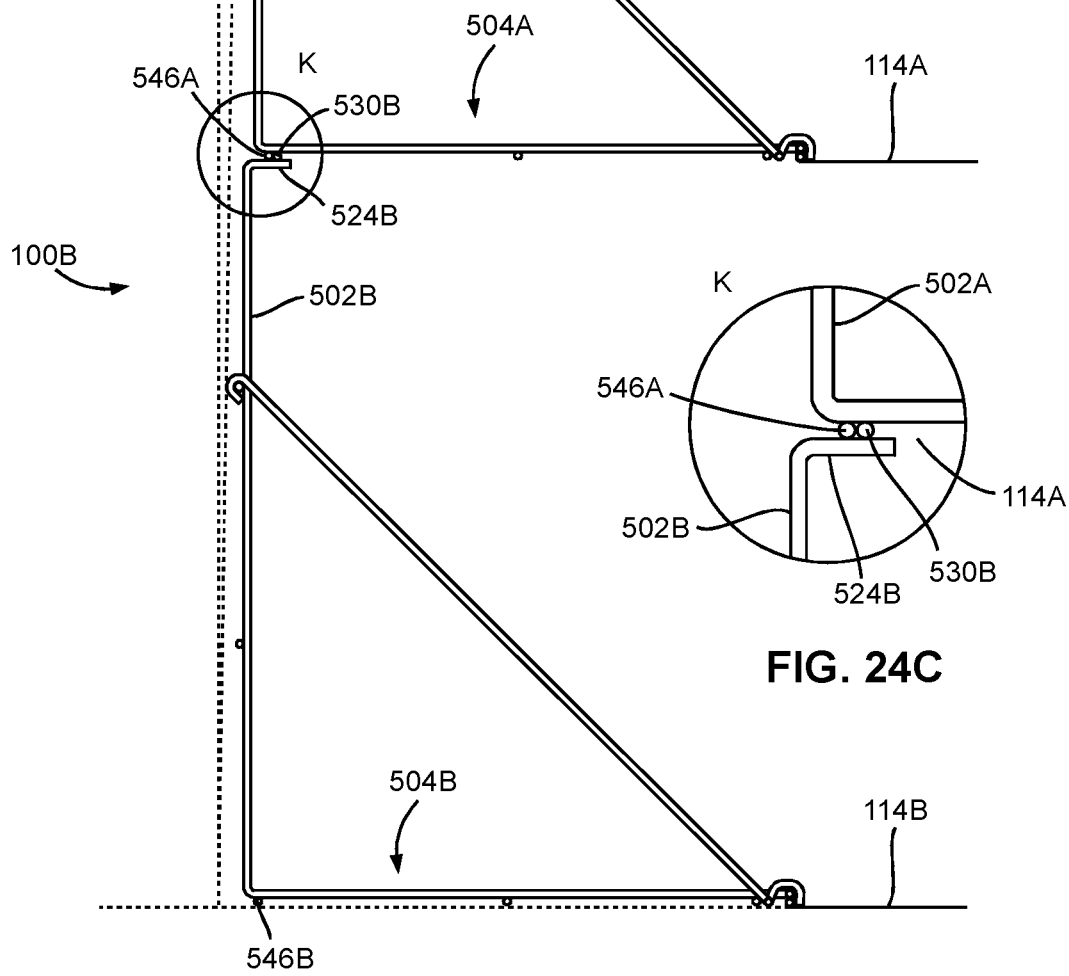
FIG. 24B
FIG. 24C

RETAINING-WALL PANEL SYSTEM AND FLEXIBLE REINFORCEMENT MECHANICAL CONNECTION METHOD THEREFOR

CROSS-REFERENCE TO RELATED APPLICATIONS

This application claims the benefit of U.S. Provisional Patent Application Ser. No. 63/129,519 filed Dec. 22, 2020, and U.S. Provisional Patent Application Ser. No. 63/155,934 filed Mar. 3, 2021, the content of each of which is incorporated herein by reference in its entirety.

FIELD OF THE DISCLOSURE

The present disclosure relates generally to a retaining-wall panel system for stabilizing an earth structure, and in particular to a retaining-wall panel system with flexible reinforcement mechanical connections for stabilizing an earth structure.

BACKGROUND

Retaining-wall panel systems have been widely used for stabilizing earth structures. Such systems generally comprise forming, installing, or otherwise securing a rigid wall structure of suitable materials such as concrete, stones, and/or the like, and then filling in earth or soil on one side of the wall structure. The secured wall structure thus retains and stabilizes the earth. In some applications, reinforcement structures such as re-bars or geosynthetics may be coupled to the wall structure for improving the stability thereof.

For example, U.S. Pat. No. 6,238,144 to Babcock teaches a full height, elevated base, pre-manufactured, retaining wall facing system attached to a separate closed face mechanically stabilized earth retention structure, incorporating a continuous closure beam at the top interface of the panel facing and the separate mechanically stabilized earth retention structure.

PCT Application Publication No. WO/2003/058003 to Babcock teaches connection devices to improve utilization of synthetic deformed bars to transfer tensile loads, and attachment devices for connection of thin wall face panels to mechanically stabilized earth walls with minimal tensile loads.

US Patent Application Publication No. 2018/0334805 A1 to Macdonald teaches wall blocks, veneers, veneer connectors, walls, and methods of constructing walls, which more particularly relate to constructing walls in which a veneer panel is attached to a wall block with a connector and in which the front faces of the veneers have a desirable texture.

U.S. Pat. No. 4,824,293 to Brown, et al. teaches a construction for a retaining wall member utilizing a preformed channel in the member communicating through a slit formed between the channel and one face of the member for retention of a tieback utilized to affix the member to an underlying mass. The tieback may be retained by the mechanical interference between the walls of the slit and an enlarged portion of the tieback located within the channel. Alternatively, an interference rod may be inserted into the channel to retain the tieback.

Chinese Patent No. 103669399 B to Xia, et al. teaches a reinforced retaining wall with concrete panels and a construction method. The retaining wall includes a surface layer and a geogrid-reinforced wall. The feature is that the surface layer is an integral cast-in-place concrete panel. The bottom is provided with a concrete strip foundation, the geogrid-reinforced wall is a turn-back geogrid-reinforced wall, and the turn-back geogrid-reinforced wall and the integrally cast-in-situ concrete panel are connected by reinforcing steel mesh and embedded anchoring steel bars. The construction method includes the following steps: foundation earth excavation→slope bottom strip foundation construction→reinforced earth retaining wall construction→cast-in-place concrete panel construction.

Japanese Patent No. 4665219 B2 to Morizot, et al. teaches a construction of a reinforced earth wall structure. This construction technique is generally used to manufacture structures such as retaining walls and abutments. The reinforced earth wall structure is a combination of a rolled embankment, a retaining wall surface, and a reinforcing material generally connected to the retaining wall surface.

Korean Patent No. 100495782 B1 to Lee teaches a block-assembled reinforced soil retaining-wall panel and a method of constructing a reinforced soil retaining wall using the panel, in which a front, a rear, and a plurality of grooves are formed, and at a predetermined position of the groove. Interlocking the bottom surface and the upper surface with the upper and lower through-holes formed thereon, and the unit blocks of the adjacent panels to prevent them from spreading or being in close contact. A unit block manufactured to have both side surfaces formed at the lower and upper portions of the insertion part and the locking groove into which the fasteners are inserted, respectively; A connector inserted into the through hole in a state in which the plurality of unit blocks are stacked up and down; it is fastened to one side of the connector and includes a coupling means for coupling a plurality of unit blocks stacked, and is pre-assembled into one panel at a factory or site, so that construction by equipment is possible. A block-assembled reinforced soil retaining-wall panel and a construction method of reinforced soil retaining wall using this panel are also provided.

Korean Patent No. 100525156 B1 to Nam teaches that, in a retaining wall, the permanent anchor fixed on the precast concrete panel is fixed to the original ground to improve the resistance to the earth pressure applied to the precast concrete panel, and to provide a retaining wall that suppresses ground activity with a greater resistance. The retaining wall construction method comprises the step of arranging the ground horizontally along the boundary line to which the retaining wall is to be constructed and cutting the slope, and the hollow in the horizontally arranged ground; the steps of seating and positioning the formed panel, perforating the sloping ground to gradually incline downward toward the inside of the sloping ground with respect to the horizontal direction of the earth pressure to be applied to the panel, and inserting the anchor into the insertion hole of the sloping ground, fixing the rear end of the anchor to the insertion hole of the sloping ground, and tensioning the anchor. It is a technical feature configured to include the step of fixing the front end of the tensioned anchor to the panel, and embedding between the panel and the cut slope. In addition, the retaining wall includes the panels positioned along the area where the horizontally arranged ground and the cut slope contact, the hollow formed in the panel and the cut slope (both ends are fixed in a tensioned state in the insertion hole drilled in the sloping ground), and an anchor having a slope gradually inclined downward toward the inside of the sloping ground with respect to the direction of the horizontal earth pressure applied to the panel. The installed retaining wall is located vertically so that vegetation such as tree planting is possible by embedding between the panel and the cut slope, and the angle of the anchor to the horizontal earth pressure acting on the panel. By installing smaller than the conventional anchor to reduce the force required for suppressing ground activity, the tensile force that the anchor must receive can be reduced.

Korean Patent No. 101151318 B1 to Cha, et al. teaches a concrete retaining wall structure using a three anchor type rock bolt and precast panel. In more detail, it teaches a concrete retaining wall structure using a set anchor type rock bolt and a precast panel of a new structure so as to provide drainage while stabilizing the slope and reinforcing the slope. A precast panel is used in which the front plate and the rear plate are manufactured in an eccentric structure and formed into a structure having a drainage groove without clogging, and an anchor bar equipped with a pull-out resistor at the rear end inserted into the perforated hole.

U.S. Pat. No. 6,595,726 to Egan, et al. teaches a retaining-wall system formed from a wire facing unit having an upstanding face section and a rearwardly extending floor section, the rear end of which is provided with aligned, transversely extending, openings defined by upstanding, inserted U-shaped, in the wire elements. The apertures in the forward portion of a geogrid, preferably an integral, uniaxially-stretched, polymer geogrid, can be seated over the protuberances and a connecting rod inserted through the openings to secure the geogrid to the wire facing unit. Strengthening struts can be engaged between cross-wires at the top of the face section of the wire facing unit and at the rear of the floor section of the wire facing unit. An aggregate, including soil or the like, can then be placed behind the face section and over the floor section of the wire facing unit and over the geogrid to form a geogrid-reinforced retaining wall section. Multiple sections may be formed side-by-side and multiple tiers can be constructed with the front faces of superior sections aligned or set back from each other to permit plantings to be placed in front of superior face sections. The connecting rod may be rigid. Alternatively, the connecting rod may be resilient or flexible to facilitate inserting the same between a pair of wires into the aligned openings formed by the protuberances, particularly for interior wire facing units in a series of laterally juxtaposed sections where access to the openings from the sides of the wire facing unit is difficult.

U.S. Pat. No. 7,399,144 to Kallen teaches a structure for stabilizing an earthen embankment comprising an embankment support for restraining movement of at least a part of the embankment, a flexible fiber geogrid extending longitudinally through the embankment from a first end portion secured to the support to a second end portion, and anchor means for securing one of the end portions. The anchor means comprises a pair of anchor rods extending transversely in relation to the geogrid, and means for limiting movement of the anchor rods. The end portion secured by the anchor means is wrapped back and forth around the anchor rods so as to tighten thereon when the geogrid is pulled in longitudinal tension away from the anchor means. A method of anchoring a flexible fiber geogrid to a support utilizing such anchor rods is also disclosed.

U.S. Pat. No. 5,076,735 to Hilfiker teaches gabions constructed of welded wire gridworks comprising integrally joined planar panels disposed in angle relationship to one another. The gridworks are secured together to define a three-dimensional volume therebetween. In one embodiment the gabions are provided with soil reinforcing mats secured thereto to define a bottom for the three-dimensional volume. The mats extend laterally from the gabions and, when the gabions are assembled in tiers at the face of an earthen formation, serve as soil reinforcements for the formation.

U.S. Pat. No. 6,802,675 to Timmons, et al. teaches mechanically stabilized retaining wall structures comprising a stabilized earth mass connected to a precast concrete panel facing wall. A lengthwise adjustable turnbuckle style connector assembly accommodates horizontal and vertical offsets in the connection points. An array of the connection assemblies comprise a three-dimensional space truss that accommodates wall movement horizontally and vertically with respect to the wall face as well as perpendicular to the wall.

U.S. Pat. No. 7,281,882 to Hilfiker, et al. teaches a soil reinforced retaining wall for an earthen formation which is provided by embedding planar soil reinforcing mats in the formation at vertically spaced intervals and securing face mats between the soil reinforcing mats. The face mats include fingers extending distally from the edges thereof for engagement with opposite sides of a complemental face mat, whereby the mats are held in general vertical alignment. Certain of the fingers are of a gently curved configuration to frictionally hold edge portions of the face mats in spaced relationship for compression toward one another to accommodate settlement of the earthen formation, without bulging of the face mats. An L-shaped starter mat is engaged within a recess formed at the foot of the formation to provide an upstanding portion engaged with the lowermost is face mat to hold the mat in a generally vertical orientation. A tail is provided on the uppermost face mat for embedment within the backfill to cap the wall.

U.S. Pat. No. 7,980,790 to Taylor, et al. teaches a compressible mechanically stabilized earth retaining-wall system and installation thereof for reinforcing earth walls and, more specifically, for constructing a mechanically stabilized earth welded wire wall with a series of soil reinforcing elements and facing panels that do not bear on the facing panel of the lower elements, but bear on the reinforced backfill zone while allowing the facing panels to be integrated with the soil reinforcing elements above.

U.S. Pat. No. 8,632,281 to Taylor teaches a system and method of constructing a mechanically stabilized earth (MSE) structure. A wire facing is composed of horizontal and vertical elements, where a soil-reinforcing element is coupled to the wire facing at one or more crimps formed in either of the horizontal or vertical elements. A connection device may be inserted through an opening defined between the soil-reinforcing element and the one or more crimps such that the soil reinforcing element may be coupled to the wire facing. A strut may be coupled to the top-most cross wire of the vertical element and the terminal wire of the horizontal element to maintain the vertical element at a predetermined angle with respect to the horizontal element as backfill is added to the wire facing.

US Patent Application Publication No. 2003/0185634 to Babcock teaches methods utilizing synthetic deformed bars and or high strength post tensioning bars to form earth retaining structures, and methods of constructing the walls. Mechanically stabilized earth panel faced walls are described utilizing synthetic deformed bars or stainless steel grids to secure the wall facing. Multiple types of retaining structures of precast utilizing conventional precast concrete double tee sections in combination with synthetic deformed bars or high strength steel post tensioning bars or steel stress strand are also provided.

Geosynthetics materials such as high-density polyethylene (HDPE) resins have been commonly used, e.g., in Tensar® uniaxial (UX) geogrids (Tensar is a registered trademark of Tensar Corporation of Alpharetta, GA, USA) to stabilize an earth structure with superior advantages, such as high flexural rigidity, high tensile modulus, high resistance to biological and/or chemical degradation normally encountered in the material, and/or the like.

However, there is still a need of an effective method using more flexible polymer geogrid (also denoted "flexible sheet") to mechanically interlock the reinforced earthwork with the panel face or other solid structures, as well as two-staged concrete panel systems having concrete face panels established on reinforced welded wire-mesh subsystems.

Therefore, it is always a desire for a novel retaining-wall panel system for stabilizing an earth structure.

SUMMARY

According to one aspect of this disclosure, there is provided a retaining-wall panel system for retaining a landfilling material. The retaining-wall panel system comprises: a first rigid load-retention panel, the first rigid load-retention panel comprising a first anchor rod coupled to a load-bearing side thereof and forming a horizontal first slot therebetween; a flexible sheet having a proximal end and a distal end; and a first securing rod seated against the first anchor rod on a first side of the first slot and partially in the first slot or adjacent thereto for coupling the flexible sheet to the first anchor rod; a first section of the flexible sheet between the proximal end and distal end thereof extends between the first anchor rod and the first securing rod and at least partially wraps about the first anchor rod and the first securing rod on opposite sides thereof such that the first anchor rod is in pressurized contact with the first securing rod via a portion of the first section of the flexible sheet sandwiched therebetween; and the distal end of the flexible sheet is extendible away from the first rigid load-retention panel into and within the landfilling material.

In some embodiments, the flexible sheet further wraps about a combination of the first anchor rod, the first securing rod, and the first section of the flexible sheet with the proximal and distal ends extending through the first slot from the first side thereof and out of the first slot from a second side thereof opposite to the first side of the first slot.

In some embodiments, the first side of the first slot is a top side of the first slot or a bottom side of the first slot.

In some embodiments, the proximal end of the flexible sheet is extendible along the first rigid load-retention panel or is extendible away from the first rigid load-retention panel into and within the landfilling material.

In some embodiments, the flexible sheet comprises at least one geotextile sheet made of a geosynthetic material.

In some embodiments, the retaining-wall panel system further comprises a second anchor rod coupled to an anchor on the load-bearing side of the first rigid load-retention panel and at a distance thereto, the second anchor rod and the anchor forming a horizontal second slot; and a second securing rod seated against the second anchor rod on a first side of the second slot and partially in the second slot or adjacent thereto for coupling the flexible sheet to the second anchor rod; a second section of the flexible sheet between the proximal end and distal end thereof extends between the second anchor rod and the second securing rod and at least partially wraps about the second anchor rod and the second securing rod on opposite sides thereof such that the second anchor rod is in pressurized contact with the second securing rod via a portion of the second section of the flexible sheet sandwiched therebetween.

In some embodiments, the anchor is earth, rock, or a second rigid load-retention panel.

According to one aspect of this disclosure, there is provided a method for securing a flexible sheet to a rigid load-retention panel of a retaining-wall panel system, for reinforcing the rigid load-retention panel to retain therebehind a landfilling material, the rigid load-retention panel comprising an anchor rod coupled to a load-bearing side thereof and forming a horizontal slot therebetween. The method comprises steps of: (i) extending a proximal portion of a flexible sheet through the slot from a first side thereof, the proximal portion of the flexible sheet adjacent a proximal end thereof; (ii) wrapping the proximal portion of the flexible sheet at least partially about a securing rod on the first side of the slot; (iii) extending the proximal portion of the flexible sheet through the slot and wrapping at least partially about the anchor rod; and (iv) pulling at least the proximal end of the flexible sheet away from the slot to tightly engage the securing rod, the proximal portion of the flexible sheet, and the anchor rod for securing the flexible sheet to the rigid load-retention panel.

In some embodiments, the method further comprises a step (a) after step (iii) and before step (iv); and the step (a) comprises: extending the proximal portion of the flexible sheet through the slot from a second side thereof and between the rigid load-retention panel and the securing rod, the second side opposite to the first side.

In some embodiments, the first side is a top side of the slot or a bottom side of the slot.

In some embodiments, the method further comprises extending the proximal end of the flexible sheet along the first rigid load-retention panel or away from the first rigid load-retention panel.

According to one aspect of this disclosure, there is provided an apparatus for retaining a landfilling material. The apparatus comprises: a vertical structure comprising one or more upper anchoring structures; a horizontal structure forwardly extending from a lower portion of the vertical structure, the horizontal structure comprising a laterally extending front rod and one or more lower anchoring structures; and at least one strut for engaging the vertical structure and the horizontal structure; each of the at least one strut comprises: an upper hook for engaging a respective one of the one or more upper anchoring structures; a first lower hook for engaging a corresponding one of the one or more lower anchoring structures; and a second lower hook for engaging the front rod.

In some embodiments, the one or more lower anchoring structures comprise one or more longitudinally extending first anchor rods.

In some embodiments, the one or more lower anchoring structures are on a rear side of the front rod and spaced therefrom thereby forming a gap therebetween.

In some embodiments, the horizontal structure comprises a first rigid load-retention panel; and the front rod and the one or more lower anchoring structures are coupled to a front side of the first rigid load-retention panel.

In some embodiments, the horizontal structure comprises a pair of horizontal side-rods on laterally opposite sides thereof and wherein the front rod is coupled to a front portion of the pair of the horizontal side-rods.

In some embodiments, the horizontal structure further comprises a plurality of longitudinally distributed reinforcement rods each laterally extending between the pair of horizontal side-rods.

In some embodiments, the one or more longitudinally extending first anchor rods are coupled to the plurality of reinforcement rods.

In some embodiments, the vertical structure comprises a second rigid load-retention panel.

In some embodiments, the vertical structure comprises a pair of vertical side-rods on laterally opposite sides thereof.

In some embodiments, each of the pair of vertical side-rods comprises a horizontally extending upper portion.

In some embodiments, the vertical structure further comprises a top delimiting structure on a top side thereof and about a rear end thereof.

In some embodiments, the top delimiting structure is a rod coupled to a top side of the horizontally extending upper portions of the pair of vertical side-rods.

In some embodiments, the horizontal structure further comprises a bottom delimiting structure on a bottom side thereof and about a rear end thereof.

In some embodiments, the bottom delimiting structure is a laterally extending rod.

In some embodiments, the top and bottom delimiting structures are positioned such that When a first one of the apparatus is stacked on top of a second one of the apparatus, the bottom delimiting structure of the first one of the apparatus engages the top delimiting structure of the second one of the apparatus such that the stacked first and second apparatuses have a sloped rear surface at a predefined angle α to the vertical direction.

In some embodiments, the predefined angle α is between about 1° to about 2°.

In some embodiments, each of the at least one strut comprises a rod forwardly extending from the vertical structure and having a first, laterally extending front portion forming the first lower hook and a second front portion forwardly extending from the first front portion forming the second lower hook.

In some embodiments, the first lower hook wraps about the corresponding one of the one or more longitudinally extending rods from a bottom side thereof.

In some embodiments, the second lower hook wraps about the front rod from a bottom side thereof or from a top side thereof.

In some embodiments, each of the at least one strut comprises a rod forwardly extending from the vertical structure and having a front portion forming second first lower hook; and the first lower hook laterally extends from a position adjacent the front portion forming the first lower hook.

According to one aspect of this disclosure, there is provided a retaining-wall panel system comprising: the above-described apparatus; at least one flexible sheet having a proximal end and a distal end; and at least one securing rod seated against the front rod on a first side thereof for coupling the at least one flexible sheet to the front rod; a first section of the at least one flexible sheet extends between the front rod and the at least one securing rod and at least partially wraps about the front rod and the at least one securing rod on opposite sides thereof such that the front rod and the securing rod are in pressurized contact with each other via a portion of the first section of the at least one flexible sheet therebetween; and the distal end of the flexible sheet is extendible away from the horizontal structure into and within the landfilling material.

In some embodiments, at least one of the proximal end and the distal end of the flexible sheet extends forwardly or rearwardly.

In some embodiments, the retaining-wall panel system further comprises: a third rigid load-retention panel longitudinally on a first side of the retaining apparatus, the third rigid load-retention panel comprising a second anchor rod; at least one of the proximal end and the distal end of the flexible sheet extends from the retaining apparatus and ties to the second anchor rod of the third rigid load-retention panel.

In some embodiments, the retaining-wall panel system further comprises: a fourth rigid load-retention panel on a second side of the retaining apparatus longitudinally opposite to the first side, the fourth rigid load-retention panel comprising a third anchor rod; one of the proximal end and the distal end of the flexible sheet extends from the retaining apparatus and ties to the second anchor rod of the third rigid load-retention panel, and the other of the proximal end and the distal end of the flexible sheet extends from the retaining apparatus and ties to the third anchor rod of the fourth rigid load-retention panel.

According to one aspect of this disclosure, there is provided a retaining-wall panel for retaining a landfilling material. The retaining-wall panel comprises: a body; a reinforcement structure embedded in the body; and an anchor rod having two leg sections coupled to the reinforcement structure; the reinforcement structure comprises at least one horizontal rod coupled to a plurality of vertical rods; each leg section of the anchor rod wraps about both the at least one horizontal rod and a corresponding one of the plurality of vertical rods for coupling the anchor rod to the reinforcement structure.

In some embodiments, the body comprises one or more of concrete, lightweight concrete, and plastic.

In some embodiments, the plastic comprises recycled plastic.

In some embodiments, the body further comprises a plurality of compressible components distributed therein.

In some embodiments, the compressible components comprise air bubbles, air capsules, recycled empty water bottles, expanded polystyrene (EPS) foams, and/or a combination thereof.

In some embodiments, each leg section of the anchor rod wraps about both the at least one horizontal rod and a corresponding one of the plurality of vertical rods such that, when a pulling force is applied to the anchor rod, each leg section thereof applies forces to the at least one horizontal rod and the corresponding one of the plurality of vertical rods to press the at least one horizontal rod and the corresponding one of the plurality of vertical rods against each other.

In some embodiments, a first leg section of the anchor rod is coupled to a first one of the at least one horizontal rod and a first one of the plurality of vertical rods; the first vertical rod is on a load-bearing side of the first horizontal rod; and the first leg section of the anchor rod is configured for: (i) extending from the load-bearing side of the first horizontal rod to an exterior side thereof opposite to the load-bearing side, (ii) vertically wrapping about the first horizontal rod and extending to the load-bearing side thereof, and (iii) horizontally wrapping about the first vertical rod and extending to the exterior side thereof.

In some embodiments, said horizontally wrapping about the first vertical rod and extending to the exterior side thereof comprises: horizontally wrapping about the first vertical rod for more than half round and extending to the exterior side thereof.

In some embodiments, a first leg section of the anchor rod is coupled to a first one of the at least one horizontal rod and a first one of the plurality of vertical rods; the first vertical rod is on a load-bearing side of the first horizontal rod; and the first leg section of the anchor rod is configured for: (i) extending from the load-bearing side of the first horizontal rod to an exterior side thereof opposite to the load-bearing side, (ii) wrapping about the first horizontal rod and extending towards the first vertical rod, and (iii) wrapping about the first vertical rod and extending to the load-bearing side thereof.

In some embodiments, a first leg section of the anchor rod is coupled to a first one of the at least one horizontal rod and a first one of the plurality of vertical rods; the first horizontal rod is on a load-bearing side of the first vertical rod; and the first leg section of the anchor rod is configured for: (i) extending from the load-bearing side of the first vertical rod to an exterior side thereof opposite to the load-bearing side, (ii) horizontally wrapping about the first vertical rod and extending to the load-bearing side thereof, and (iii) vertically wrapping about the first horizontal rod and extending to the exterior side thereof.

In some embodiments, said vertically wrapping about the first horizontal rod and extending to the exterior side thereof comprises: vertically wrapping about the first horizontal rod for more than half round and extending to the exterior side thereof.

In some embodiments, the body comprises complementary extrusions on peripheral sides thereof for engaging with another one of the retaining-wall panel.

According to one aspect of this disclosure, there is provided a retaining-wall panel system comprising: the above-described retaining-wall panel; at least one flexible sheet having a proximal end and a distal end; and at least one securing rod seated against the anchor rod on a first side thereof for coupling the at least one flexible sheet to the anchor rod; a first section of the at least one flexible sheet extends between the anchor rod and the at least one securing rod and at least partially wraps about the anchor rod and the at least one securing rod on opposite sides thereof such that the anchor rod and the securing rod are in pressurized contact with each other via a portion of the first section of the at least one flexible sheet therebetween; and the distal end of the flexible sheet is extendible away from the horizontal structure into and within the landfilling material.

According to one aspect of this disclosure, there is provided a retaining-wall panel system comprising: a plurality of vertically and/or horizontally engaged retaining-wall panels as described above, with seams between neighboring retaining-wall panels; and a plurality of tapes attached to the seams for sealing the seams.

According to one aspect of this disclosure, there is provided a sealing component for sealing an interface between a pair of engaged retaining-wall panels. The sealing component comprises: an elongated body for being sandwiched between the pair of engaged retaining-wall panels; the elongated body comprises at least one elongated end portion for fitting into a recess at an interface between the pair of engaged retaining-wall panels formed by recessed or chamfered edges thereof.

In some embodiments, the elongated body comprises a flexible sealing material.

In some embodiments, the flexible sealing material comprises one or more of a rubber, a soft polymer, and a soft plastic.

In some embodiments, the at least one elongated end portion comprises an outwardly expanded elongated end portion.

In some embodiments, the elongated body comprises two elongated end portions on opposite sides thereof.

In some embodiments, the two elongated end portions have a same cross-section or different cross-sections.

In some embodiments, the elongated body is an elongated sleeve.

In some embodiments, the sealing component further comprises at least one elongated rod for extending into the at least one elongated end portion.

In some embodiments, the at least one elongated rod comprises a circular cross-section or a D-shaped cross-section.

In some embodiments, the elongated body is an elongated shim with a solid core.

In some embodiments, the elongated body comprises a plurality of chamfered or recess corners.

BRIEF DESCRIPTION OF THE DRAWINGS

FIGS. 5A to 5J show an example of the process shown in FIG. 4, wherein

FIG. 5A shows establishing a rigid panel on a site,

FIG. 5B shows extending the proximal portion of a flexible sheet through the slot of an anchor rod of the rigid panel from the lower side thereof, FIG. 5C shows wrapping the proximal portion of the flexible sheet about a securing rod on the upper side of the slot, FIG. 5D shows extending the proximal portion of the flexible sheet through the slot from the upper side thereof, FIG. 5E shows wrapping the proximal portion of the flexible sheet about the anchor rod, FIG. 5F shows extending the proximal portion of the flexible sheet towards the rigid panel and wrapping the proximal portion of the flexible sheet about the securing rod from the top thereof, FIG. 5G shows extending the proximal portion of the flexible sheet through the slot from the upper side thereof and between the interior surface of the rigid panel and the securing rod, FIG. 5H shows tightening the proximal portion of the flexible sheet to the anchor rod and the securing rod with the anchor rod and the securing rod tightly engaged by pulling the proximal end of the flexible sheet downwardly away from the slot and/or pulling the distal portion of the flexible sheet away from the rigid panel, FIG. 5I shows filling earth to the load-bearing side of the rigid panel to an elevation about that of the anchor rod and extending the distal portion of the flexible sheet on the filled earth for a desired length substantially without wrinkle, and FIG. 5J shows further filling earth to the load-bearing side of the rigid panel to cover the distal portion of the flexible sheet;

FIGS. 12A and 12B shows an example of two steps of the process shown in FIG. 11, wherein FIG. 12A shows folding the proximal portion of the flexible sheet and extended the folded proximal portion through the slot from the lower side thereof, and FIG. 12B shows inserting the securing rod into the loop of the folded proximal portion on the upper side of the slot;

FIG. 16A is a perspective view of the vertical and horizontal structures of the cage shown in FIG. 15A;

FIG. 16B is a side view of the vertical and horizontal structures shown in FIG. 16A;

FIG. 16C is an enlarged side view of the portion B of the vertical structure shown in FIG. 16A;

FIG. 24B is a side view of the MSE retaining-wall panel system shown in FIG. 24A;

FIG. 24C is an enlarged side view of a portion K of the MSE retaining-wall panel system shown in FIG. 24B;

DETAILED DESCRIPTION

Embodiments disclosed herein relate to a mechanically stabilized earth (MSE) retaining-wall panel system. The MSE retaining-wall panel system comprises one or more stable structures such as one or more rigid MSE panels with each MSE panel comprising one or more anchor rods secured thereto with a horizontal gap or slot therebetween. One or more flexible sheets may be respectively secured to the one or more anchor rods using one or more securing rods.

In some embodiments, a flexible sheet may be secured to an anchor rod using a securing rod by wrapping a proximal portion of the flexible sheet such that the proximal portion of the flexible sheet is extended between the anchor rod and the securing rod and also about the anchor and securing rods.

The MSE retaining-wall panel system disclosed herein uses one or more flexible sheets to mechanically interlock the reinforced earthwork with the panel face or other solid structures, as well as two-staged concrete panel systems having concrete face panels established on reinforced welded wire-mesh subsystems.

A method is also disclosed for mechanically connecting a flexible sheet to the face of a stable structure or panel.

Figure 1:
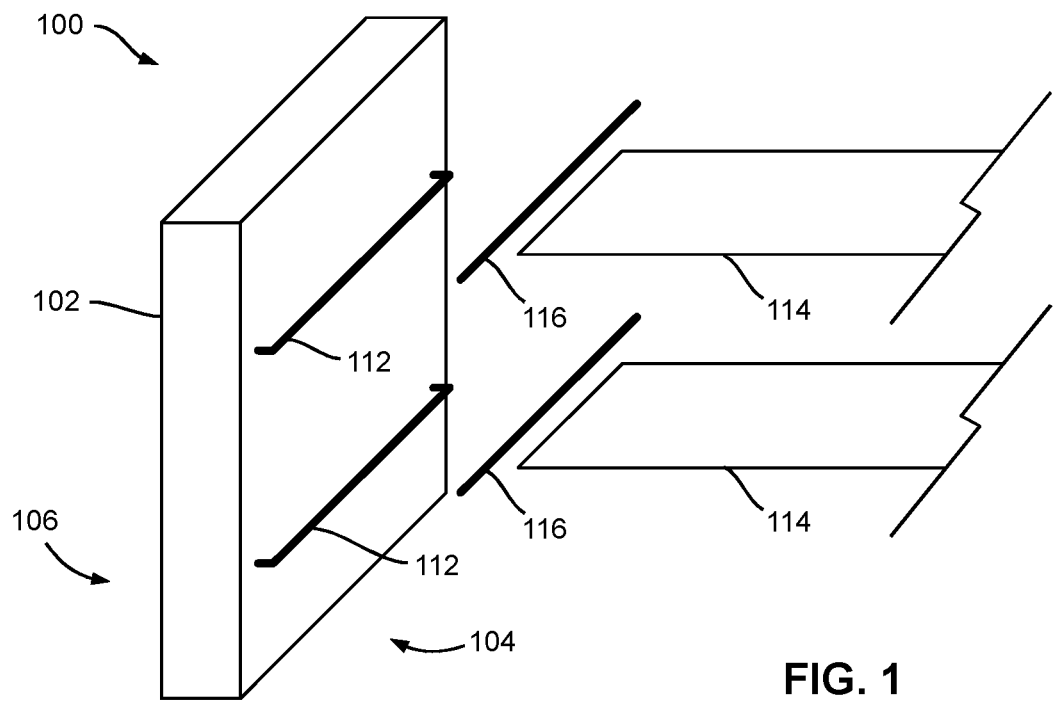
FIG. 1 is a perspective view of a mechanically stabilized earth (MSE) retaining-wall panel system, according to some embodiments of this disclosure.

Turning now to FIG. 1, a MSE retaining-wall panel system according to some embodiments of this disclosure is shown and is generally identified using reference numeral 100. The MSE retaining-wall panel system 100 comprises one or more rigid retaining-wall panels 102 (also called "MSE panels") such as one or more concrete faced panels or retaining walls, one or more plastic panels or retaining walls, one or more stone panels or retaining walls, one or more steel panels or retaining walls, one or more wire-mesh panels or retaining walls, and/or the like, for retaining a landfilling material such as rocks, gravels, earth, soil, and/or the like on a load-bearing side 104 thereof. Herein, the load-bearing side 104 is also denoted as the interior side and the side 106 opposite to the load-bearing side 104 is denoted as the exterior side.

The rigid retaining-wall panel 102 comprises a wall body (also identified using reference numeral 102) with one or more anchor rods 112 secured on the interior side 104 thereof for fastening one or more flexible reinforcement sheets 114 such as geotextile sheets made of suitable geosynthetic materials and/or the like, via one or more securing rods 116.

FIGS. 2A to 2D show the rigid retaining-wall panel 102 and the anchor rods 112 thereon. As shown, each anchor rod 112 is a U-shape rod made of a suitable rigid material such as galvanized steel, stainless steel, or the like. The anchor rod 112 comprises a horizontally extending, substantially cylindrical main anchor-rod section 112A with a diameter $D_1$ and two leg sections 112B extending from the opposite sides of the main section 112A into the interior side wall of the rigid retaining-wall panel 102 and coupled therewith via suitable means such as pre-installation during the manufacturing of the rigid retaining-wall panel 102, screwing, gluing, compression fitting, welding (e.g., to preinstalled anchoring bases), and/or the like.

Figure 2A:
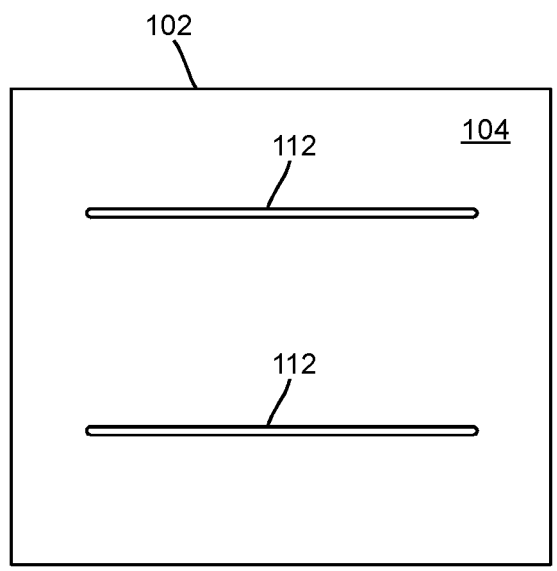
FIG. 2A is a front view of a rigid panel of the MSE retaining-wall panel system shown in FIG. 1.
Figure 2B:
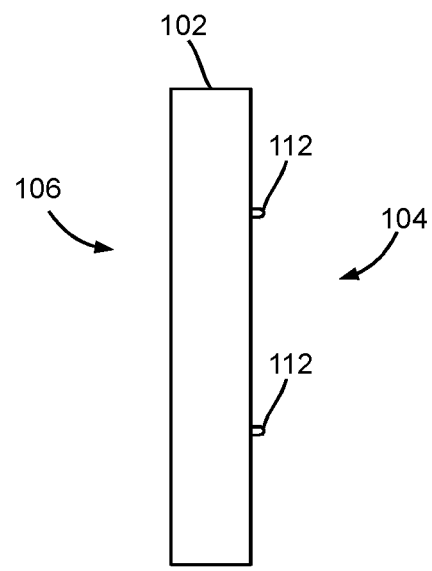
FIG. 2B is a side view of the rigid panel shown in FIG. 2A.
Figure 2C:
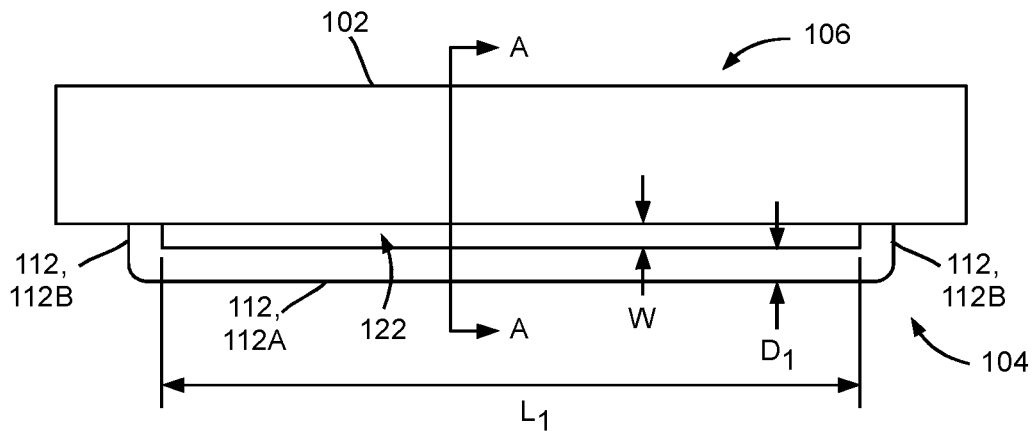
FIG. 2C is a plan view of the rigid panel shown in FIG. 2A.
Figure 2D:
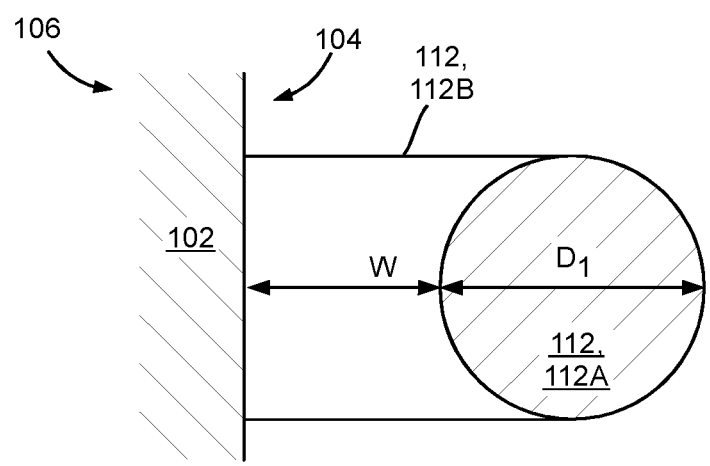
FIG. 2D is cross-sectional view of a portion of the rigid panel shown in FIG. 2C along a cross-section line A-A.

As shown in FIGS. 2C and 2D, the U-shape anchor rod 112 forms a horizontal gap or slot 122 between the rigid retaining-wall panel 102 and the anchor rod 112 with a length L and a width W. In some embodiments, the width W of the slot 122 may be the same or slightly smaller than the diameter $D_1$ of the main anchor-rod section 112A. In some other embodiments, the width W of the slot 122 may be slightly greater than the diameter $D_1$ of the main anchor-rod section 112A.

Figure 3A:
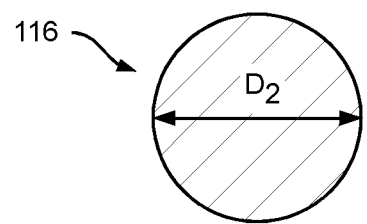
FIG. 3A is a cross-sectional view of a securing rod of the MSE retaining-wall panel system shown in FIG. 1.
Figure 3B:
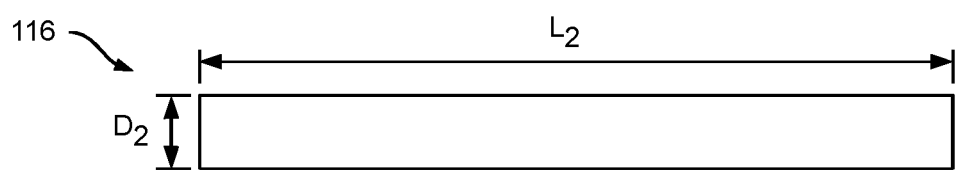
FIG. 3B is a plan view of the securing rod shown in FIG. 3A.

As shown in FIGS. 3A and 3B, the securing rod 116 is a substantially cylindrical rod made of a suitable rigid material such as galvanized steel, stainless steel, fiberglass, High Density Poly Ethylene (HDPE), plastic, hard rubber, and/or the like. The securing rod 116 has a diameter $D_2$ generally greater than or equal to the width W of the slot 122 and a length $L_2$ slightly shorter than the length $L_1$ of the slot 122. In some embodiments, the length $L_2$ of the securing rod 116 may be longer than or equal to the length $L_1$ of the slot 122.

The flexible reinforcement sheet 114 has a width $W_R$ generally smaller than or equal to the length $L_1$ of the slot 122 to allow the flexible reinforcement sheet 114 to extending therethrough. In some embodiments, the width $W_R$ of the flexible reinforcement sheet 114 may be greater than the length $L_2$ of the securing rod 116. In some other embodiments, the width $W_R$ of the flexible reinforcement sheet 114 may be smaller than the length $L_2$ of the securing rod 116.

Figure 4:
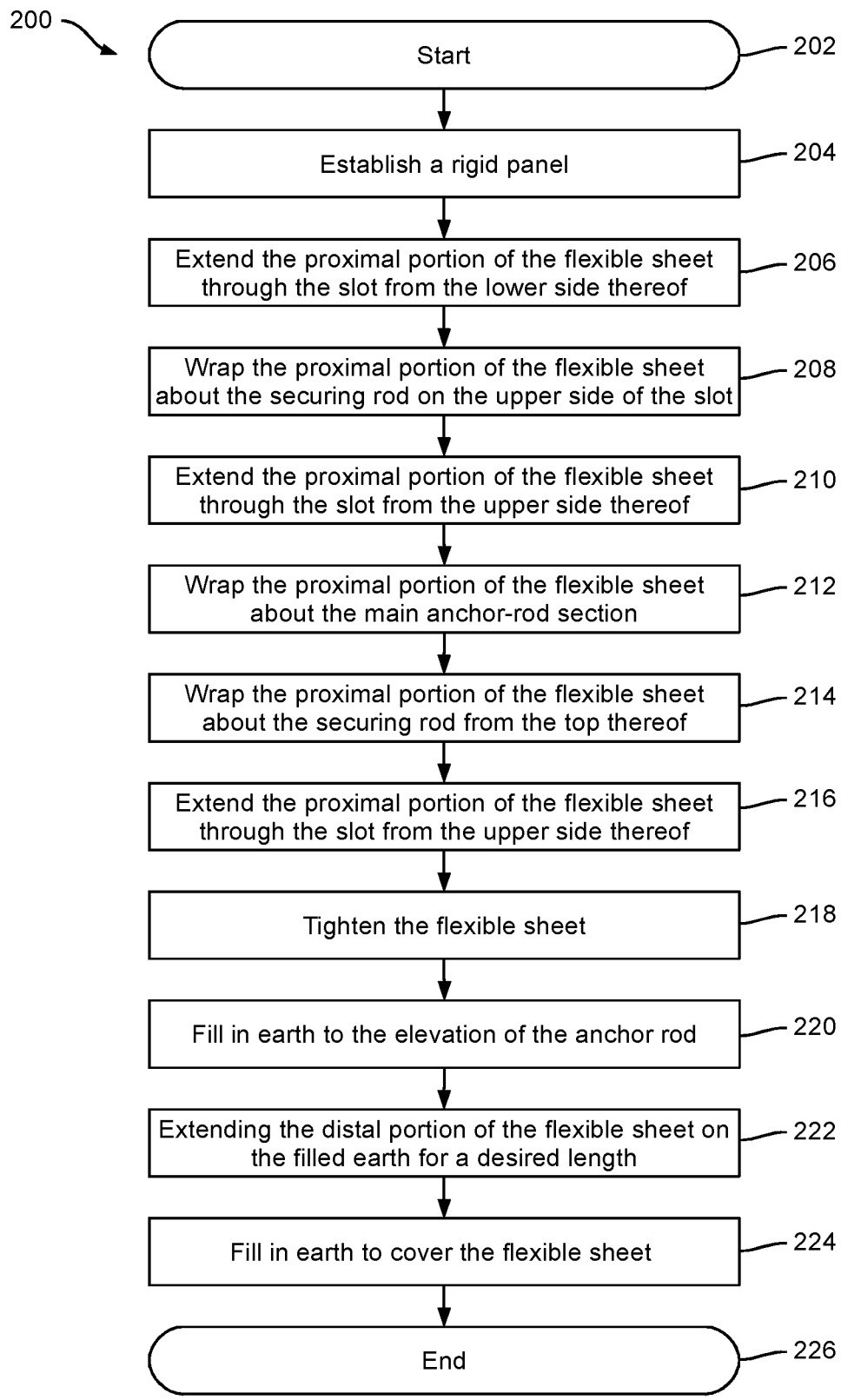
FIG. 4 is a flowchart showing a process of fastening a flexible reinforcement sheet to the rigid panel shown in FIG. 2A for reinforcing the rigid panel and forming the MSE retaining-wall panel system shown in FIG. 1.

FIG. 4 is a flowchart showing a process 200 of fastening a flexible reinforcement sheet 114 (also denoted a "flexible sheet") to a rigid retaining-wall panel 102 for reinforcing the rigid retaining-wall panel 102 and forming the MSE retaining-wall panel system 100. The process 200 is described in view of FIGS. 5A to 5J and with an example of specific parameters.

Figure 5A:
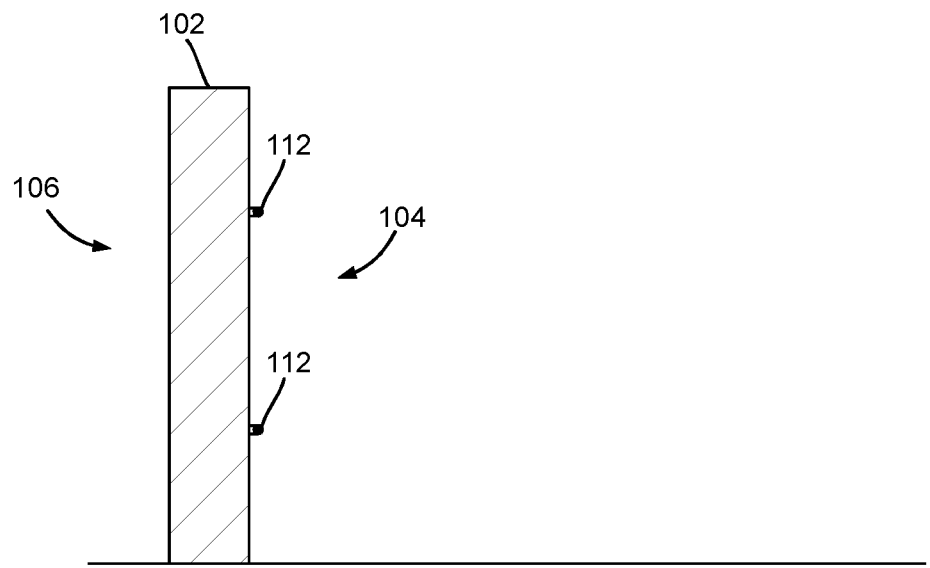
Figure 5B:
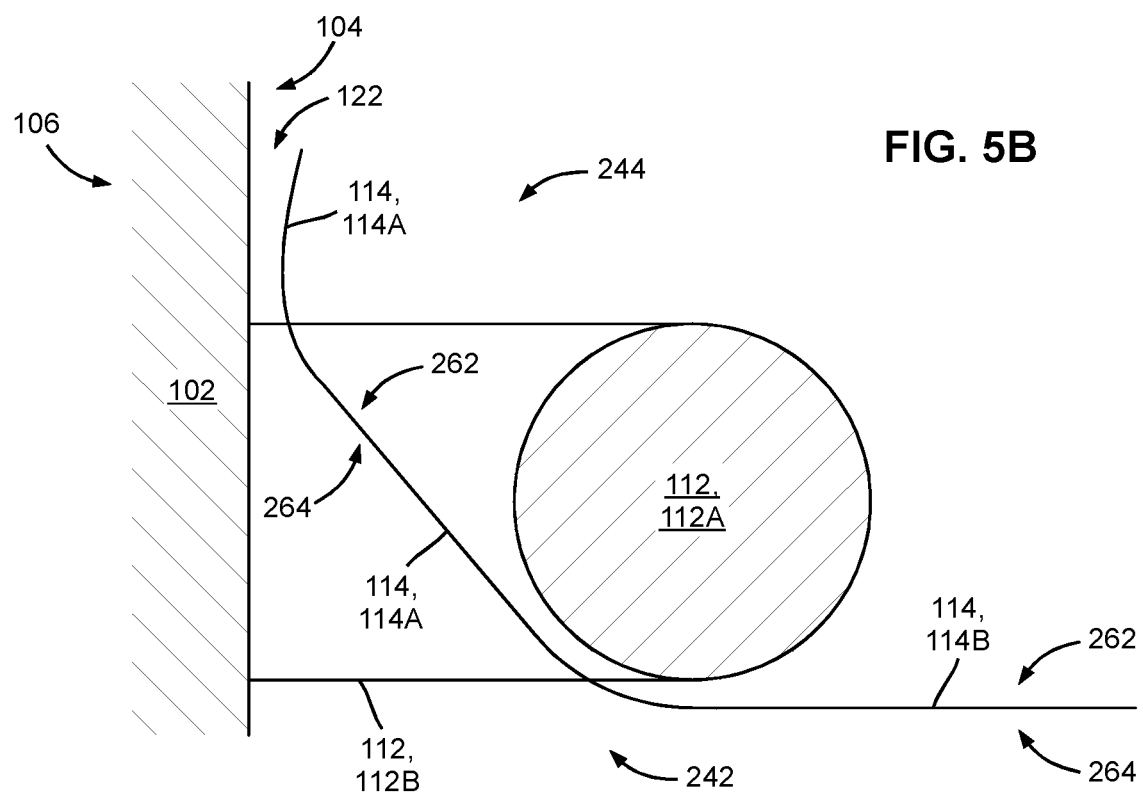

After the process starts (step 202), a rigid retaining-wall panel 102 is first established on a site (step 204; also see FIG. 5A). The rigid retaining-wall panel 102 may be a rigid panel (such as a concrete faced panel) having a substantially flat surface on the interior side 104 thereof with a dimension of 1.48 meters (m)×1.48 m and a suitable thickness. The rigid retaining-wall panel 102 comprises two (2) U-shaped #4 rebar (Imperial bar size) or anchor rods 112 (with a diameter $D_1$ of 12.7 mm) cast into the interior side 104 thereof with a vertical spacing of 750 millimeters (mm) and the lower anchor rod at an elevation of 177.5 mm from the bottom of the rigid retaining-wall panel 102.

The U-shaped rebar 112 has a length of 1.36 m forming a slot 122 with a length $L_1$ of 1347.3 mm and a width W of 9.5 mm.

The flexible sheet 114 has a width $W_R$ generally smaller than or equal to the length $L_1$ of the slot 122. At step 206, the proximal portion 114A of the flexible sheet 114 is extended through the slot 122 from the lower side 242 thereof (see FIG. 5B). For ease of description, the opposite surfaces of the flexible sheet 114 are denoted hereinafter with respect to the orientation of the distal portion 114B of the flexible sheet 114 as the "upper surface" 262 and the "lower surface 264, although, as will be described in more detail later, the orientation of the proximal portion 114A of the flexible sheet 114 may change in the following steps.

Figure 5C:
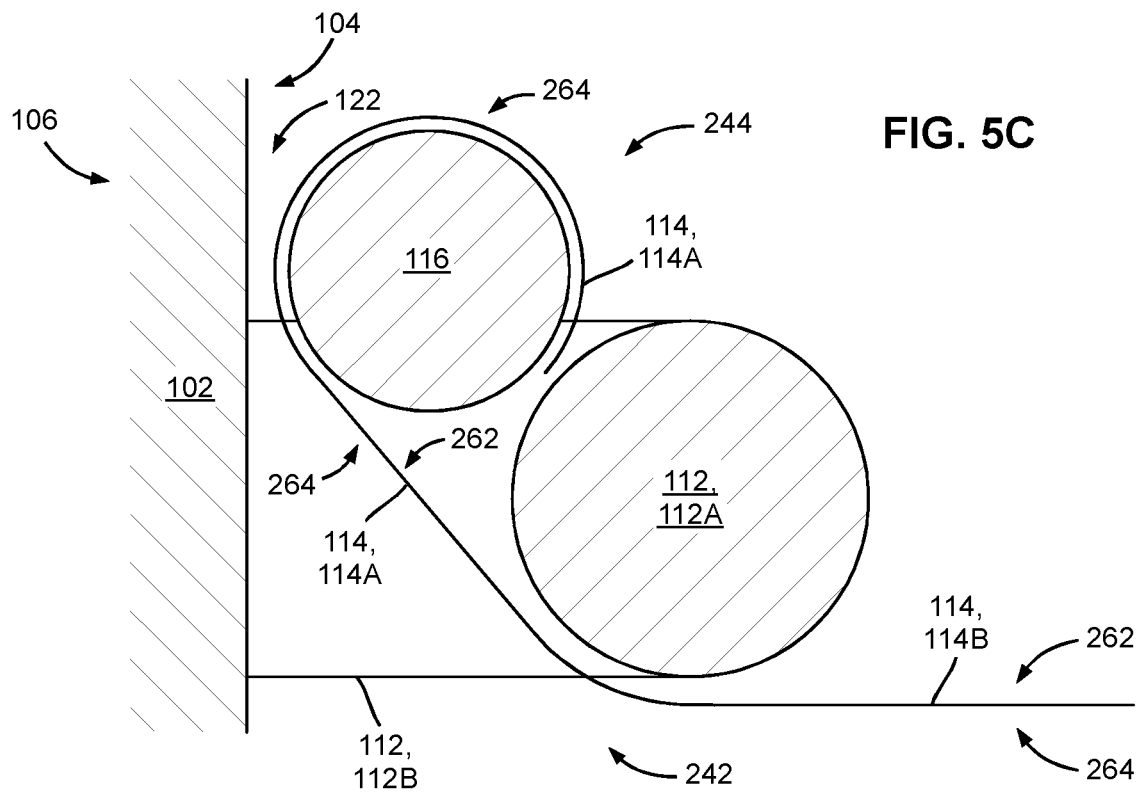

At step 208, the proximal portion 114A of the flexible sheet 114, or more specifically the upper surface 262 thereof, is wrapped about the securing rod 116 on the upper side 244 of the slot 122 (see FIG. 5C). In this example, the securing rod 116 has a diameter $D_2$ of 10 mm and a length $L_2$ of 1340 mm.

Figure 5D:
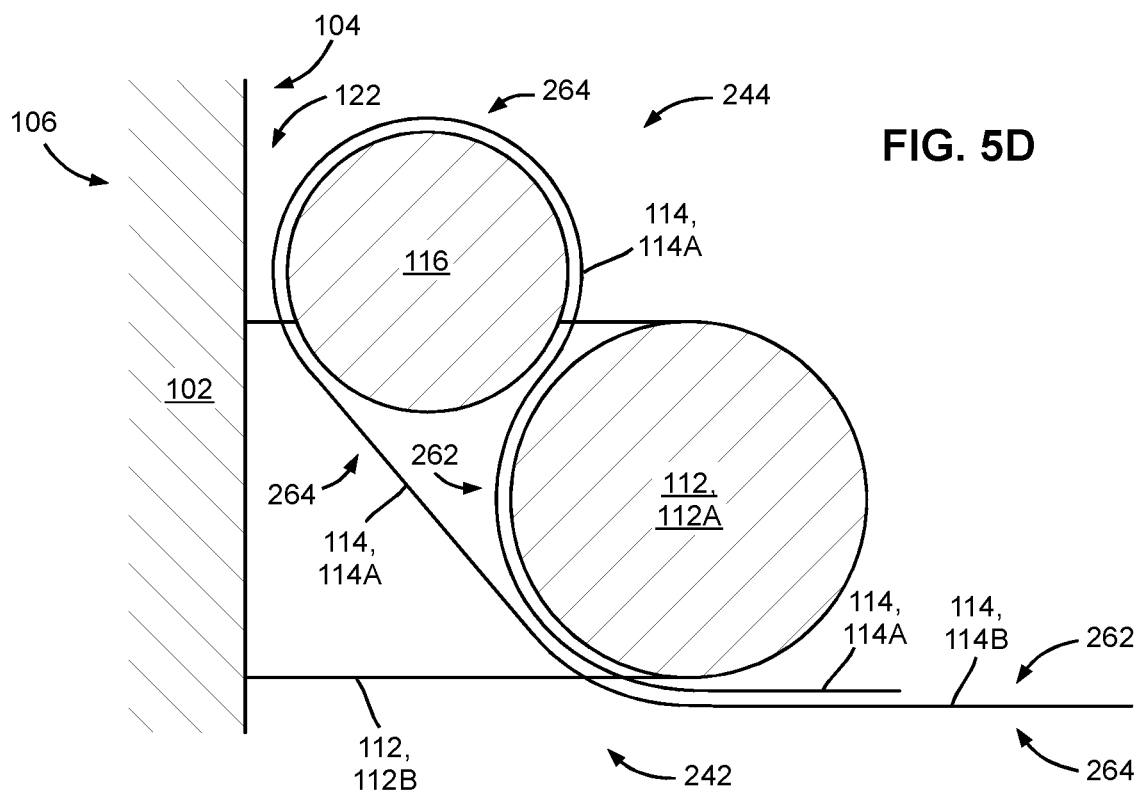

At step 210, the proximal portion 114A of the flexible sheet 114 is extended through the slot 122 from the upper side 244 thereof (see FIG. 5D).

Figure 5E:
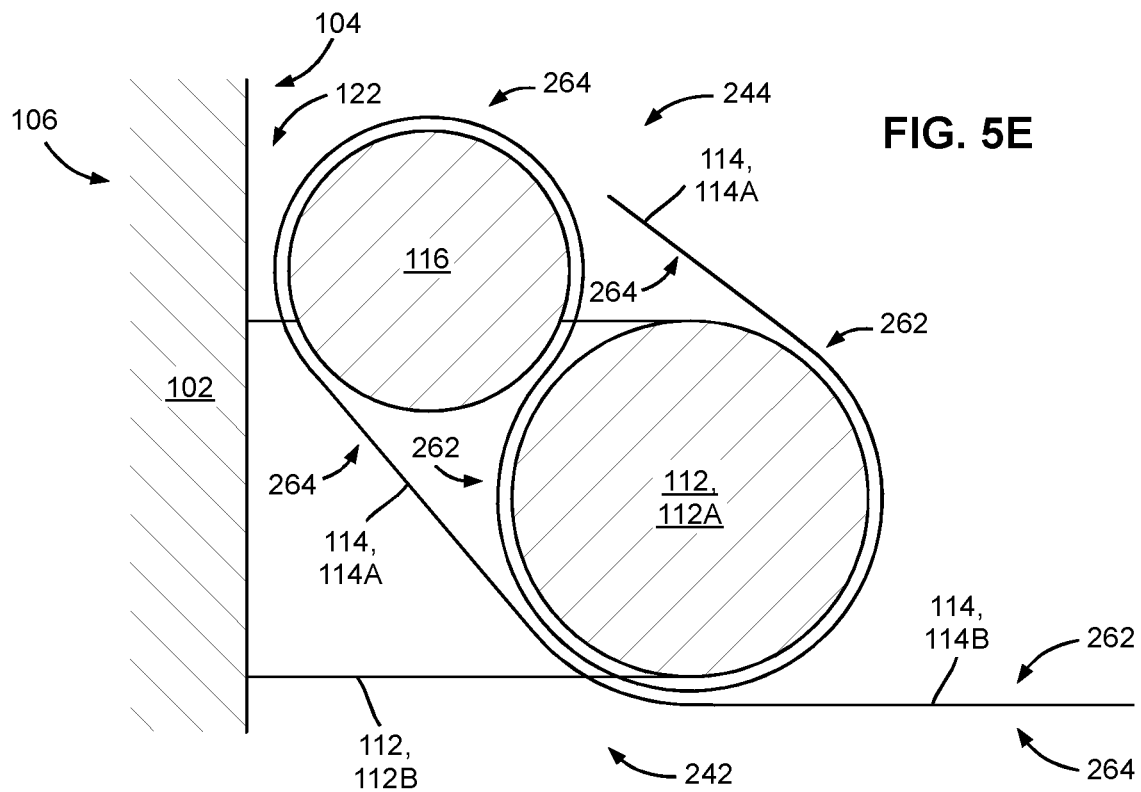

At step 212, the proximal portion 114A of the flexible sheet 114, or more specifically the lower surface 264 thereof, is wrapped about the main anchor-rod section 112A (see FIG. 5E).

Figure 5F:
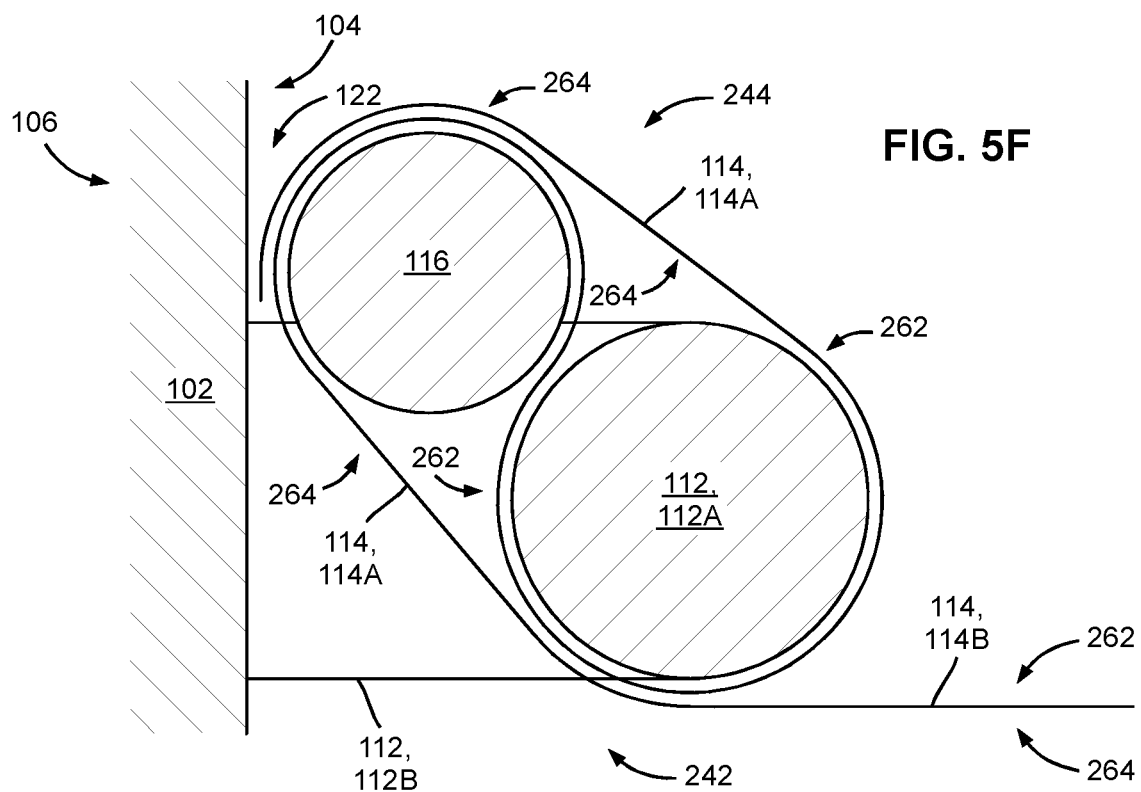

At step 214, the proximal portion 114A of the flexible sheet 114 is extended towards the rigid retaining-wall panel 102 and the lower surface 264 thereof is wrapped about the securing rod 116 from the top thereof (see FIG. 5F).

Figure 5G:
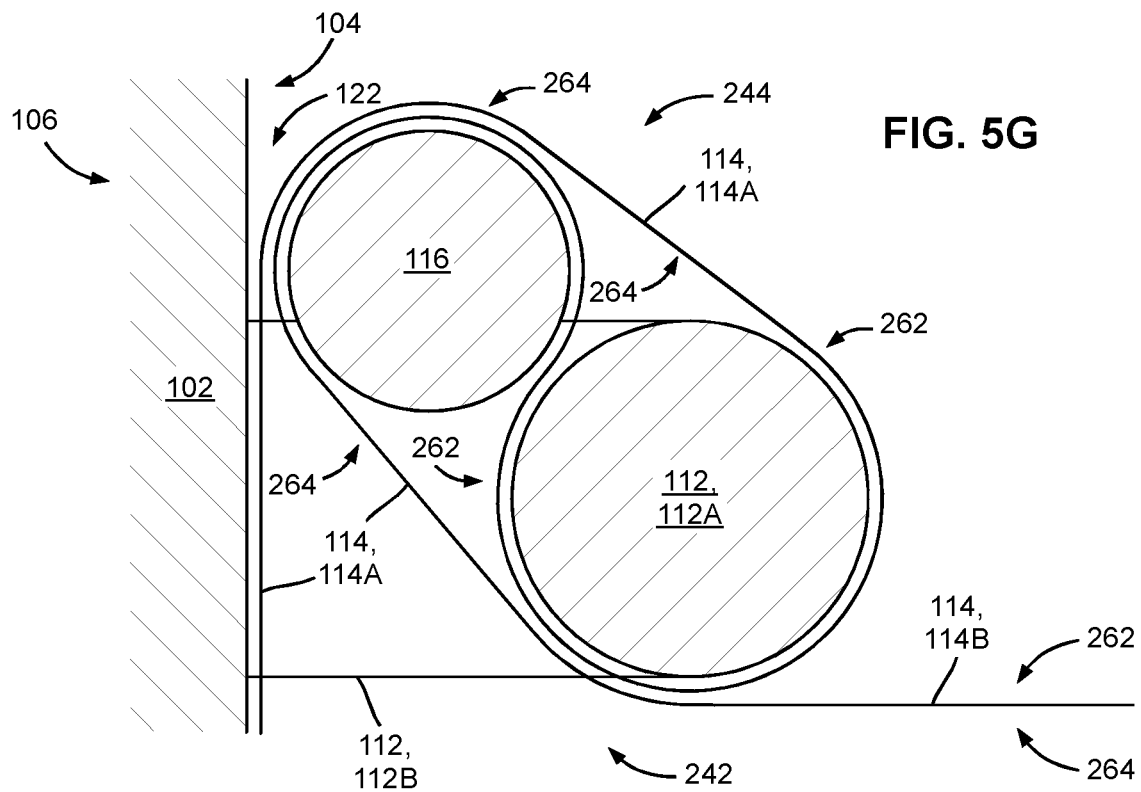

At step 216, the proximal portion 114A of the flexible sheet 114 is extended through the slot 122 from the upper side 244 thereof and between the interior surface 104 of the rigid panel retaining-wall 102 and the securing rod 116 (see FIG. 5G).

Figure 5H:
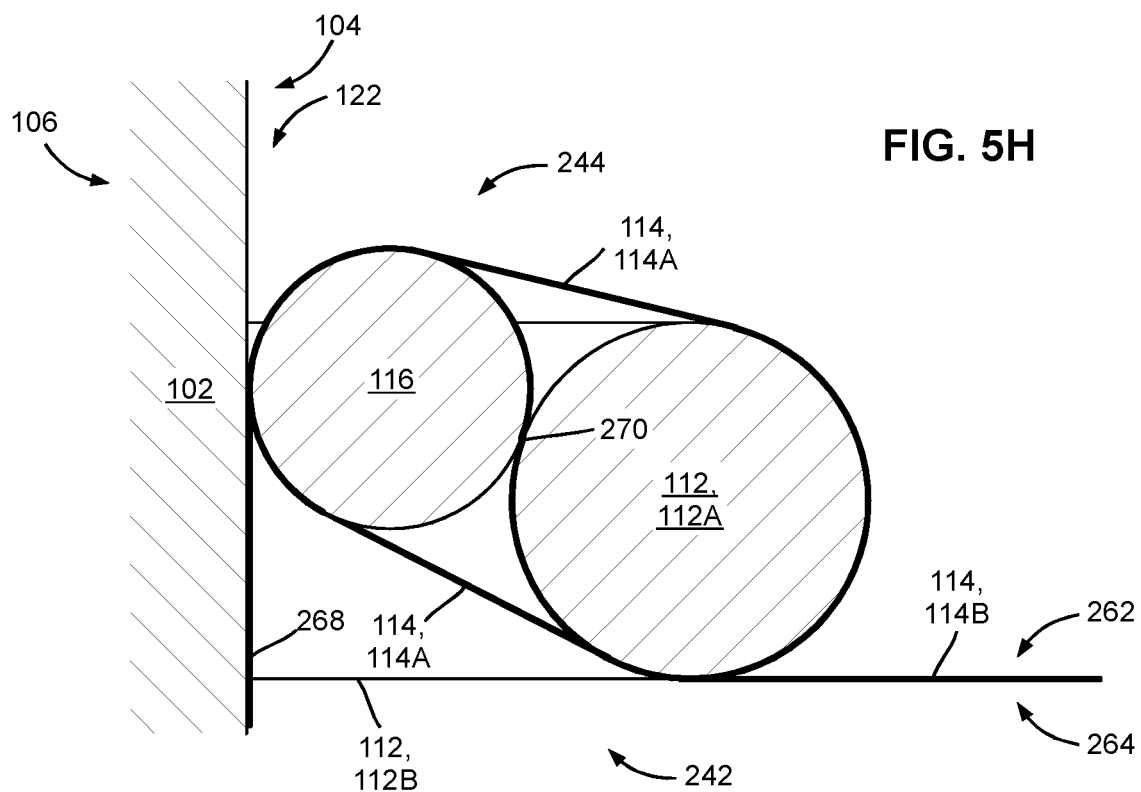

At step 218, the proximal portion 114A of the flexible sheet 114 is tightened to the main anchor-rod section 112A and the securing rod 116 with the main anchor-rod section 112A and the securing rod 116 tightly engaged, by pulling the proximal end 268 of the flexible sheet 114 downwardly away from the slot 122 and/or pulling the distal portion 114B of the flexible sheet 114 away from the rigid retaining-wall panel 102 (see FIG. 5H).

Thus, while the securing rod 116 horizontally seats against the main anchor-rod section 112A on the upper side 244 thereof and partially in or adjacent to the slot 122, a wrapping-and-separation portion of the flexible sheet 114 (which is a part of the proximal portion 114A) extends between the main anchor-rod section 112A and the securing rod 116 and at least partially wraps about the main anchor-rod section 112A rod and the securing rod 116 on opposite sides of the wrapping-and-separation portion of the flexible sheet 114, thereby separating the main anchor-rod section 112A rod and the securing rod 116 on opposite sides thereof.

The flexible sheet 114 then wraps about the combination of the main anchor-rod section 112A, the securing rod 116, and the wrapping-and-separation portion of the flexible sheet 114 with the proximal and distal ends thereof extending from the upper side 244 of the slot 112, through the slot 112, and extending out of the slot 112 from the lower side 242 thereof. In this manner, the main anchor-rod section 112A and the securing rod 116 are in pressurized contact with each other via the wrapping-and-separation portion of the flexible sheet 114 therebetween. In other words, at the contact point 270 (or more precisely the contact surface) of the main anchor-rod section 112A and the securing rod 116, the wrapping-and-separation portion of the flexible sheet 114 is pressed by the main anchor-rod section 112A and the securing rod 116 on opposite sides thereof. Consequently, the friction between the flexible sheet 114, the main anchor-rod section 112A, and the securing rod 116 keeps them tightly engaged. Moreover, any pulling pressure applied from either end of the flexible sheet 114 will provide further pressure to the pressurized contact of the main anchor-rod section 112A and the securing rod 116 which further secures the wrapping-and-separation portion of the flexible sheet 114 sandwiched therebetween.

In some embodiments, the securing rod 116 may be made of a material such as plastic, HDPE, hard rubber, and/or the like that may slightly deform or change shape under pressure. When the flexible sheet 114 is tied to the main anchor-rod section 112A and the securing rod 116, the pressure applied to the securing rod 116 may force it to slightly deform or otherwise change shape, thereby "squeezing" into the slot 122 between the rigid retaining-wall panel 102 and the main anchor-rod section 112A, which further increases the contact surface thereof against the flexible sheet 114 and the main anchor-rod section 112A, and subsequently further secures the engaged flexible sheet 114, the main anchor-rod section 112A, and the securing rod 116.

Figure 5I:
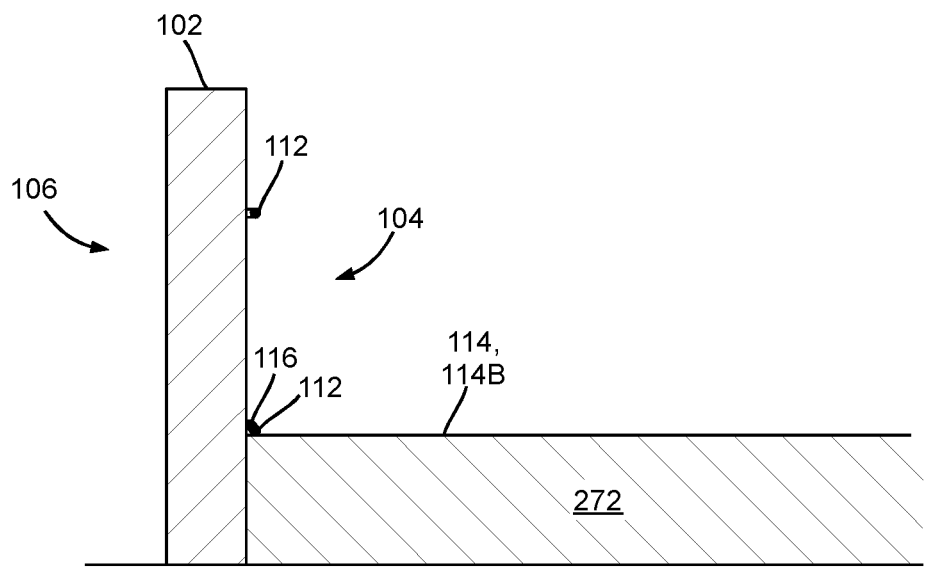

At step 220, earth 272 may be filled to the load-bearing side 104 of the rigid retaining-wall panel 102 to an elevation about that of the anchor rod 112, and at step 222, the distal portion 114B of the flexible sheet 114 is extended on the filled earth 272 for a desired length substantially without wrinkle (FIG. 5I).

Figure 5J:
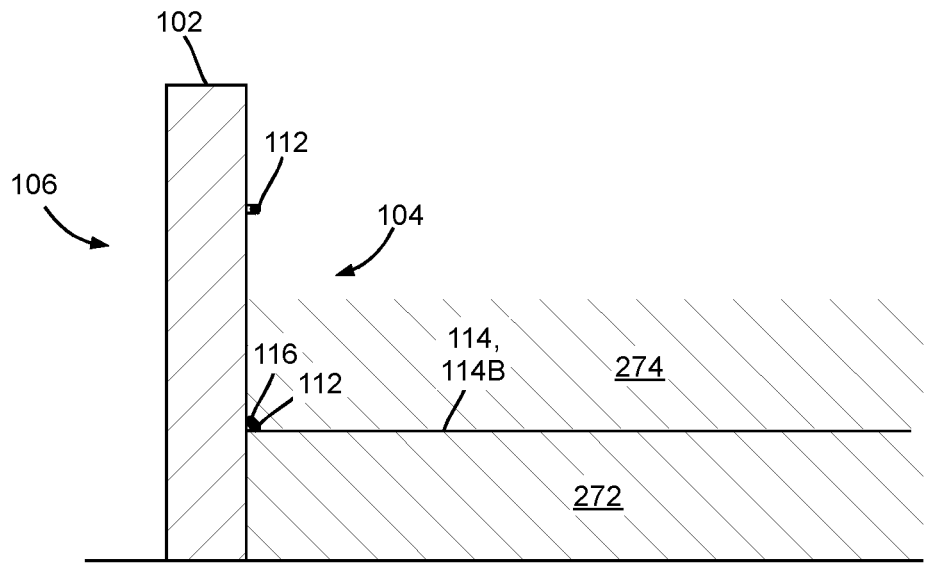

At step 224, more earth 274 may be further filled to the load-bearing side 104 of the rigid retaining-wall panel 102 to cover the distal portion 114B of the flexible sheet 114 (FIG. 5J). The process 200 then ends.

Those skilled in the art will appreciate that the process 200 may be repeated to fasten flexible sheets 114 to other anchor rods 112.

In some embodiments, the distal end (also identified using reference numeral 114B) of the flexible sheet 114 may be simply buried in the earth.

Figure 6:
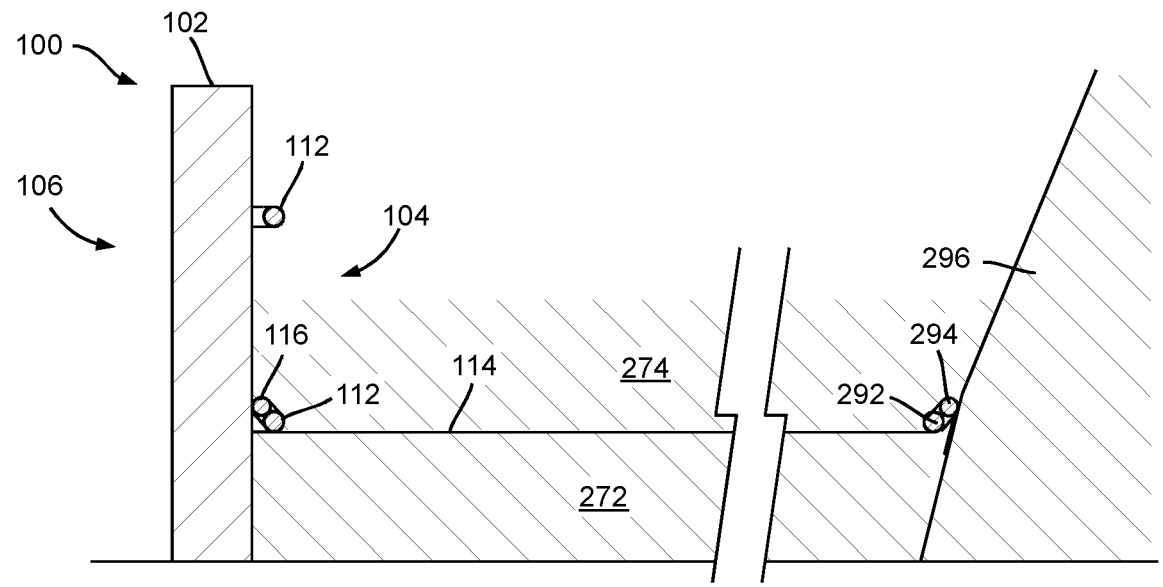
FIG. 6 is a schematic cross-sectional view of a MSE retaining-wall panel system, according to some embodiments of this disclosure.

In some embodiments as shown in FIG. 6, the distal end 114B of the flexible sheet 114 may be wrapped about an anchor rod 292 coupled to an anchor 296 (such as a bank of earth or rock) on the load-bearing side 104 of the rigid retaining-wall panel 102 and a securing rod 294 in a manner similar as described above and then buried in the earth 274.

Figure 7:
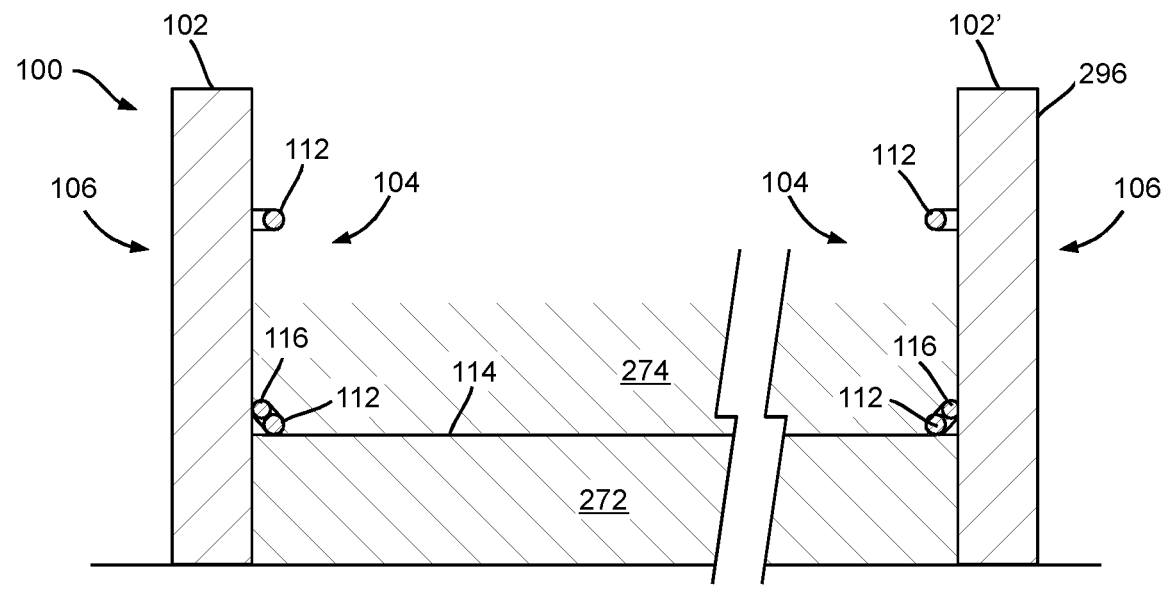
FIG. 7 is a schematic cross-sectional view of a MSE retaining-wall panel system, according to some other embodiments of this disclosure.

In some embodiments as shown in FIG. 7, the MSE retaining-wall panel system 100 may comprise a pair of rigid retaining-wall panels 102 and 102' with structures similar to that shown in FIGS. 2A to 2D and with their load-bearing sides 104 facing each other, and flexible sheets 114 fastened to the anchor rods 112 on their load-bearing side 104 thereof using securing rods 116 as described above. In other words, rather than the bank of earth or rock shown in FIG. 6, the rigid retaining-wall panels 102' on the load-bearing side 104 of the rigid retaining-wall panel 102 is the anchor 296 for coupling the anchor rod 292.

Figure 8:
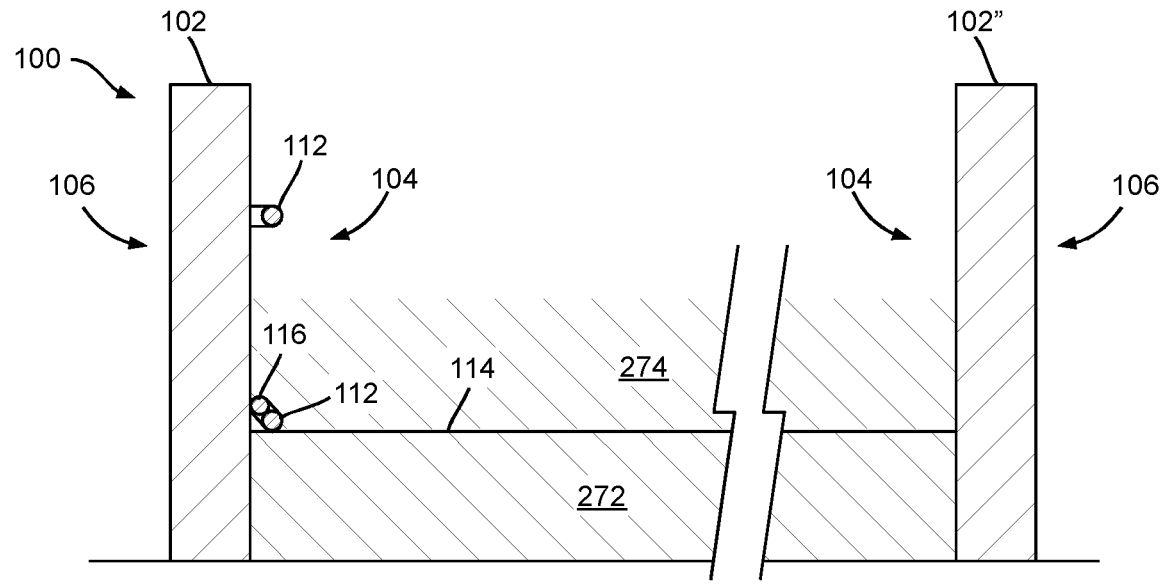
FIG. 8 is a schematic cross-sectional view of a MSE retaining-wall panel system, according to yet some other embodiments of this disclosure.

In some embodiments as shown in FIG. 8, the MSE retaining-wall panel system 100 may comprise a rigid retaining-wall panel 102 with a structure described above and a conventional retaining wall 102". Flexible sheets 114 may be fastened to the anchor rods 112 on the interior side 104 of the rigid retaining-wall panel 102 using securing rods 116 as described above, and fastened to the conventional retaining wall 102" using other suitable methods such as the conventional fastening methods known in the art.

Figure 9:
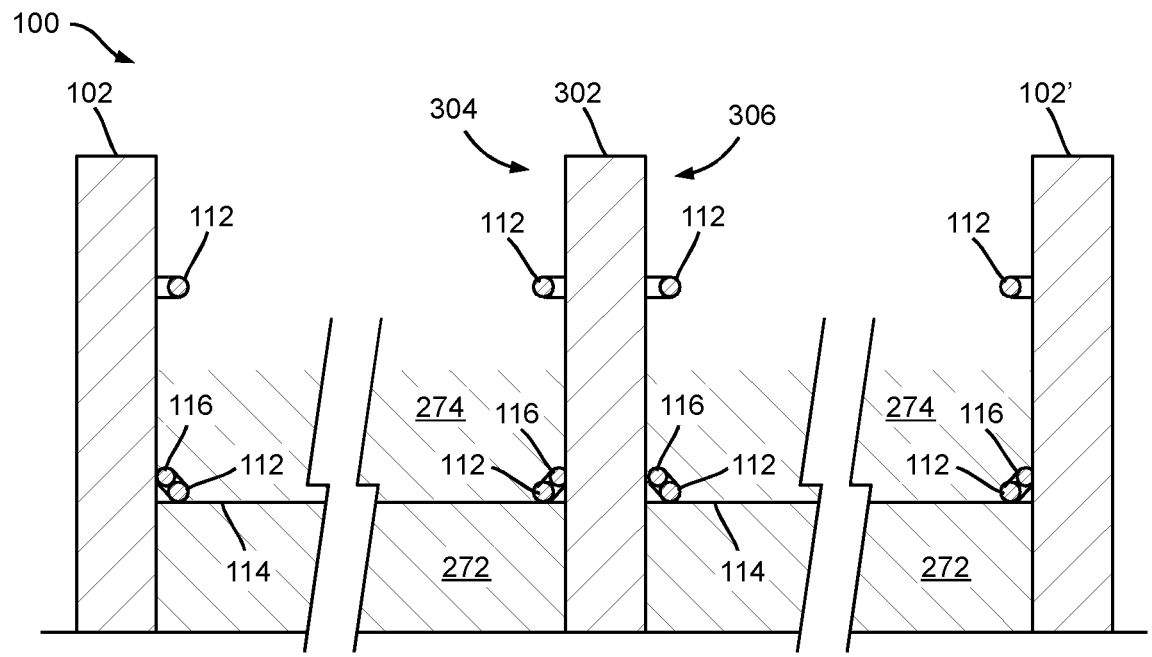
FIG. 9 is a schematic cross-sectional view of a MSE retaining-wall panel system, according to still some other embodiments of this disclosure.

In some embodiments as shown in FIG. 9, the MSE retaining-wall panel system 100 is similar to that shown FIG. 7 and may further comprise a rigid retaining-wall panel 302 intermediate the rigid retaining-wall panels 102 and 102'. The rigid retaining-wall panel 302 comprises one or more anchor rods 112 on each of the opposite sides 304 and 306 facing the rigid retaining-wall panels 102 and 102', respectively. Flexible sheets 114 may be fastened to the anchor rods 112 between the rigid retaining-wall panels 102 and 302 and between the rigid retaining-wall panels 302 and 102' using securing rods 116 as described above.

Figure 10A:
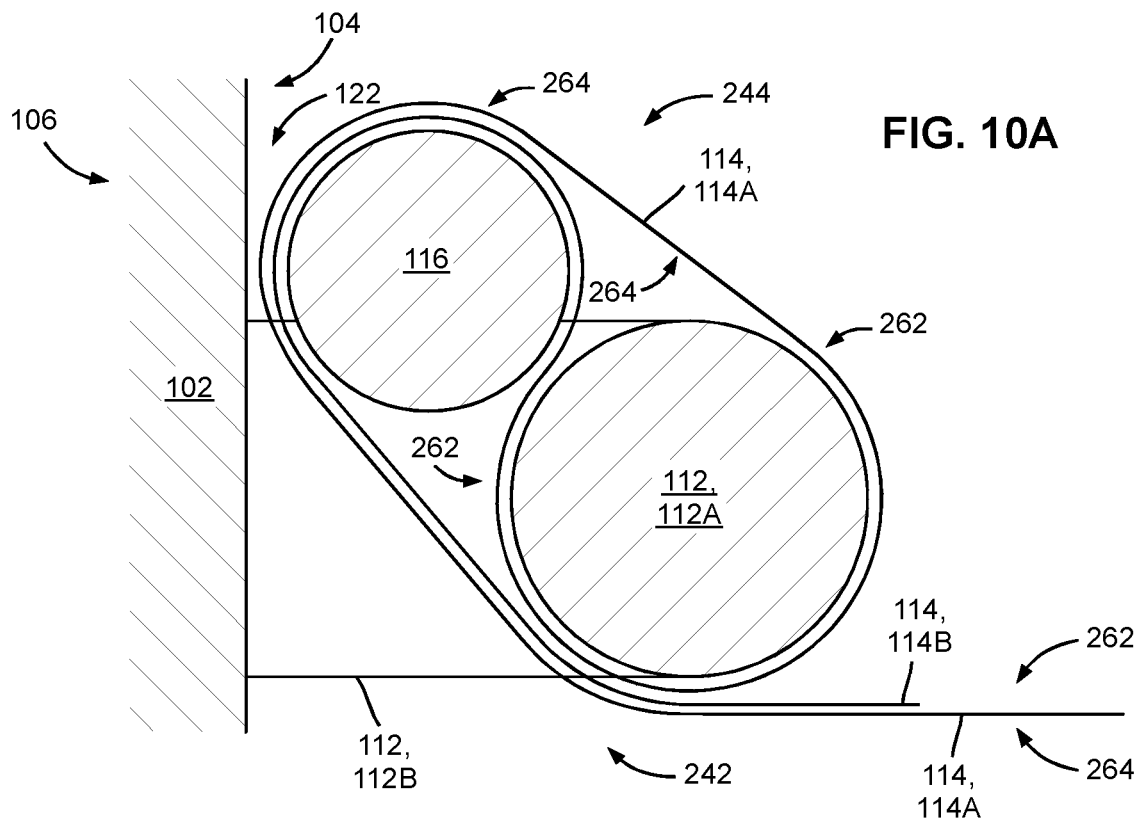
FIG. 10A is a schematic cross-sectional view of a portion of a MSE retaining-wall panel system, according to some other embodiments of this disclosure.

Other embodiments are also available. For example, as shown in FIG. 10A, the proximal portion 114A of the flexible sheet 114 may be extended away from the rigid retaining-wall panel 102.

Figure 10B:
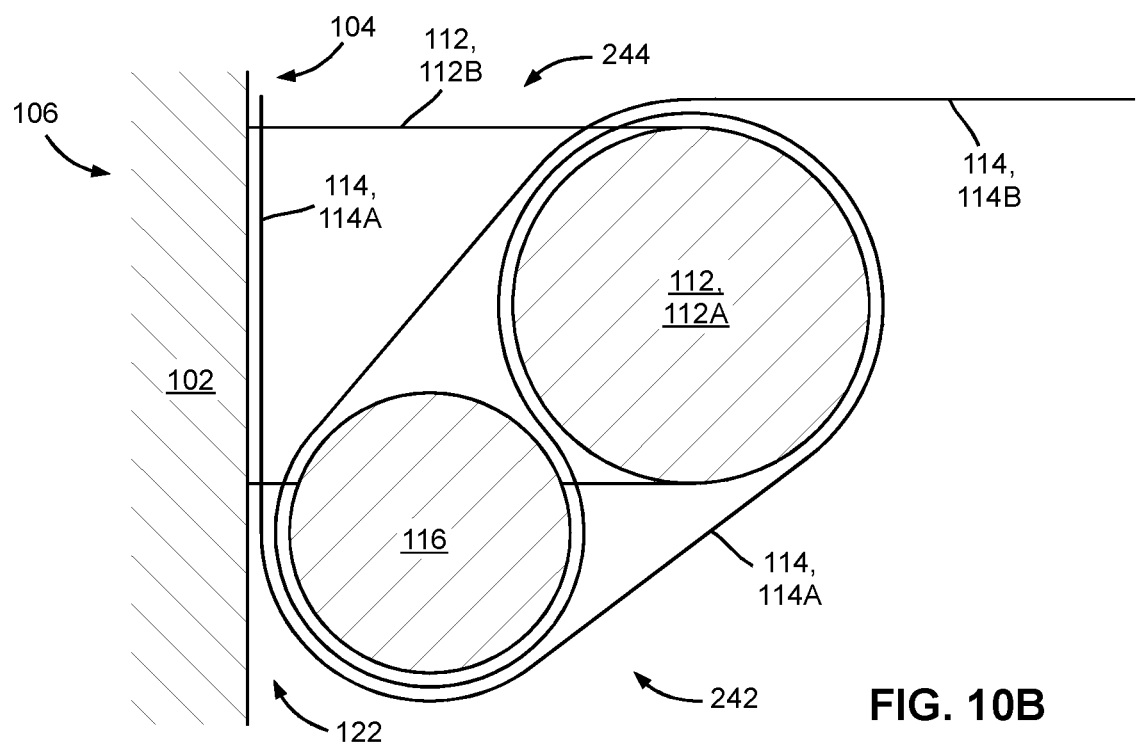
FIG. 10B is a schematic cross-sectional view of a portion of a MSE retaining-wall panel system, according to yet some other embodiments of this disclosure.

In above embodiments, the securing rod 116 is positioned on the upper side 244 of the slot 122. In some embodiments as shown in FIG. 10B, the securing rod 116 may be positioned on the lower side 242 of the slot 122.

In above embodiments, the anchor rods 112 are vertically spaced on the interior surface of the rigid retaining-wall panel 102. In some embodiments, the anchor rods 112 may be distributed horizontally next to each other or spaced apart. In some embodiments, the anchor rods 112 may be distributed both horizontally and vertically.

In some embodiments, the rigid retaining-wall panel 102 may be a rigid foundation of a structure such as a building, an existing stable foundation, a reinforced MSE structure, or the like.

In above embodiments, the anchor rods 112 and slots 122 are horizontally oriented. In other embodiments, the anchor rods 112 and thus the slots 122 may be oriented in any angles as needed or desired.

Figure 11:
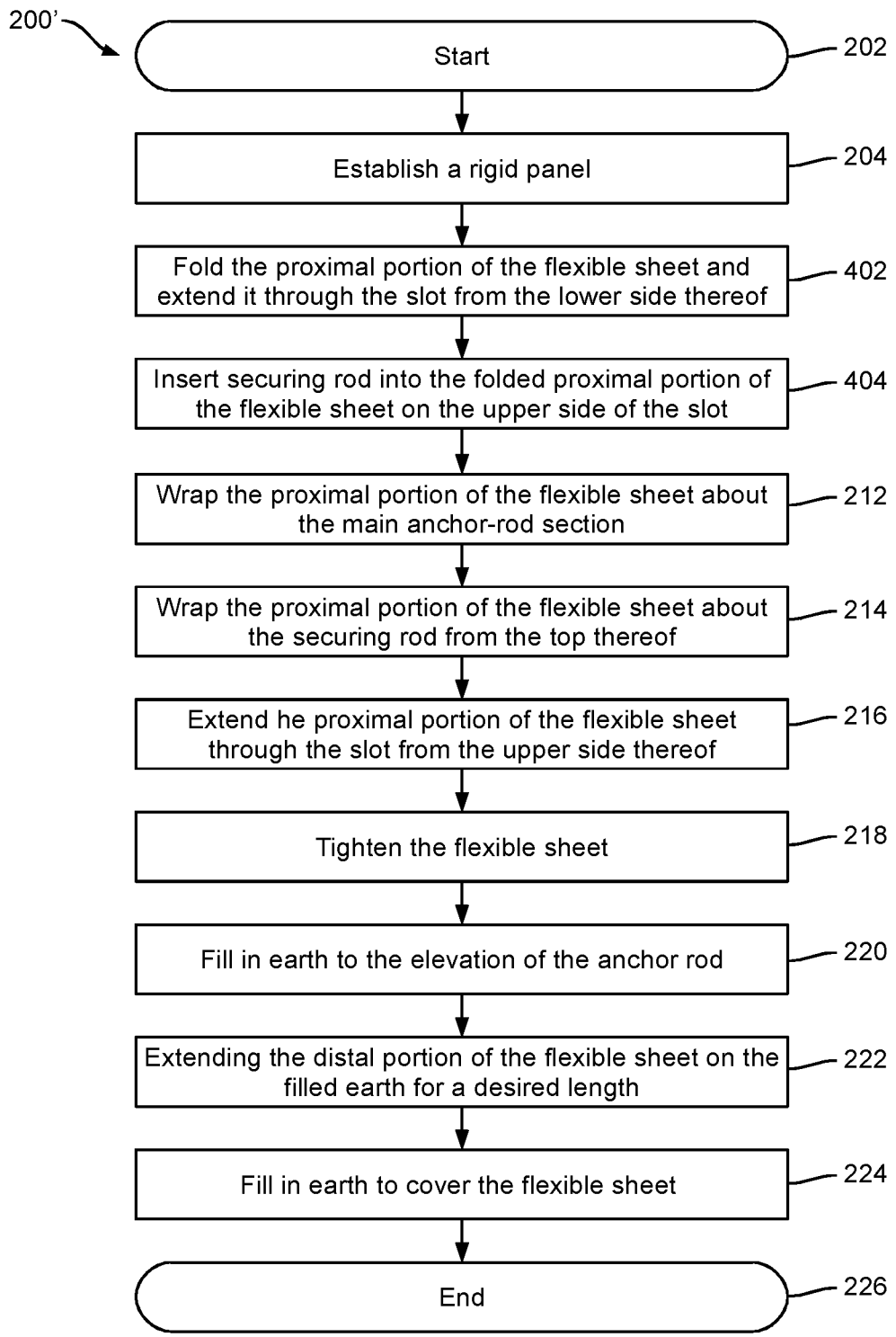
FIG. 11 is a flowchart showing a process of fastening a flexible reinforcement sheet to the rigid panel shown in FIG. 2A for reinforcing the rigid panel and forming the MSE retaining-wall panel system shown in FIG. 1, according to some embodiments of this disclosure.

FIG. 11 is a flowchart showing a process 200' of fastening a flexible sheet 114 to a rigid retaining-wall panel 102 for reinforcing the rigid retaining-wall panel 102 and forming the MSE retaining-wall panel system 100, according to some embodiments of this disclosure.

The process 200' is similar to the process 200 shown in FIG. 4 except that the step steps 206 to 210 of the process 200 (also see FIGS. 5B to 5D) are replaced with steps 402 and 404.

Figure 12A:
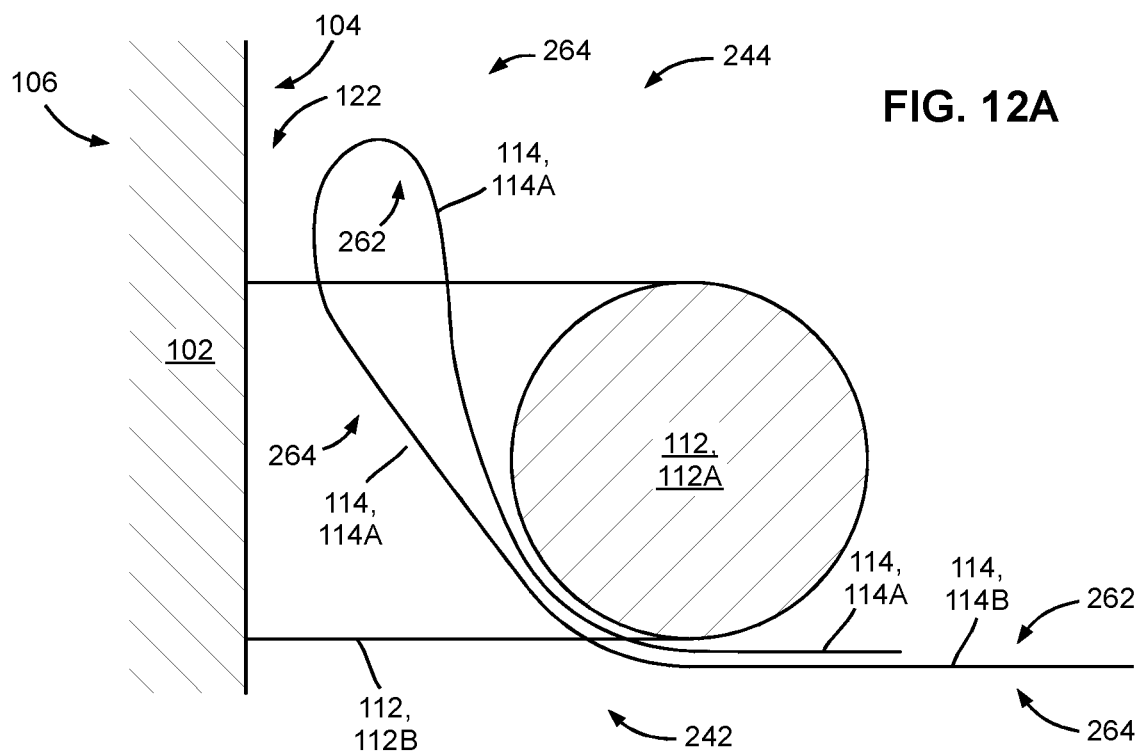

At step 402, the proximal portion 114A of the flexible sheet 114 is folded and extended through the slot 122 from the lower side 242 thereof (see FIG. 12A). At this step, the folded proximal portion 114A has a length sufficient for extending through the slot 122 while maintaining the proximal end 268 of the flexible sheet 114 on the lower side 242 thereof.

Figure 12B:
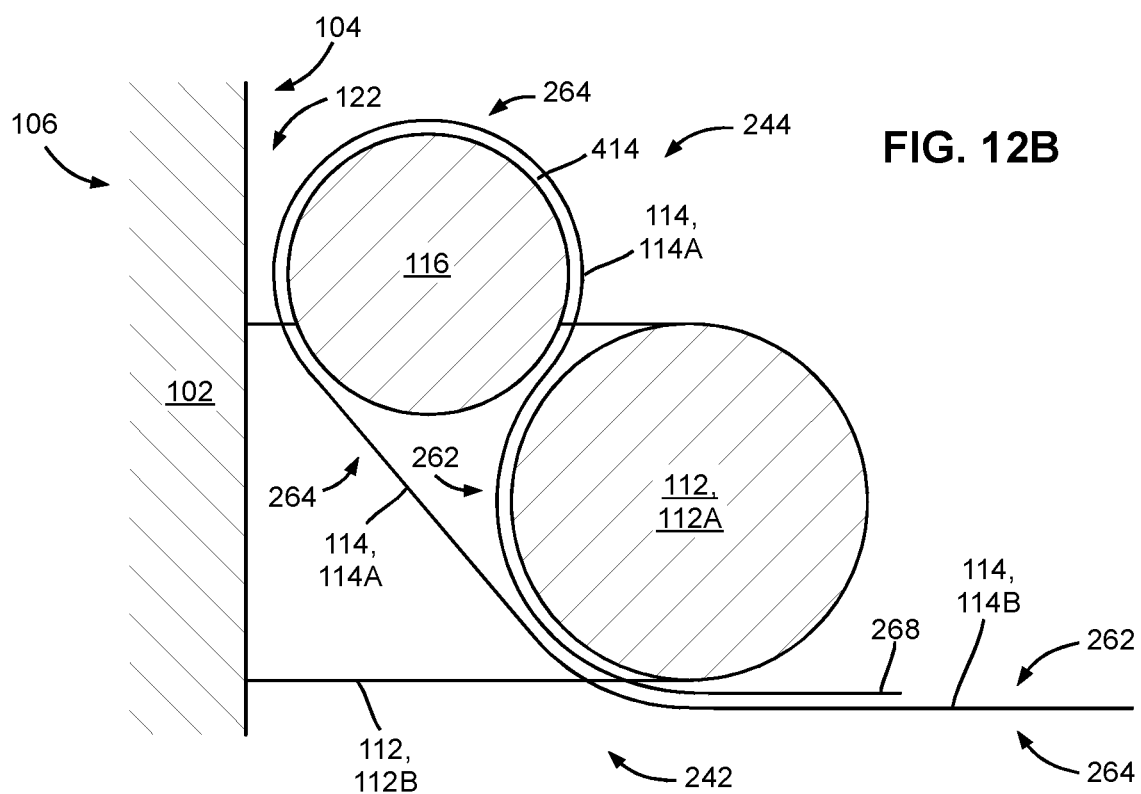

At step 404, the securing rod 116 is inserted into the loop 414 of the folded proximal portion 114A on the upper side 244 of the slot 122 (see FIG. 12B).

In above embodiments, a wrapping-and-separation portion of the flexible sheet 114 (which is a part of the proximal portion 114A) extends between the main anchor-rod section 112A and the securing rod 116 and at least partially wraps about the main anchor-rod section 112A rod and the securing rod 116 on opposite sides of the wrapping-and-separation portion of the flexible sheet 114, thereby separating the main anchor-rod section 112A rod and the securing rod 116 on opposite sides thereof. The proximal portion 114A of the flexible sheet 114 further wraps about the combination of the main anchor-rod section 112A, the securing rod 116, and the wrapping-and-separation portion of the flexible sheet 114 with the proximal and distal ends thereof extending from the upper side 244 of the slot 112, through the slot 112, and extending out of the slot 112 from the lower side 242 thereof.

In some alternative embodiments, the proximal portion 114A of the flexible sheet 114 may only extend between the main anchor-rod section 112A and the securing rod 116 and at least partially wraps about the main anchor-rod section 112A rod and the securing rod 116 on opposite sides of the wrapping-and-separation portion of the flexible sheet 114, thereby separating the main anchor-rod section 112A rod and the securing rod 116 on opposite sides thereof. In other words, the proximal portion 114A of the flexible sheet 114 does not further wrap about the combination of the main anchor-rod section 112A, the securing rod 116, and the wrapping-and-separation portion of the flexible sheet 114.

Accordingly, the processes 200 and 200' in these embodiments may not have steps 212 to 216 (nor FIGS. 5E to 5G).

Figure 13:
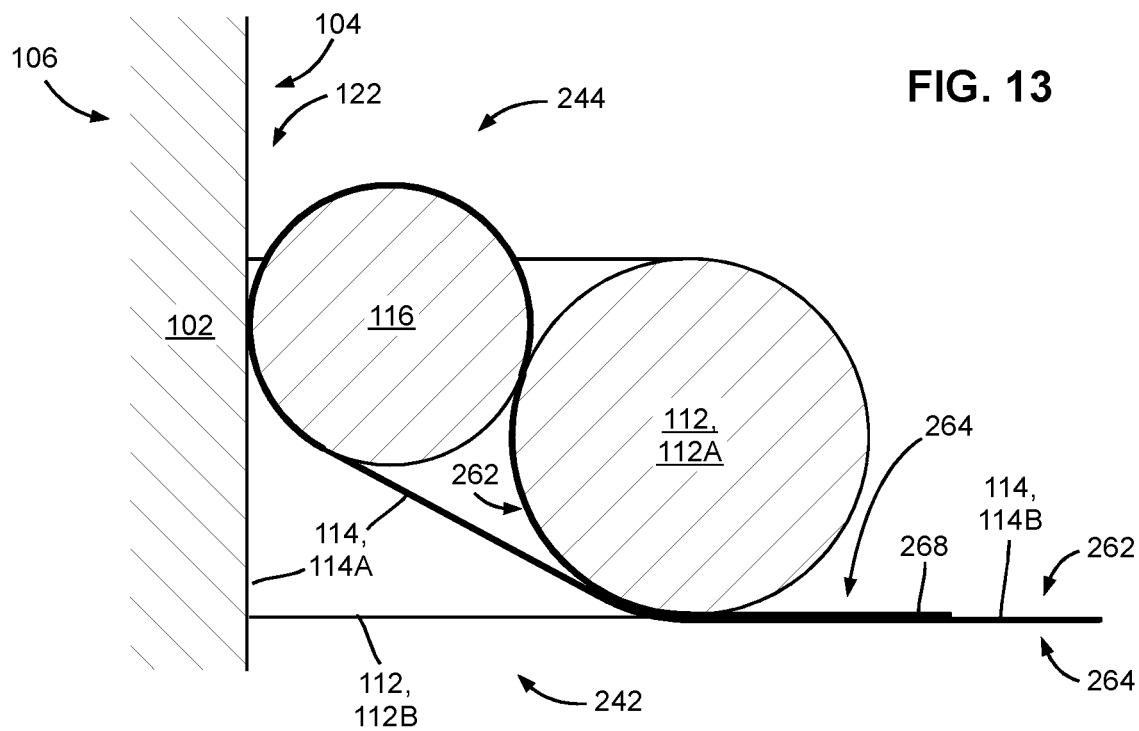
FIG. 13 shows tightening the proximal portion of the flexible sheet to the anchor rod and the securing rod with the anchor rod and the securing rod tightly engaged by pulling both the proximal portion and the distal portion of the flexible sheet away from the rigid panel.

At step 218, the proximal portion 114A of the flexible sheet 114 is tightened to the main anchor-rod section 112A and the securing rod 116 with the main anchor-rod section 112A and the securing rod 116 tightly engaged, by pulling both the proximal portion 114A and the distal portion 114B of the flexible sheet 114 away from the rigid retaining-wall panel 102 (see FIG. 13). The upper surface 262 of the proximal end 268 faces downwardly and may engage the upper surface 262 of the distal portion 114B of the flexible sheet 114.

Figure 14:
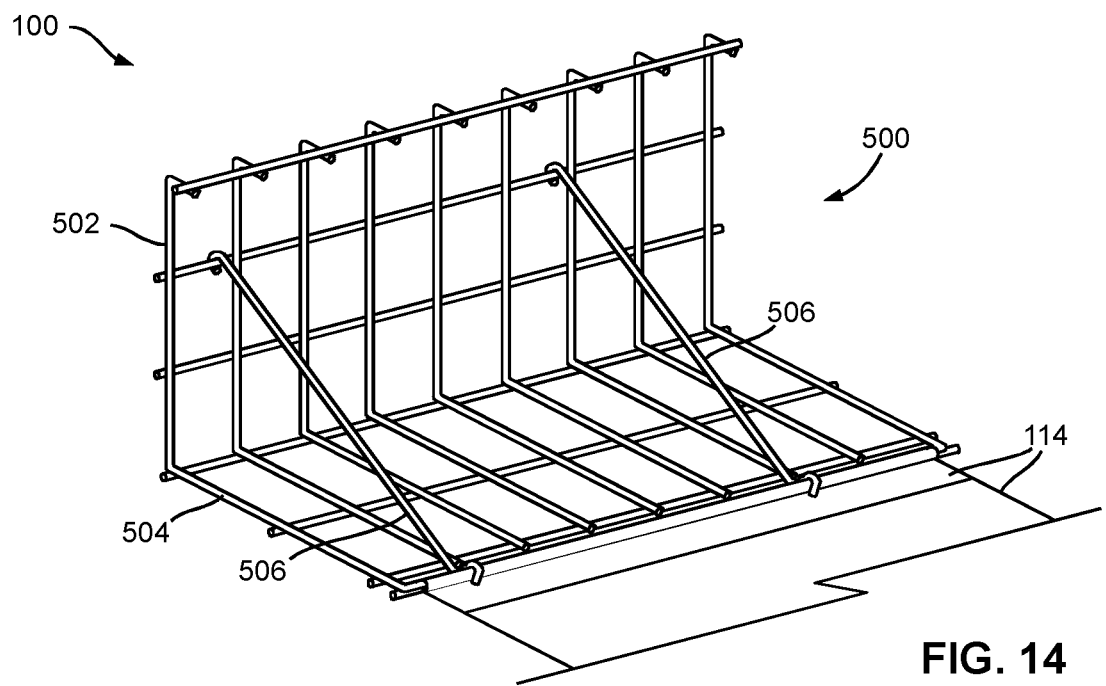
FIG. 14 is a perspective view of a MSE retaining-wall panel system, according to some embodiments of this disclosure, the MSE retaining-wall panel system comprising a cage and a longitudinally forwardly extending flexible reinforcement sheet.
Figure 15A:
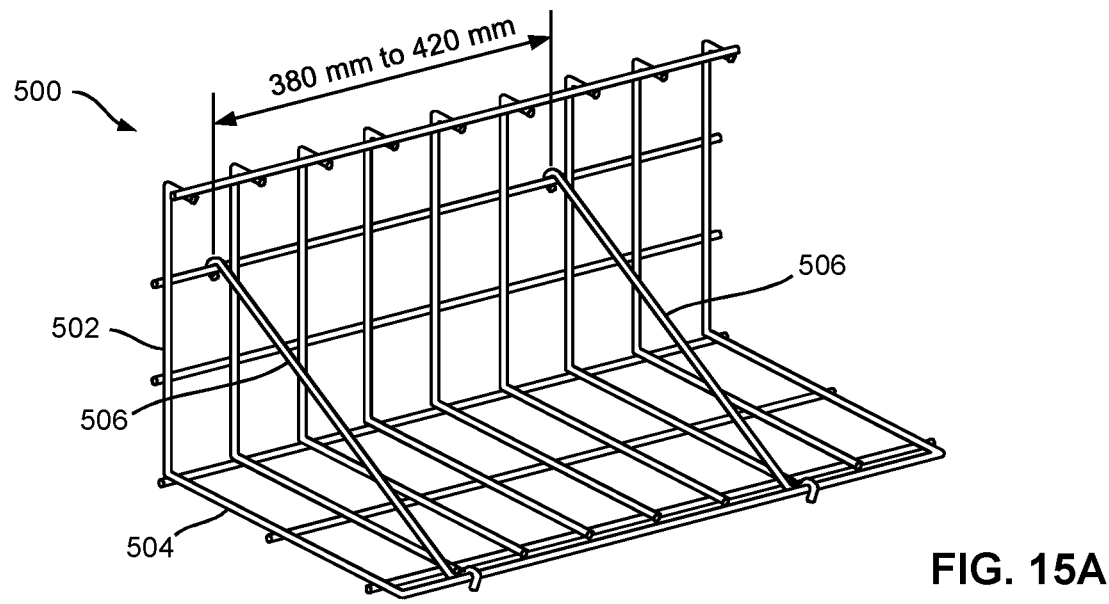
FIG. 15A is a perspective view of the cage of the MSE retaining-wall panel system shown in FIG. 14, the cage comprising a vertical structure, a horizontal structure, and one or more struts engaging the vertical and horizontal structures.
Figure 15B:
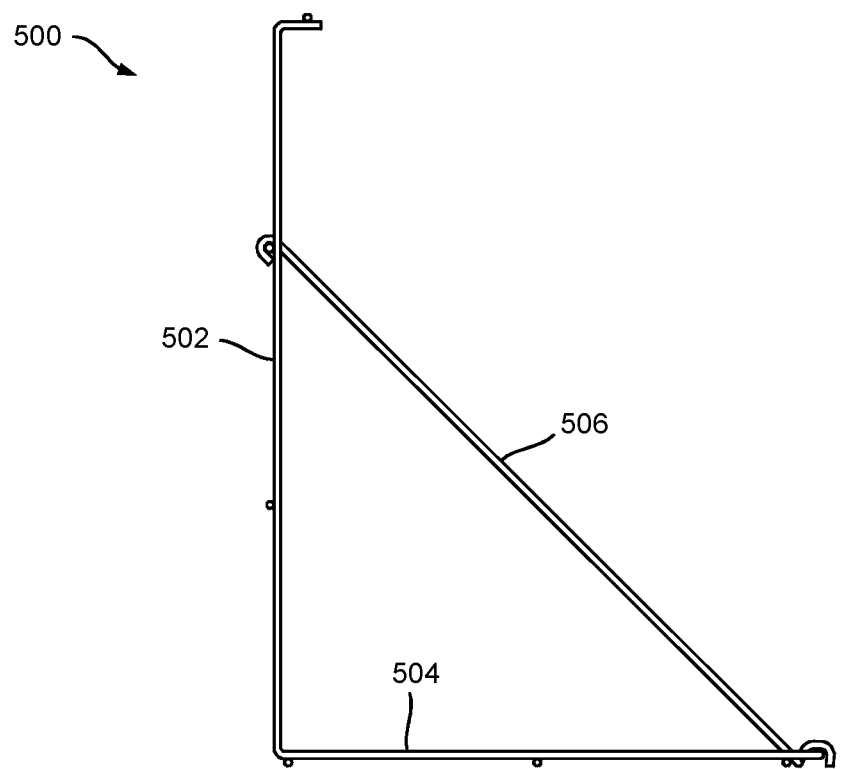
FIG. 15B is a side view of the cage shown in FIG. 15A.
Figure 15C:
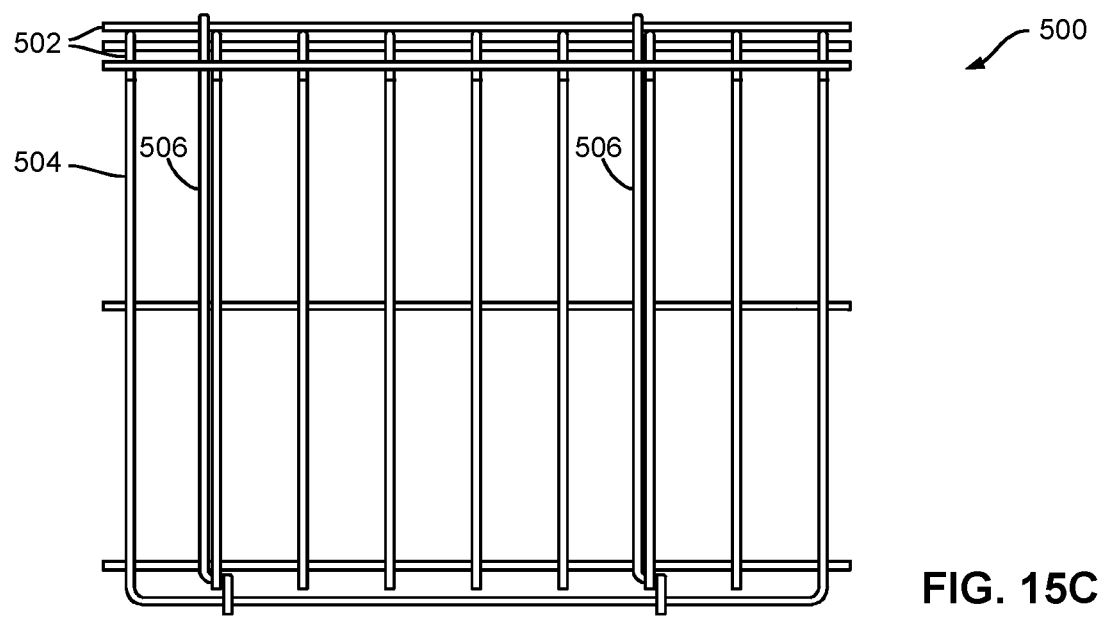
FIG. 15C is a plan view of the cage shown in FIG. 15A.
Figure 15D:
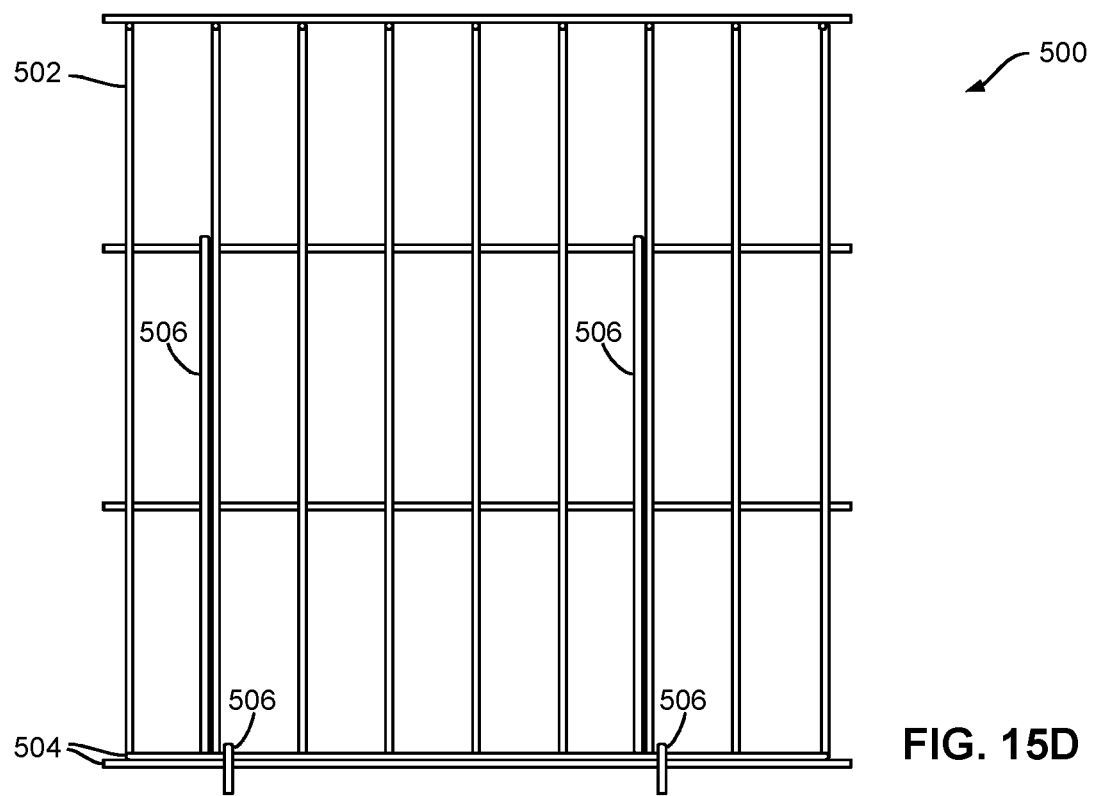
FIG. 15D is a front view of the cage shown in FIG. 15A.
Figure 16D:
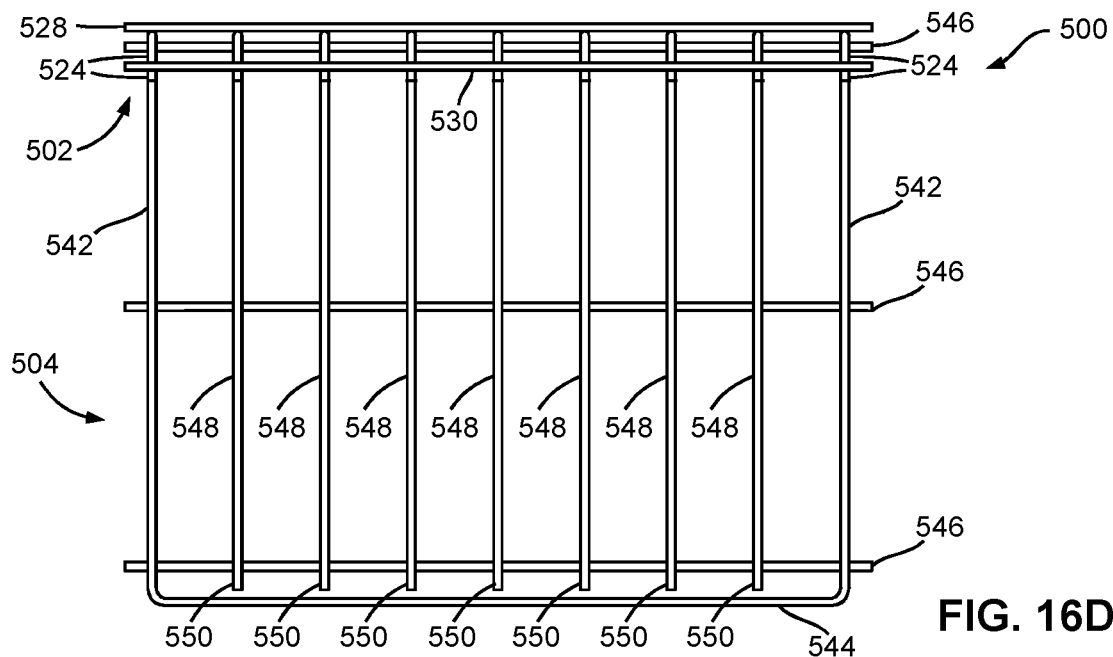
FIG. 16D is a plan view of the vertical and horizontal structures shown in FIG. 16A.
Figure 16E:
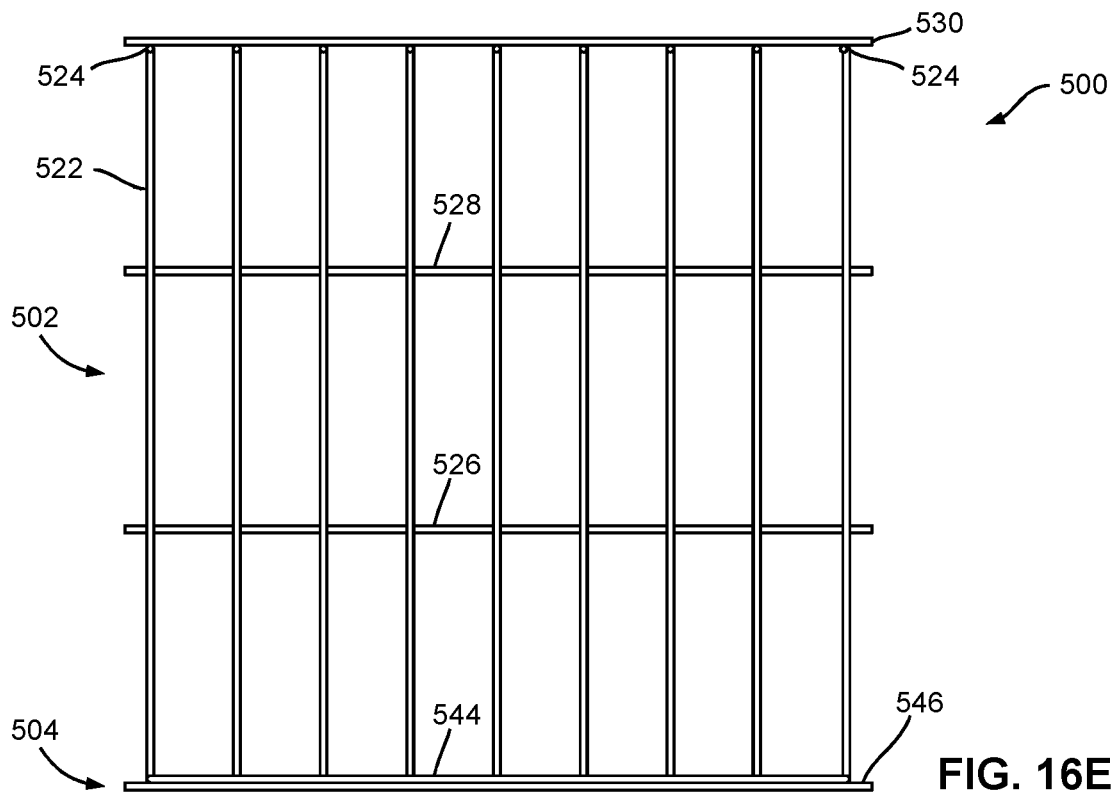
FIG. 16E is a front view of the vertical and horizontal structures shown in FIG. 16A.
Figures 17A, 17B:
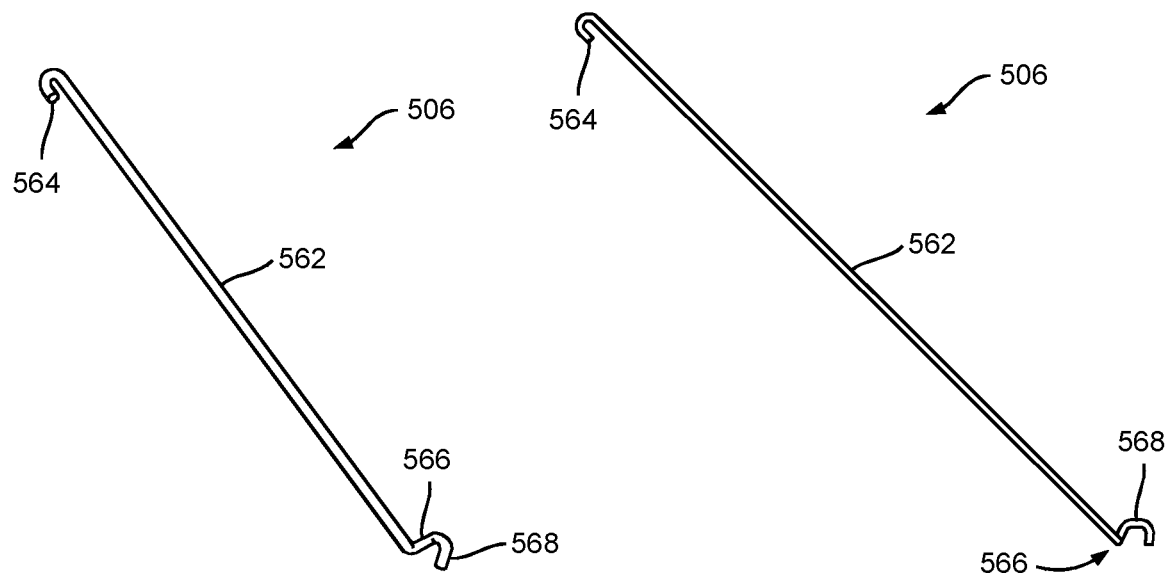
FIG. 17A is a perspective view of a strut of the cage shown in FIG. 15A.
FIG. 17B is a side view of the strut shown in FIG. 17A.
Figures 17C, 17D:
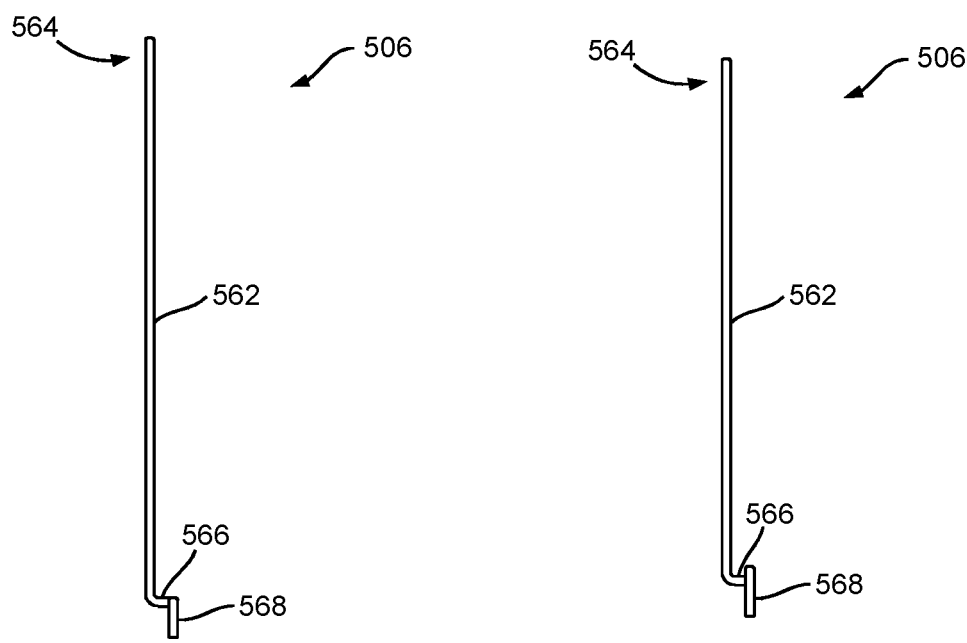
FIG. 17C is a plan view of the strut shown in FIG. 17A.
FIG. 17D is a front view of the strut shown in FIG. 17A.

FIG. 14 shows a MSE retaining-wall panel system 100 according to some embodiments of this disclosure. As shown, the MSE retaining-wall panel system 100 comprises a cage structure 500 for receiving therein a landfilling material (for example, rocks, gravels, earth, soil, and/or the like), and one or more flexible reinforcement sheets 114 coupled to a lower portion of the cage structure 500 (such as the bottom thereof) and extending substantially horizontally along a longitudinal direction.

As shown in FIGS. 15A to 15D, the cage structure 500 comprises a vertical structure 502, a horizontal structure 504 substantially horizontally extending from a lower portion of the vertical structure 502 (such as the bottom thereof) along the longitudinal direction, and one or more struts 506 engaging the vertical and horizontal structures 502 and 504 for forming a cage having one or more triangular structures. In some embodiments, the spacing between neighboring struts is about 380 millimeters (mm) to about 420 mm.

In these embodiments, the vertical and horizontal structures 502 and 504 and the struts 506 are wire structures such as wires, rods, and/or the like made of galvanized steel, stainless steel, or the like with suitable strengths. For ease of description, the terms "wire" and "rod" may be used interchangeably hereinafter.

The detail of the vertical and horizontal structures 502 and 504 is shown in FIGS. 16A to 16E with dimensions according to some embodiments of this disclosure. It is noted that the drawings in this disclosure are for illustrative purposes only and may not be up to scale.

As shown, the vertical structure 502 comprises a pair of vertical wires 522 laterally spaced apart from each other. Each vertical wire 522 comprises an upper portion extending substantially horizontally from the top thereof along the longitudinal direction, thereby forming a seating structure 524 (described in more detail later).

One or more reinforcement bars 526 laterally extend between the pair of vertical wires 522 and are coupled thereto via suitable coupling means such as welding, wire-tying, and/or the like for supporting the vertical wires 522. In these embodiments, the reinforcement bars 526 are coupled to the rear side of the vertical wires 522.

The vertical structure 502 also comprises an upper anchoring structure 528 at a predefined elevation for engaging the one or more struts 506 (described in more detail later). In these embodiments, the upper anchoring structure 528 comprises a wire (also identified using reference numeral 528) laterally extending between the pair of vertical wires 522 and coupled thereto via suitable coupling means to also provide support to the vertical wires 522 (that is, acting as an reinforcement bar).

A plurality of vertical reinforcement wires 548 are laterally distributed between the vertical wires 522 and are coupled to the reinforcement bars 526 and 528. The top portions of the vertical reinforcement wires 548 extend horizontally forwardly in a manner similar to the vertical wires 522 to form the seating structure 524. As will be described in more detail later, the vertical reinforcement wires 548 also horizontally extend in the horizontal structure 504 for structural-reinforcement purposes.

The vertical structure 502 further comprises a delimiting structure 530 (described in more detail later) coupled to the seating structure 524. In these embodiments, the delimiting structure 530 comprises a wire (also identified using reference numeral 530) laterally extending between the pair of vertical wires 522 and coupled to the seating structure 524 thereof via suitable coupling means to also provide support to the vertical wires 522.

The horizontal structure 504 in these embodiments comprises a U-shape structure having a pair of horizontal side-wires 542 laterally spaced apart from each other and each coupled to a respective vertical wire 522, respectively, and a laterally extending front wire 544 coupled to the distal ends of the horizontal side-wires 542.

One or more reinforcement bars 546 laterally extend between the pair of horizontal side-wires 542 and are coupled thereto via suitable coupling means for supporting the horizontal side-wires 542. In these embodiments, the reinforcement bars 546 are coupled to the bottom side of the horizontal side-wires 542.

The horizontal structure 504 also comprises one or more lower anchoring structures 548 on the rear side of the front wire 544 at a predefined distance thereto for engaging the one or more struts 506 (described in more detail later). In these embodiments, the lower anchoring structures 548 comprise one or more wires longitudinally extending from the vertical reinforcement wires 548 and coupled to the one or more reinforcement bars 546 with the distal ends 550 of the one or more longitudinally extending wires 548 positioned at the predefined distance to the front wire 544.

FIGS. 17A to 17D show the strut 506. As shown, the strut 506 comprises an elongated body 562, an upper hook 564 at a first end of the elongated body 562 for engaging the upper anchoring structure 528, and an upward-facing first lower hook 566 and a downward-facing second lower hook 568 at a second end of the elongated body 562 opposite to the first end. As will be described in more detail below, the first lower hook 566 is for engaging the lower anchoring structure 548 from the bottom side thereof and the second lower hook 568 is for engaging the front wire 544 from the top side thereof.

In these embodiments, the strut 506 is made of an elongated wire (also identified using reference numeral 506) with a curved first end forming the upper hook 564. The second end of the elongated wire 506 first extends substantially laterally for a predefined length. The second end of the elongated wire 506 then extends upwardly and subsequently downwardly curved to form the downward-facing second lower hook 568. The second hook 568 and the elongated body 562 forms the upward-facing first lower hook 566.

Figure 18A:
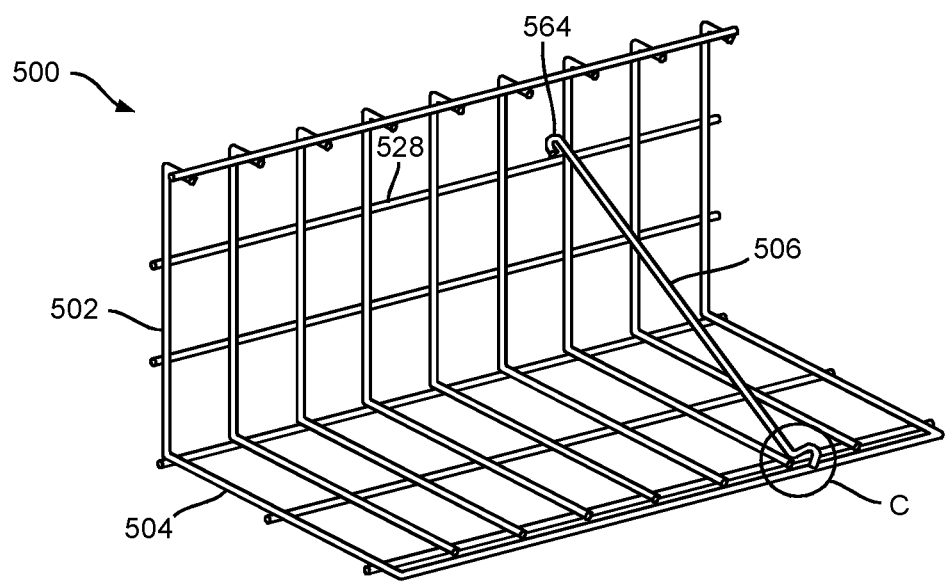
FIG. 18A is a perspective view of the cage shown in FIG. 15A showing a strut shown in FIG. 17A to be installed onto the vertical and horizontal structures shown in FIG. 16A.
Figure 18B:
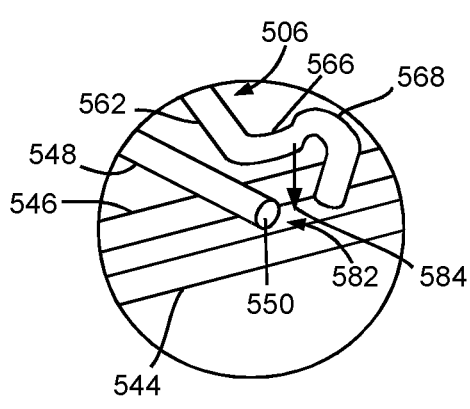
FIG. 18B is an enlarged perspective view of the portion C of the cage shown in FIG. 18A.

As shown in FIGS. 18A and 18B, when engaging a strut 506 with the vertical and horizontal structures 502 and 504, one may first slide the first lower hook 566 of the strut 506 through the gap 582 between the front wire 544 and the distal end 550 of a longitudinally extending wire 548 (which is a part of the lower anchoring structure 548) from the top side thereof, as indicated by the arrow 584. As shown, the second lower hook 568 is positioned above the front wire 544 and the opening of the second lower hook 568 faces the front wire 544.

Figure 18C:
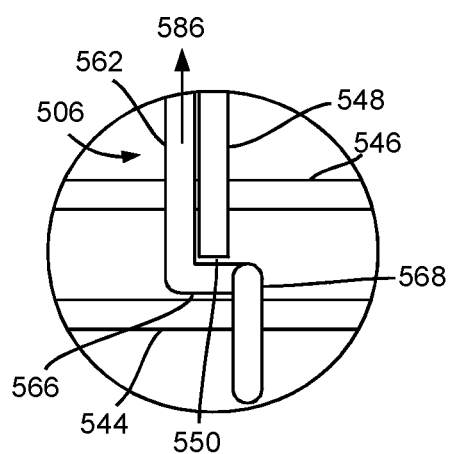
FIG. 18C is an enlarged plan view of the portion C of the cage shown in FIG. 18A.

As shown in FIG. 18C, after the first lower hook 566 is positioned below the distal end 550 of the wire 548 and the second lower hook 568 is in contact with the front wire 544, the strut 506 is then pulled rearwardly and upwardly as indicated by the arrow 586 to engage the upward-facing first lower hook 566 with the wire 548 (in other words, engaging with the lower anchoring structure 548) and engage the second lower hook 568 with the front wire 544.

Figure 19A:
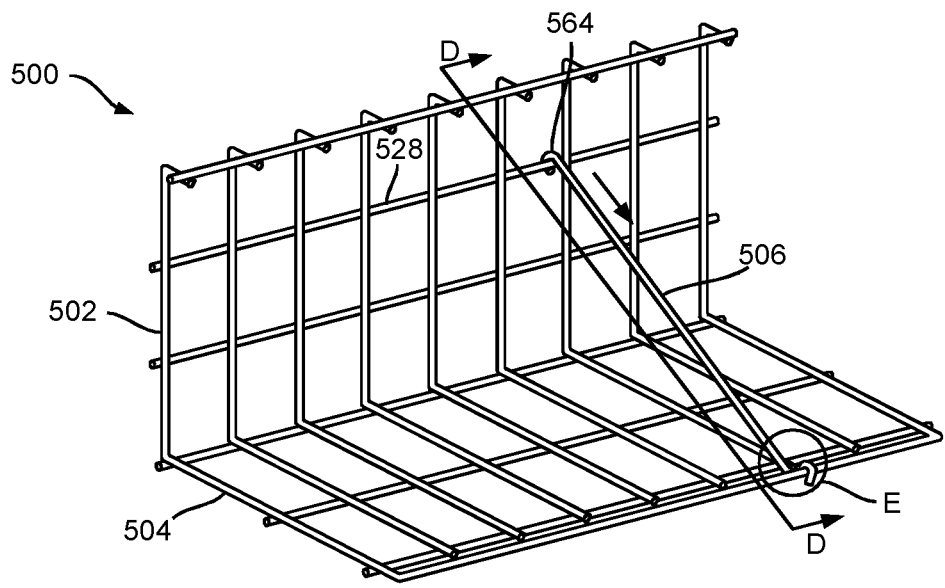
FIG. 19A is a perspective view of the cage shown in FIG. 15A showing the strut shown in FIG. 17A installed onto the vertical and horizontal structures shown in FIG. 16A.
Figure 19B:
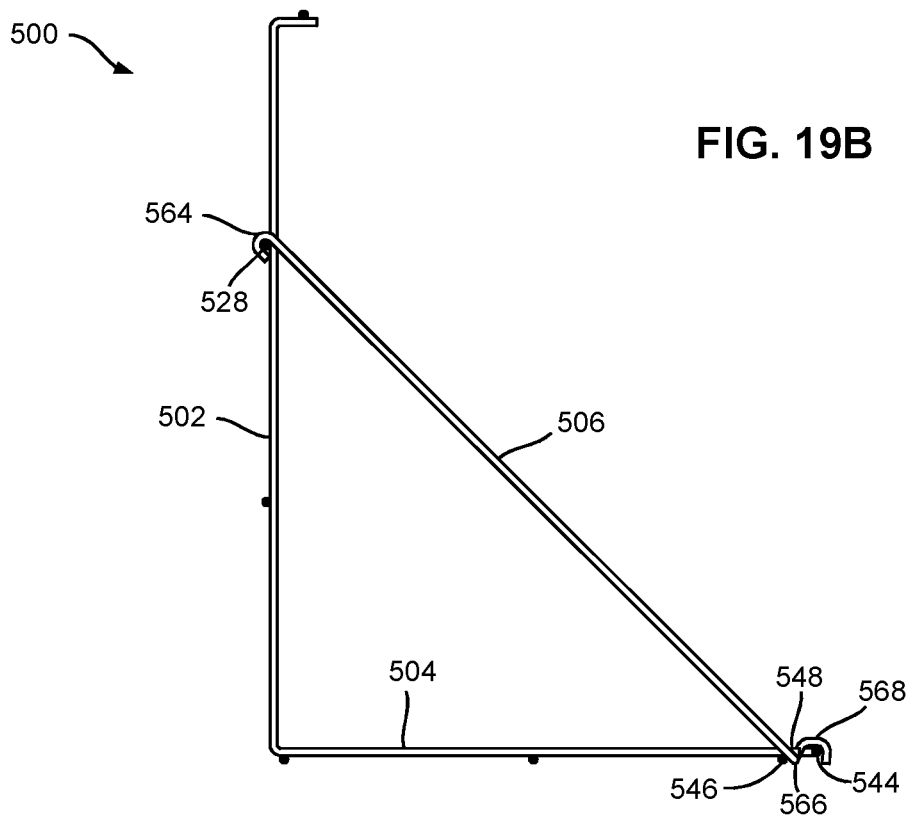
FIG. 19B is a cross-sectional view of the C of the cage shown in FIG. 19A along the cross-section line D-D.
Figure 20A:
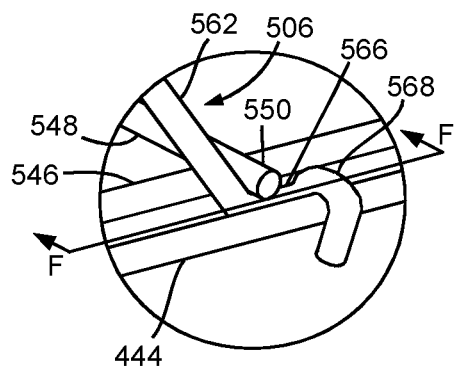
FIG. 20A is an enlarged perspective view of the portion E of the cage shown in FIG. 19A.
Figure 20B:
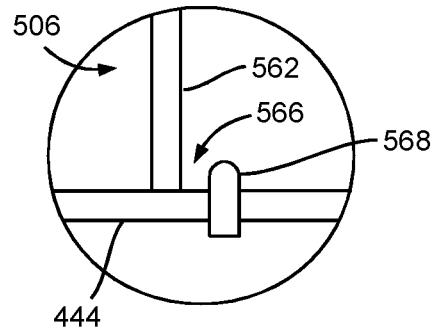
FIG. 20B is an enlarged front view of the portion E of the cage shown in FIG. 19A.
Figure 20C:
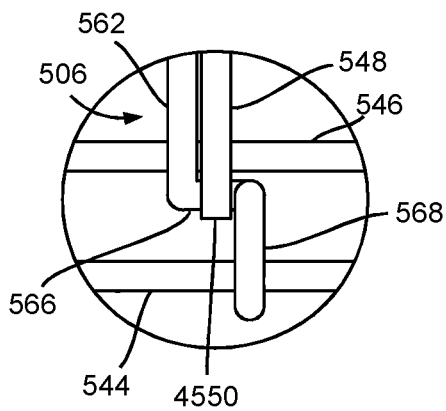
FIG. 20C is an enlarged plan view of the portion E of the cage shown in FIG. 19A.
Figure 20D:
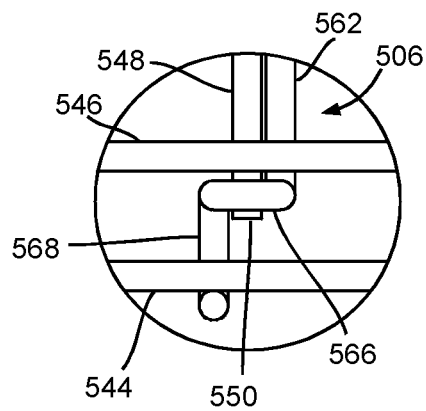
FIG. 20D is an enlarged bottom view of the portion E of the cage shown in FIG. 19A.
Figure 20E:
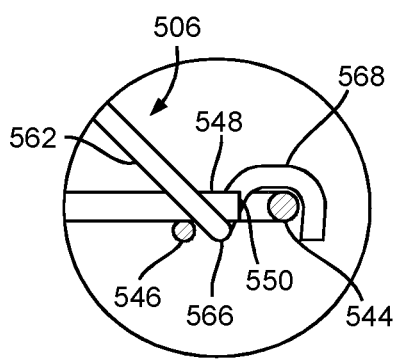
FIG. 20E is an enlarged cross-sectional view of the portion E of the cage shown in FIG. 19A along the cross-section line D-D.
Figure 20F:
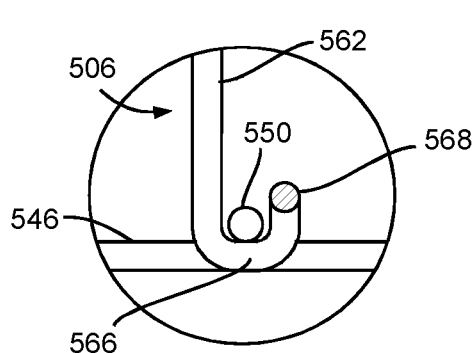
FIG. 20F is an enlarged cross-sectional view of the portion E of the cage shown in FIG. 20A along the cross-section line F-F.

In these embodiments, the horizontal structure 404 is slightly flexible. Therefore, the rearward and upward pulling of the strut 506 cause the horizontal structure 404 to upwardly flex thereby allowing the upper hook 564 to pass the upper anchoring structure 528. As shown in FIGS. 19A and 19B, after releasing the pulling of the strut 506 or after pushing the strut 506 forwardly and downwardly, the upper hook 564 engages the upper anchoring structure 528. The strut 506 thus engages the vertical and horizontal structures 402 and 404 thereby forming a triangular structure for accommodating a landfilling material therein with sufficient strength and stability. Other strut 506 may be installed in a similar manner.

The engagement of the upper hook 564 and the upper anchoring structure 528 prevents the strut 506 from moving forwardly, upwardly, or downwardly. The engagement of the first lower hook 566 and the lower anchoring structure 548 preventing the strut 506 from moving downwardly. The engagement of the second lower hook 568 and the front wire 544 prevents the strut 506 from moving upwardly. FIGS. 20A to 20E shows the detail of the lower hooks 566 and 568 engaging the lower anchoring structure 548 and the front wire 544, respectively.

In some embodiments, the vertical structure 402 may be slightly flexible. Therefore, when pulling the strut 506 rearwardly and upwardly, one may also flex the upper portion of the vertical structure 402 forwardly to engage the upper hook 564 of the strut with the upper anchoring structure 528.

The assembled cage 500 is shown in FIGS. 15A to 15D. As those skilled in the art will appreciate, the cage 500 may be used without the flexible reinforcement sheets 114 in some embodiments.

In the embodiments shown in FIG. 14, the cage 500 is used with one or more flexible reinforcement sheets 114 to form a MSE retaining-wall panel system 100.

Figure 21A:
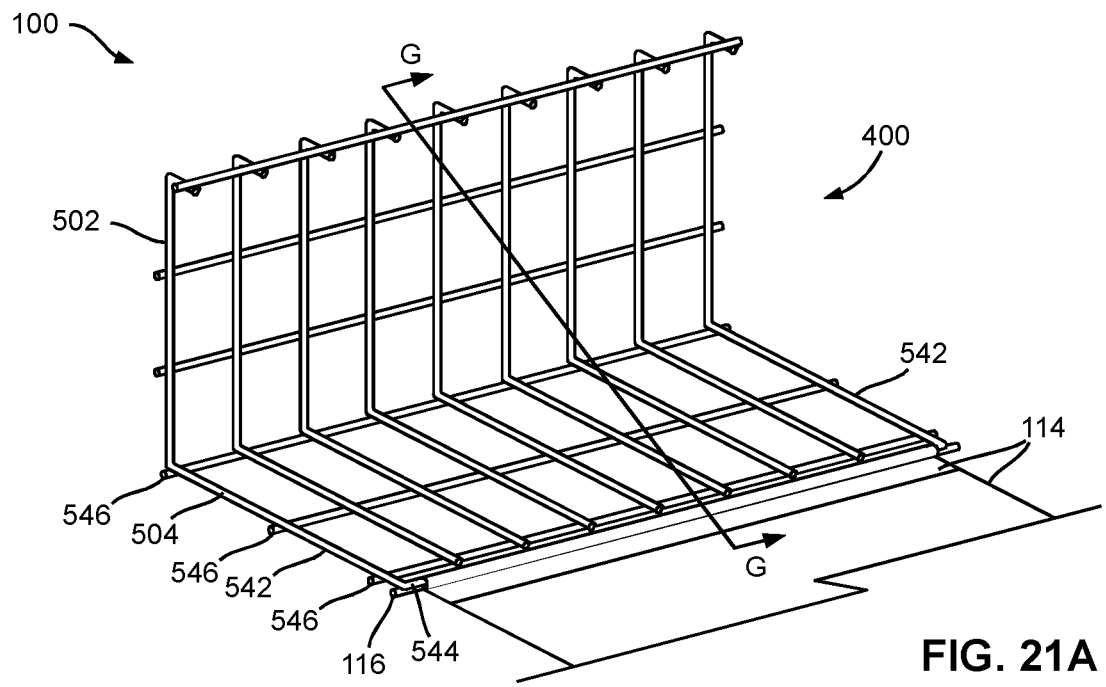
FIG. 21A is a perspective view of the vertical and horizontal structures of the cage shown in FIG. 15A, showing the coupling of a flexible reinforcement sheet to the horizontal structure.
Figure 21B:
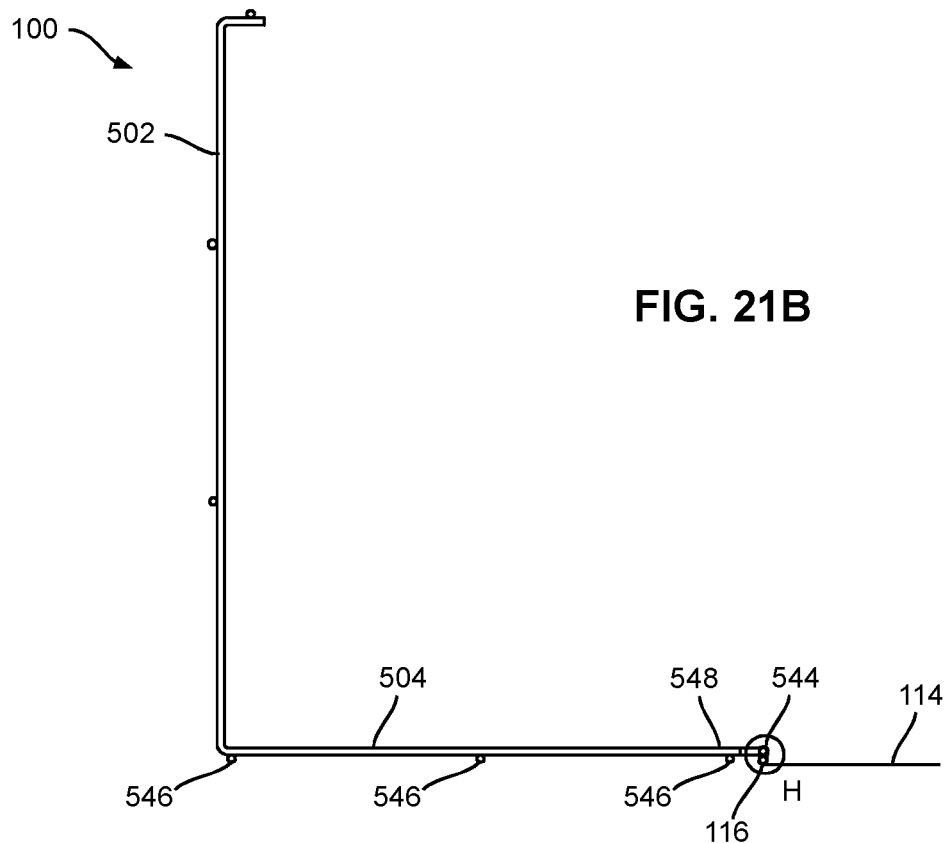
FIG. 21B is a cross-sectional view of the vertical and horizontal structures of the cage shown in FIG. 21A along the cross-section line G-G showing the coupling of the flexible reinforcement sheet to the horizontal structure.
Figure 21C:
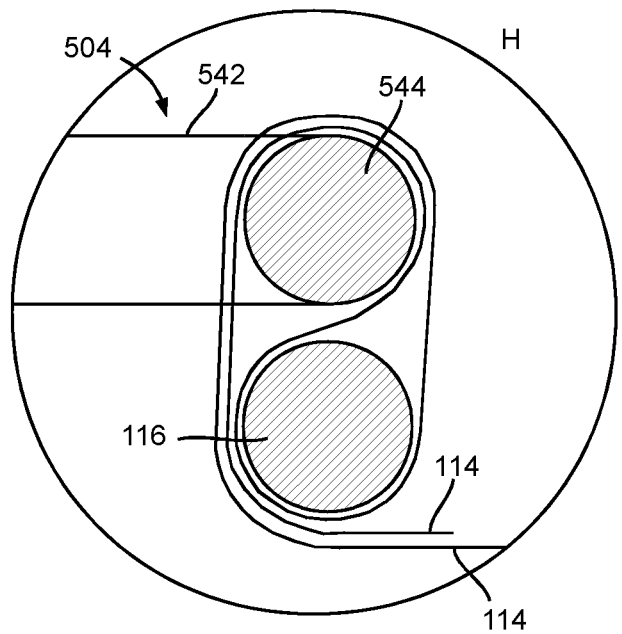
FIG. 21C is an enlarged view of the portion H of the cross-sectional view of the horizontal structure shown in FIG. 21B.

As shown in FIGS. 21A to 21C, a flexible reinforcement sheet 114 may be tied or otherwise coupled to the front wire 544 using a securing rod 116. In these embodiments, the securing rod 116 has a length sufficient for engaging a plurality of the struts 506 and/or the horizontal side-wires 542. The coupling of the flexible reinforcement sheet 114 to the front wire 544 and the securing rod 116 is in a manner similar to that shown in FIGS. 1 to 13.

Figure 22A:
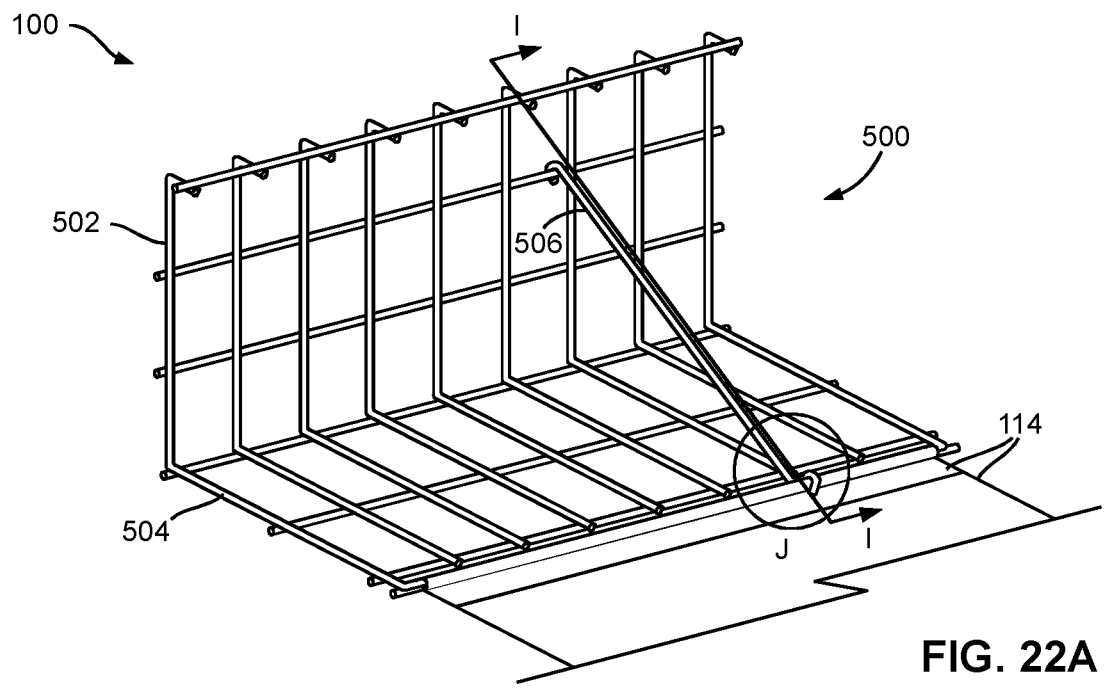
FIG. 22A is a perspective view of the cage shown in FIG. 15A with the flexible reinforcement sheet coupled to the horizontal structure and with a strut shown in FIG. 17 installed thereon.
Figure 22B:
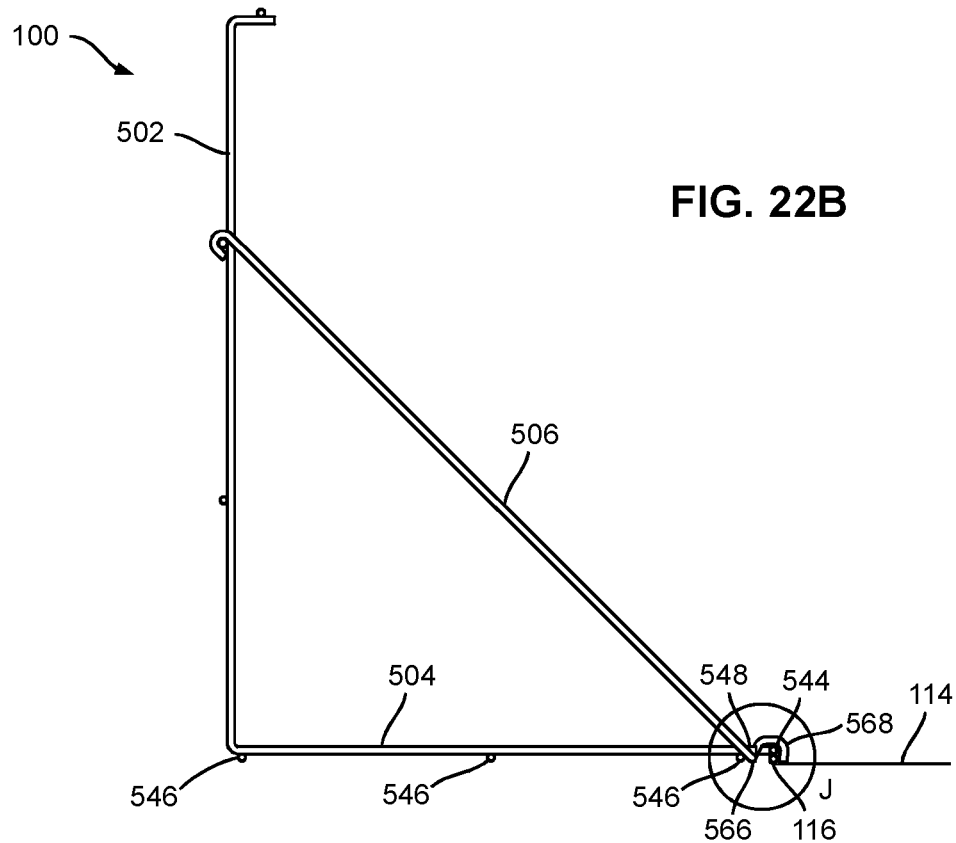
FIG. 22B is a cross-sectional view of the cage shown in FIG. 22A along the cross-section line I-I.
Figure 22C:
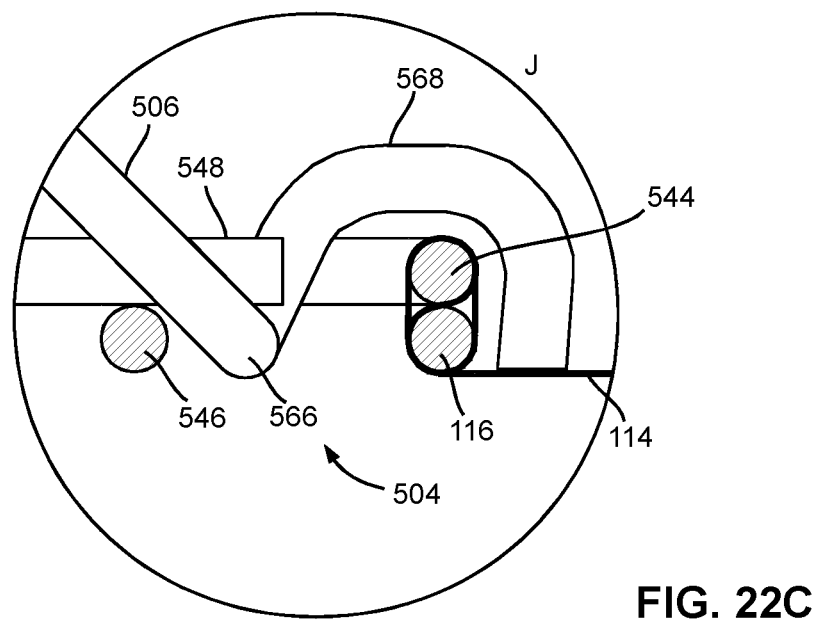
FIG. 22C is an enlarged view of the portion J of the cross-sectional view of the cage shown in FIG. 22B.

As shown in FIGS. 22A to 22C, the struts 506 are then installed to the vertical and horizontal structures 502 and 504 as described above, and the flexible reinforcement sheet 114 is pulled from at least one end thereof to tighten the flexible reinforcement sheet 114 about and between the front wire 544 and the security rod 116 such that the front wire 544 and the security rod 116 are in pressurized contact with each other via a wrapping-and-separation portion of the flexible reinforcement sheet 114 therebetween. In other words, at the contact point of the front wire 544 and the securing rod 116, the wrapping-and-separation portion of the flexible reinforcement sheet 114 is pressed by the front wire 544 and the securing rod 116 on opposite sides thereof. Consequently, the friction between the flexible reinforcement sheet 114, the front wire 544, and the securing rod 116 keeps them tightly engaged.

In some embodiments, the securing rod 116 may be made of a material such as plastic, HDPE, hard rubber, and/or the like that may slightly deform or change shape under pressure. When the flexible sheet 114 is tied to the front wire 544 and the securing rod 116, the pressure applied to the securing rod 116 may force it to slightly deform or otherwise change shape, thereby "squeezing" into the space between the second lower hook 568 of the strut 506 and the front wire 544, which further increases the contact surface thereof against the flexible sheet 114 and the front wire 544, and subsequently further secures the engaged flexible sheet 114, the front wire 544, and the securing rod 116.

Figure 23:
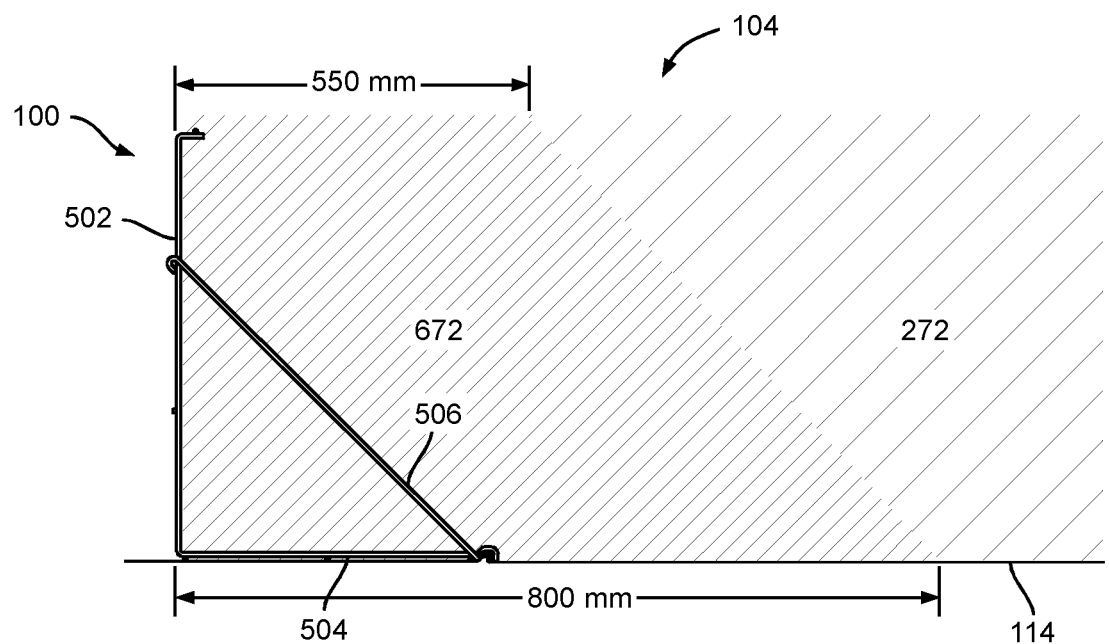
FIG. 23 is a schematic cross-sectional view of the MSE retaining-wall panel system shown in FIG. 14 with landfilling materials filled to the load-bearing side thereof.

The so-formed MSE retaining-wall panel system 100 is shown in FIG. 14 wherein the longitudinally opposite ends of the flexible sheet 114 are extended forwardly from the cage 500. As further shown in FIG. 23, a first landfilling material 672 such as rocks, gravels, and/or earth may be filled in the cage 500 and a surrounding area on the load-bearing side 104 forming a ramp at the forward end thereof. In some embodiments, the filled first landfilling material 672 may have a top length of about 550 mm and a bottom length of about 800 mm.

A second landfilling material 272 may also be filled to the load-bearing side 104 of the MSE retaining-wall panel system 100 adjacent the filled first landfilling material 672. In some embodiments, the first and second landfilling materials may be different landfilling materials (for example, the first landfilling material may be rocks and/or gravels and the second landfilling material may be earth). In some other embodiments, the first and second landfilling materials may be the same type of landfilling material.

Figure 24A:
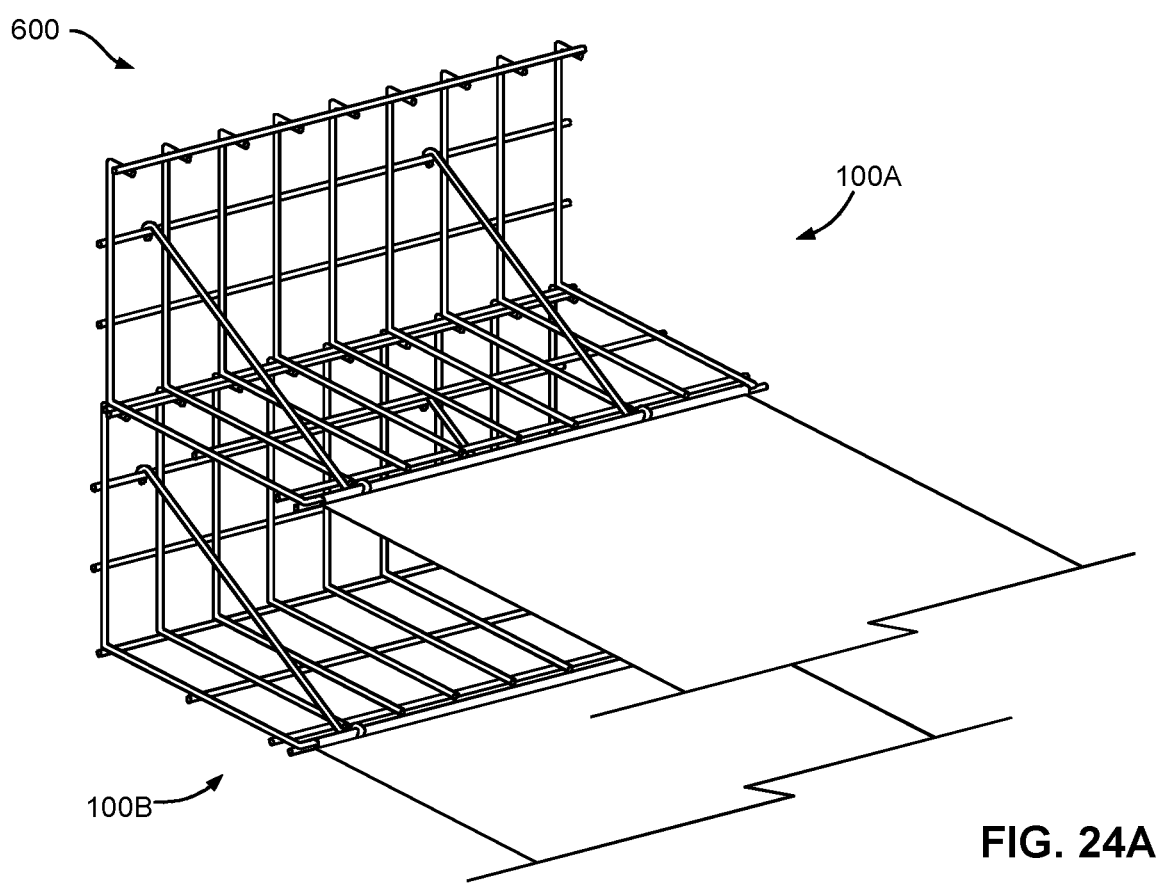
FIG. 24A is a perspective view of a MSE retaining-wall panel system, according to some embodiments of this disclosure.

A plurality of MSE retaining-wall panel systems 100 may be vertically stacked (after filling of landfilling materials, not shown) to form a stacked MSE retaining-wall panel system 600 of a greater height. For example, FIGS. 24A to 24C shows a stacked MSE retaining-wall panel system 600 formed by two vertically stacked MSE retaining-wall panel systems 100A and 100B. As more clearly shown in FIG. 24C, the rearmost reinforcement bar 546A of the horizontal structure 504A of the upper MSE retaining-wall panel system 100A acts as a delimiting foot and seats on the seating structure 524B of the lower MSE retaining-wall panel system 100B on the rear side of the delimiting structure 530B thereof. By carefully defining the positions of the delimiting foot 546 and the delimiting structure 530 on the MSE retaining-wall panel system 100 (for example, the distances thereof to the rear end of the vertical structure 502), the stacked MSE retaining-wall panel system 600 may have a sloped rear surface (represented by the broken line 602) at an angle α to the vertical direction (represented by the broken line 604). In some embodiments, the angle α is about 1° to 2°. In some other embodiments, the angle α may be about 0° to 25°. In some other embodiments, the angle α may be about 0° to 45°.

Figure 25A:
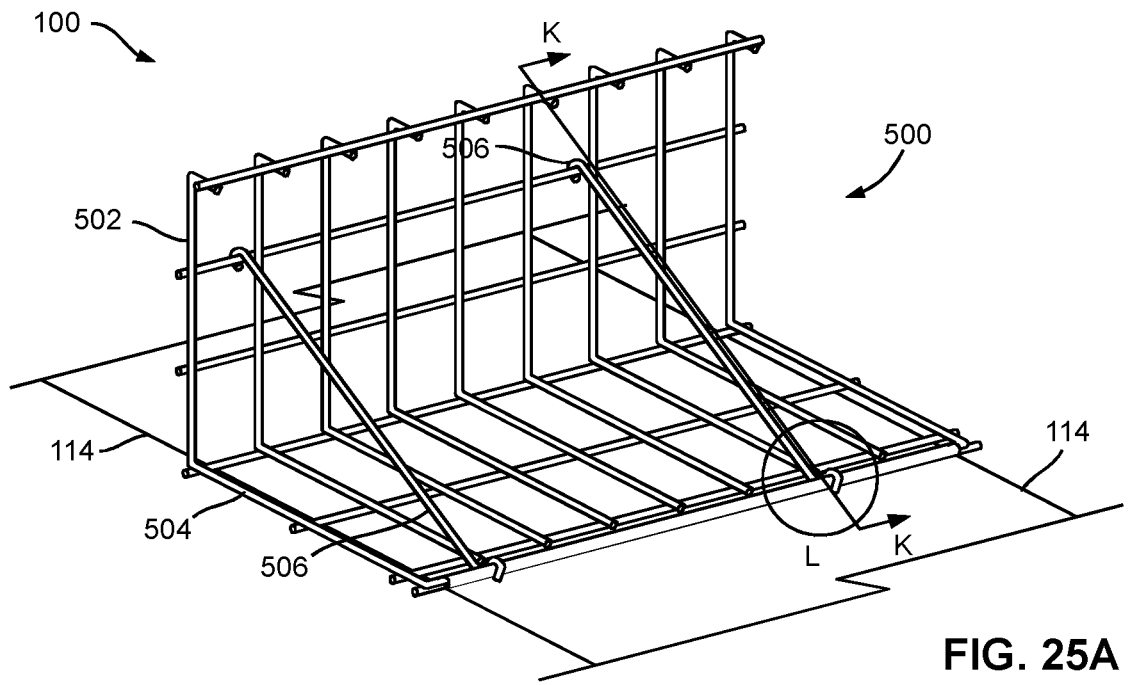
FIG. 25A is a perspective view of a MSE retaining-wall panel system, according to some embodiments of this disclosure, wherein the flexible reinforcement sheet extend along longitudinally opposite directions.
Figure 25B:
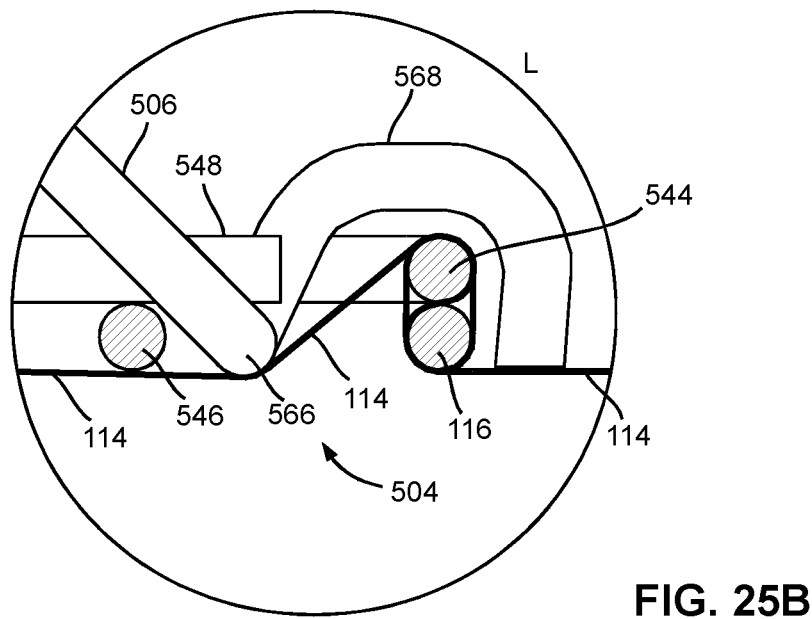
FIG. 25B is an enlarged view of the portion L of a cross-sectional view of the MSE retaining-wall panel system in FIG. 24A along the cross-section line K-K.
Figure 26A:
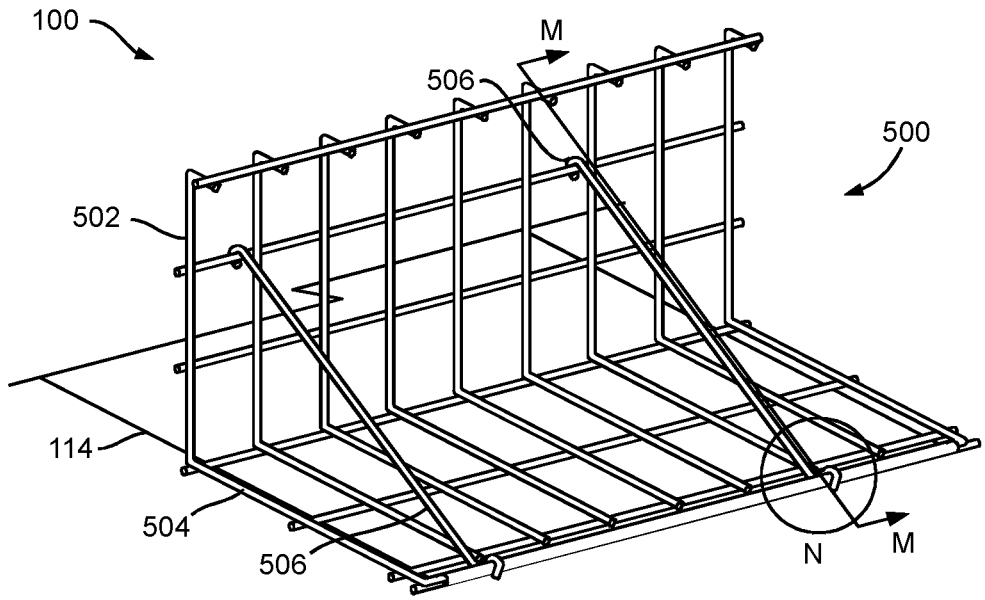
FIG. 26A is a perspective view of a MSE retaining-wall panel system, according to some embodiments of this disclosure, wherein the flexible reinforcement sheet extend longitudinally rearwardly.
Figure 26B:
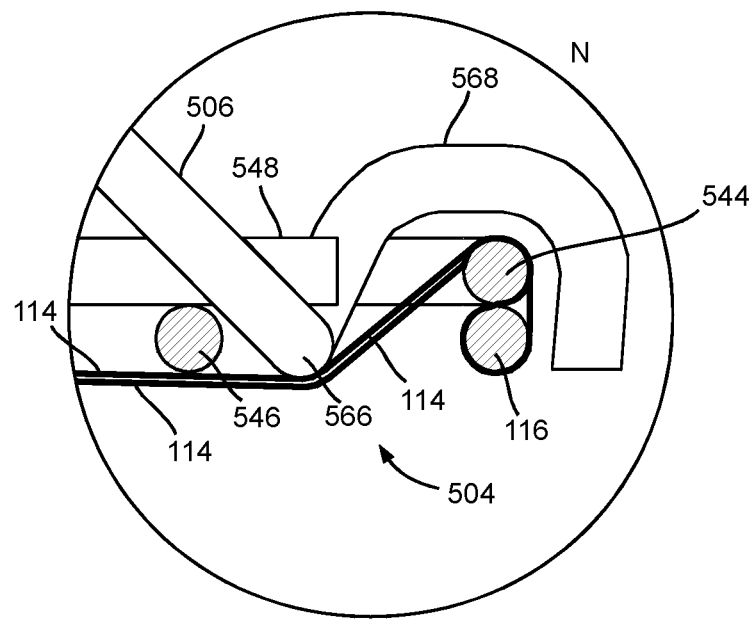
FIG. 26B is an enlarged view of the portion N of a cross-sectional view of the MSE retaining-wall panel system in FIG. 26A along the cross-section line M-M.

In the embodiments shown in FIGS. 14, 23, and 24A to 24C, both ends of the flexible reinforcement sheet 114 extend forwardly on the load-bearing side 104. In some embodiments as shown in FIGS. 25A and 25B, both ends of the flexible reinforcement sheet 114 extend toward opposite longitudinal directions. In some embodiments as shown in FIGS. 26A and 26B, both ends of the flexible reinforcement sheet 114 extend longitudinally rearwardly (the overlapped, longitudinally extending flexible reinforcement sheet portions 114 are slightly separated in FIG. 26B for ease of illustration).

Figure 27:
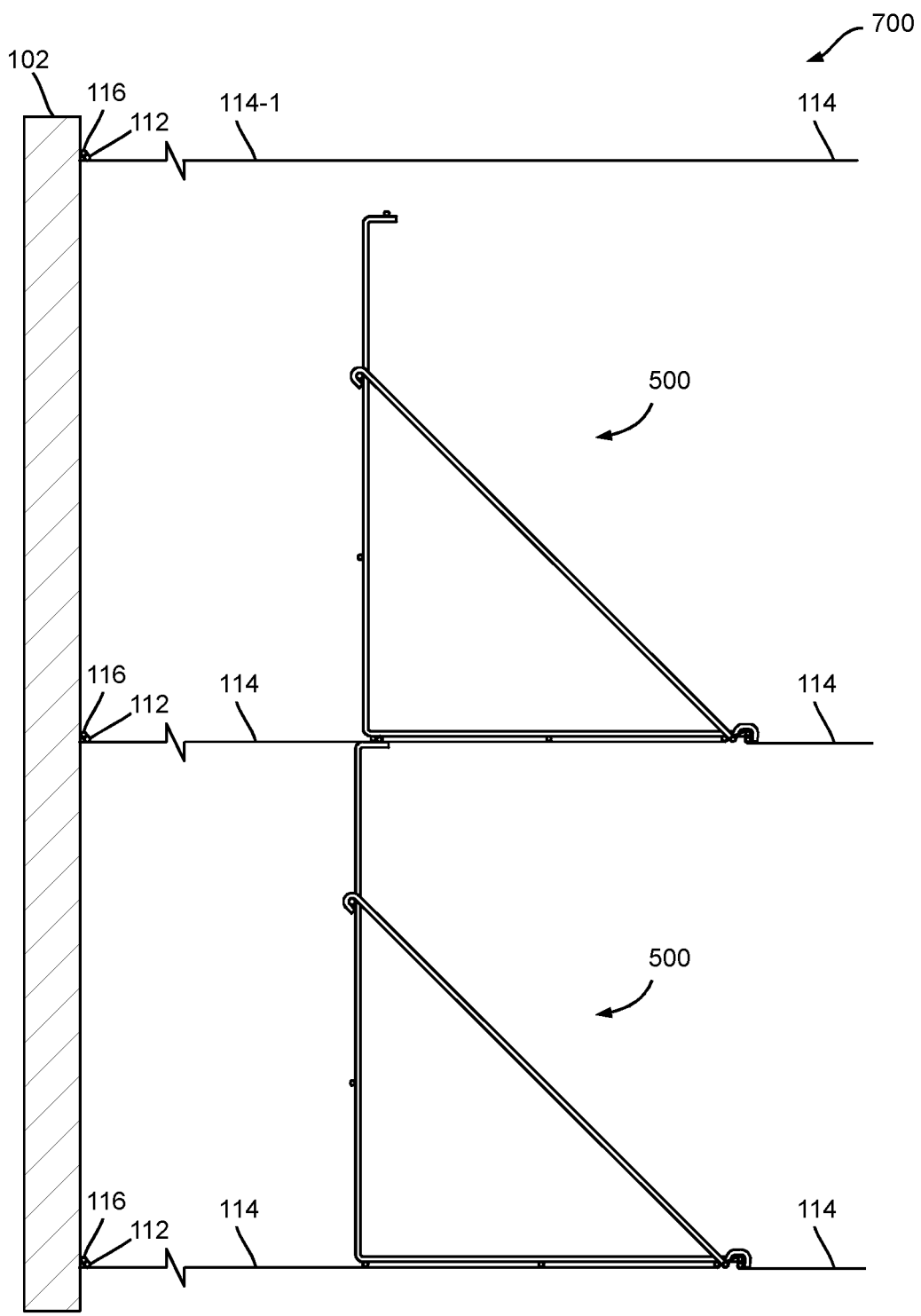
FIG. 27 is a schematic cross-sectional view of a MSE retaining-wall panel system according to some embodiments of this disclosure.

In some other embodiments as shown in FIG. 27, the MSE retaining-wall panel system 100 may comprise one or more cages 500 and a rigid panel 102 such as a concrete panel, plastic panel, stone panel, steel panel, wire-mesh panel, or the like. On the load-bearing side thereof, the rigid panel 102 comprises one or more anchor rods 112 similar to that shown in FIG. 1 for tying one or more flexible reinforcement sheets 114 using one or more securing rods 116 as described above. Some of the one or more flexible reinforcement sheets 114 are then tied to respective cages 500 as described above and further extended forwardly. As shown in FIG. 27, some flexible reinforcement sheets 114-1 may extend from the rigid panel 102 and are not tied to any cage 500. Rocks, gravels, and/or earth may be filled onto the load-bearing side.

Figure 28A:
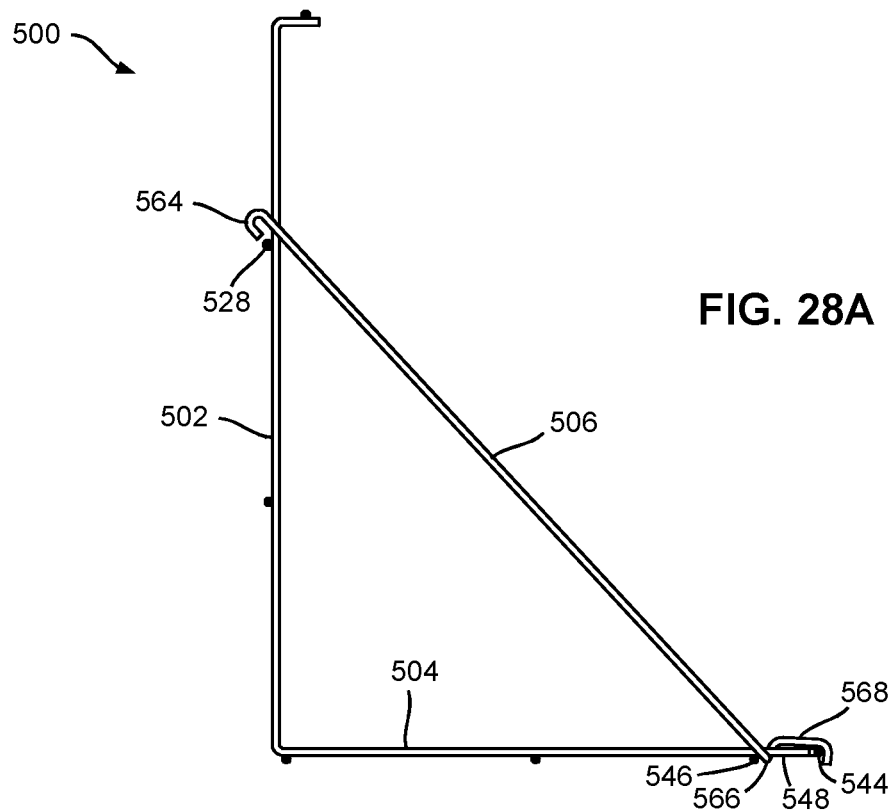
FIGS. 28A and 28B are side views of the cage shown in FIG. 15A, according to some embodiments of this disclosure.
Figure 28B:
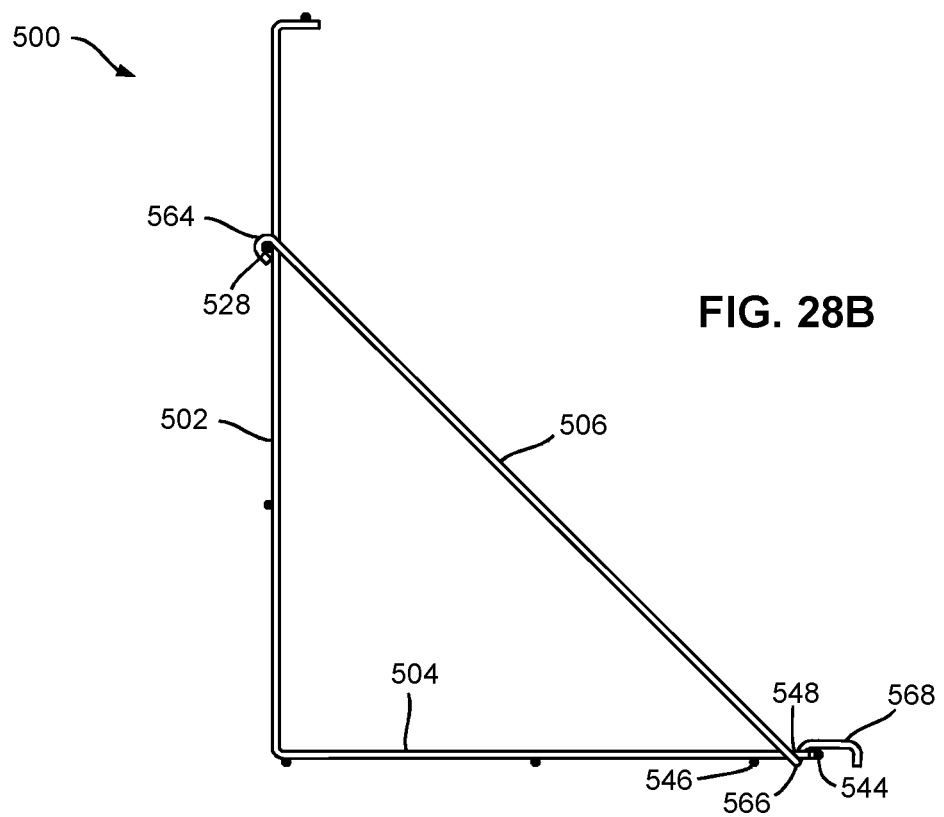
Figures 29A, 29B:
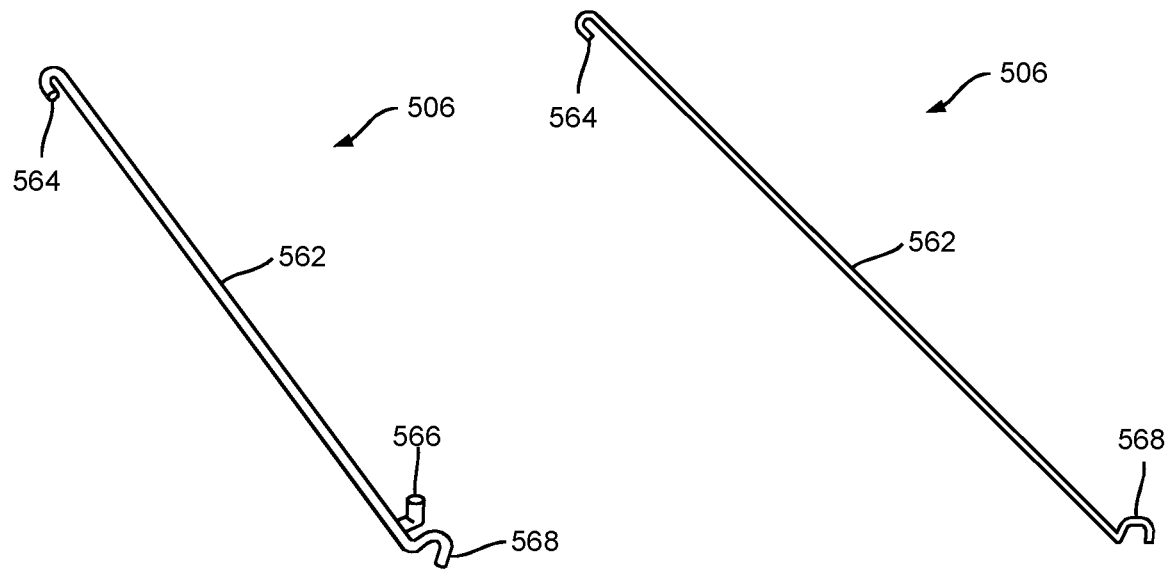
FIG. 29A is a perspective view of a strut of the cage shown in FIG. 15A, according to some embodiments of this disclosure.
FIG. 29B is a side view of the strut shown in FIG. 29A.
Figures 29C, 29D:
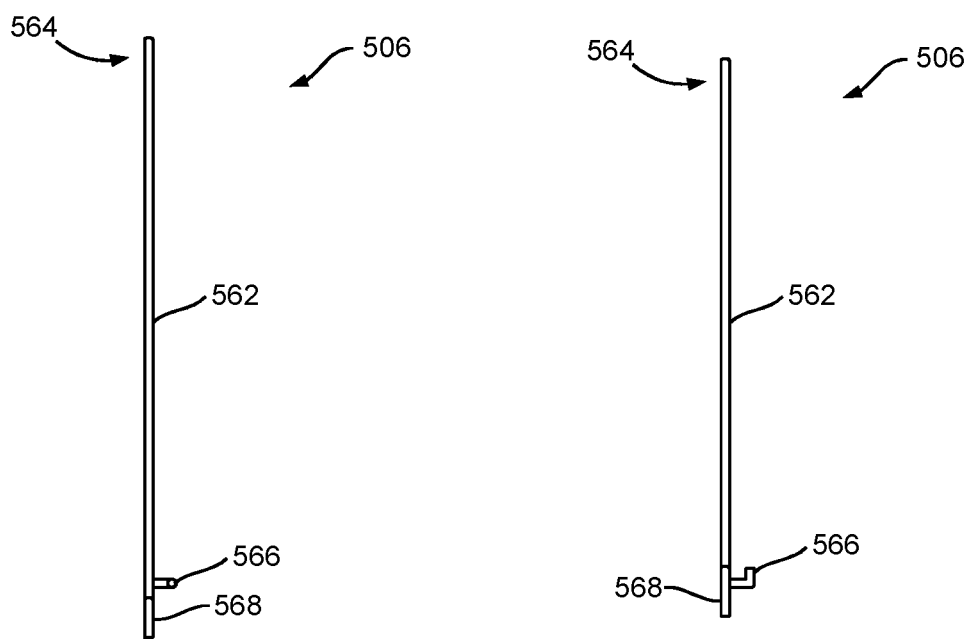
FIG. 29C is a plan view of the strut shown in FIG. 29A.
FIG. 29D is a front view of the strut shown in FIG. 29A.

In above embodiments, the installation of the struts 506 may require slight flexing of the vertical structure 502 and/or the horizontal structure 504. In some embodiments as shown in FIGS. 28A and 28B, the lower anchoring structure 548 and the second lower hook 568 may provide sufficient clearance to allow the strut 506 to move rearwardly and upwardly to position the upper hook 564 on the rear side of the upper anchoring structure 528, without disengaging the first and second lower hooks 566 and 568 from the lower anchoring structure 548 and the front wire 544. The disadvantage of these embodiments is that the struts 506 may disengage from the vertical and horizontal structures 502 and 504 if the struts 506 are under a rearward pressure.

In some embodiments as shown in FIGS. 29A to 29D, the second lower hook 568 is directly coupled or otherwise integrated to the elongated body 562 and the first lower hook 566 is also coupled or otherwise integrated to the elongated body 562 at a suitable position via suitable means such as welding.

Figure 30A:
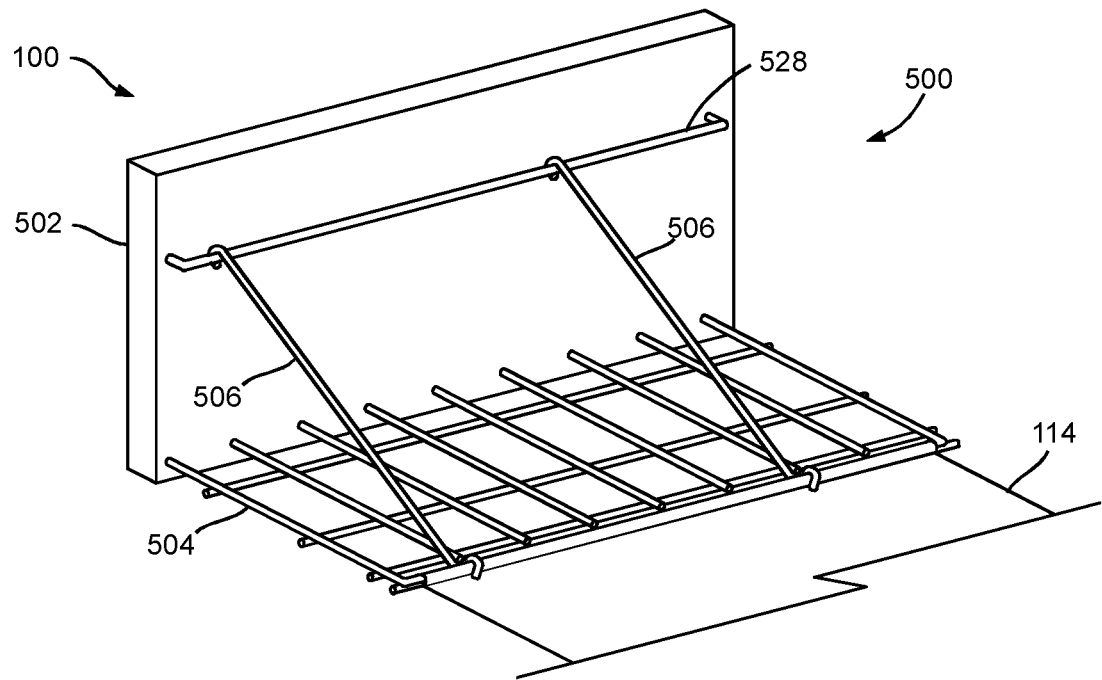
FIG. 30A is a perspective view of a MSE retaining-wall panel system, according to some embodiments of this disclosure.

In some embodiments as shown in FIG. 30A, the vertical structure 502 may be a rigid panel such as a concrete panel, plastic panel, stone panel, steel panel, wire-mesh panel, or the like, and the upper anchoring structure 528 is mounted thereon with a gap therebetween in a manner similar to the mounting of the anchor rod 112 shown in FIG. 1.

Figure 30B:
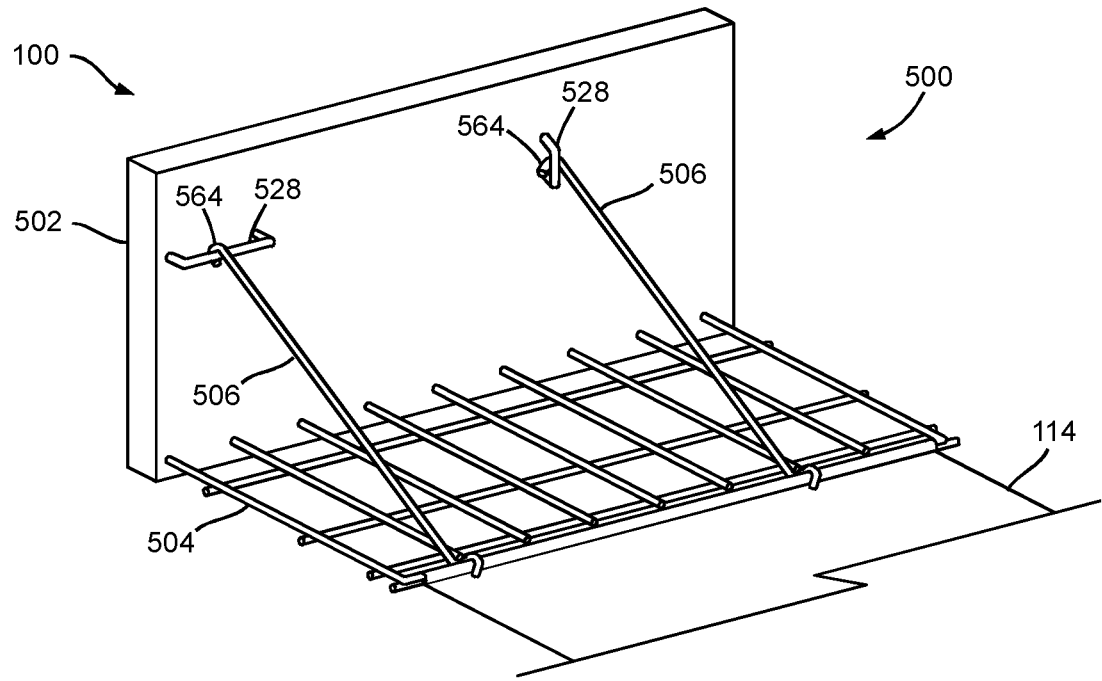
FIG. 30B is a perspective view of a MSE retaining-wall panel system, according to yet some embodiments of this disclosure.

In some embodiments as shown in FIG. 30B, the vertical structure 502 may comprise a plurality of upper anchoring structures 528 at any suitable locations and/or orientations. The upper hooks 564 of the strut 506 are also at suitable orientations for engaging the corresponding upper anchoring structures 528.

Figure 30C:
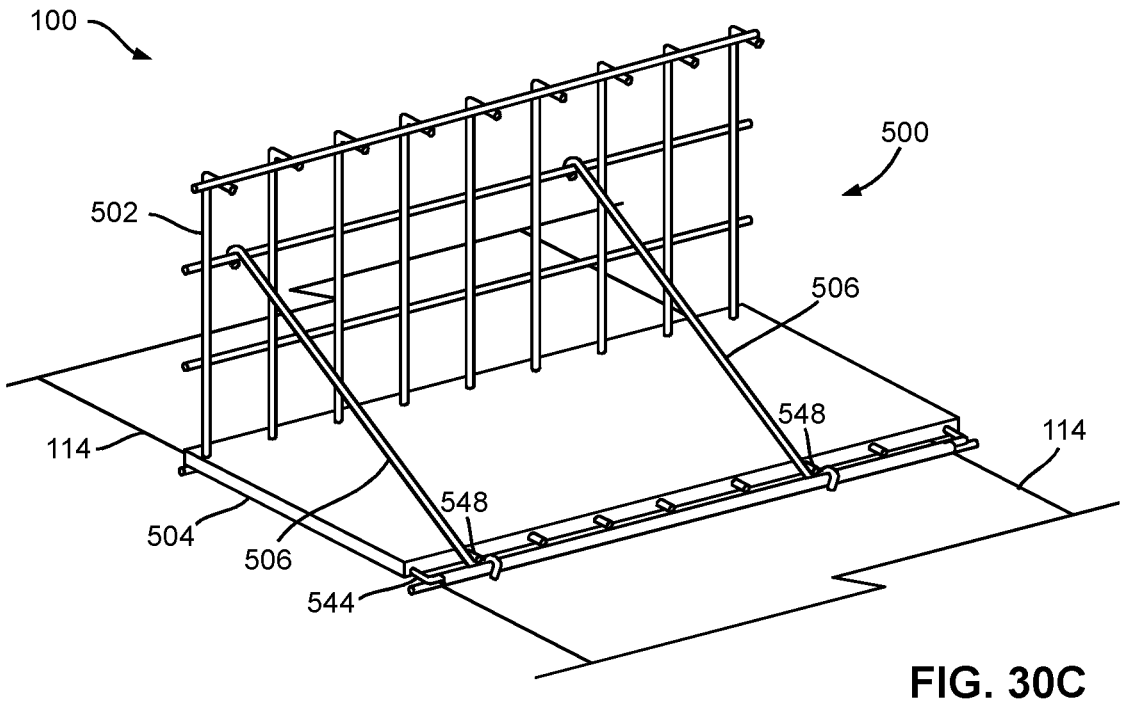
FIG. 30C is a perspective view of a MSE retaining-wall panel system, according to still some embodiments of this disclosure.

In some embodiments as shown in FIG. 30C, the horizontal structure 504 may be a rigid panel such as a concrete panel, plastic panel, stone panel, steel panel, wire-mesh panel, or the like, and the lower anchoring structures 548 are extended from the front side of the rigid panel 504 and the front wire 544 is coupled to the front side of the rigid panel 504 with a gap between the front wire 544 and the lower anchoring structures 548.

Figure 31A:
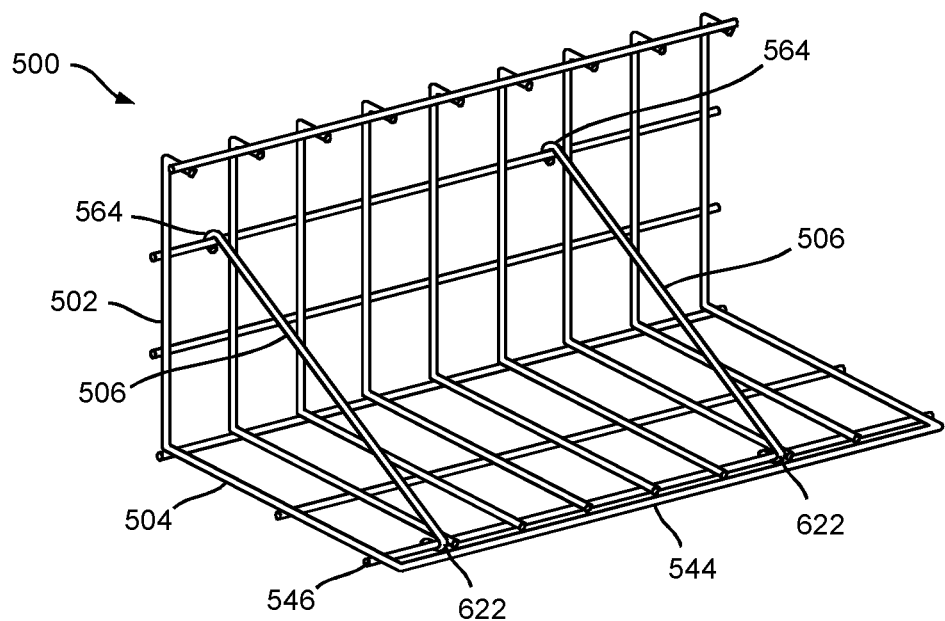
FIG. 31A is a perspective view of the cage of the MSE retaining-wall panel system, according to some embodiments of this disclosure.
Figure 31B:
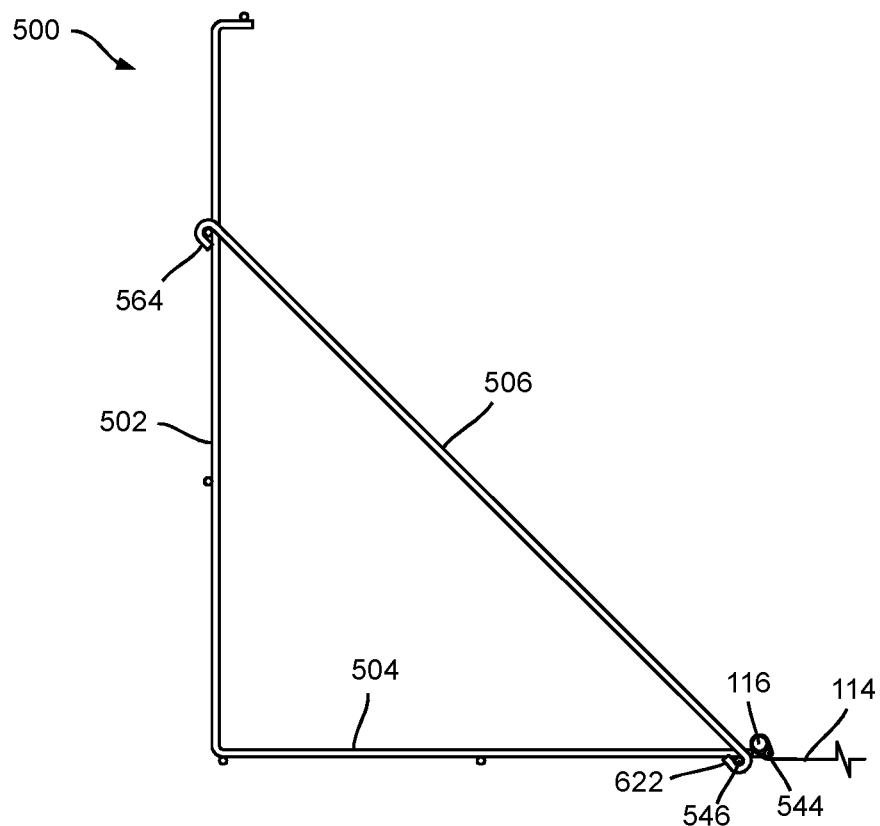
FIG. 31B is a schematic cross-sectional view of the cage shown in FIG. 31A.

FIG. 31A is a perspective view of the cage 500 of the MSE retaining-wall panel system, according to some embodiments of this disclosure. The cage 500 in these embodiments is similar to that shown in FIG. 15A except that each of the struts 506 comprises a single lower hook 622 at the lower end thereof, wherein the lower 622 is similar to the upper hook 564 and engages a reinforcement bar 546 such as the reinforcement bar 546 adjacent the front wire 544. In these embodiments, a slot is maintained between the front wire 544 and the neighboring reinforcement bar 546. Consequently when tying a flexible reinforcement sheet 114 to the front wire 544, the securing rod 116 may be positioned on the top side of the front wire 544 (see FIG. 31B) or on the bottom side thereof.

Figure 32A:
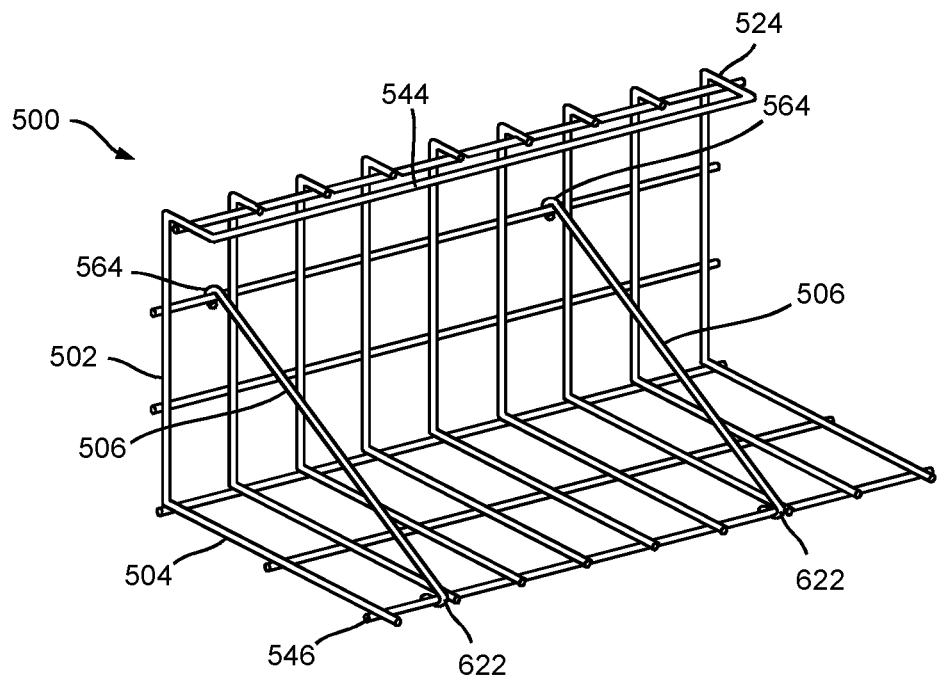
FIG. 32A is a perspective view of the cage of the MSE retaining-wall panel system, according to some embodiments of this disclosure.
Figure 32B:
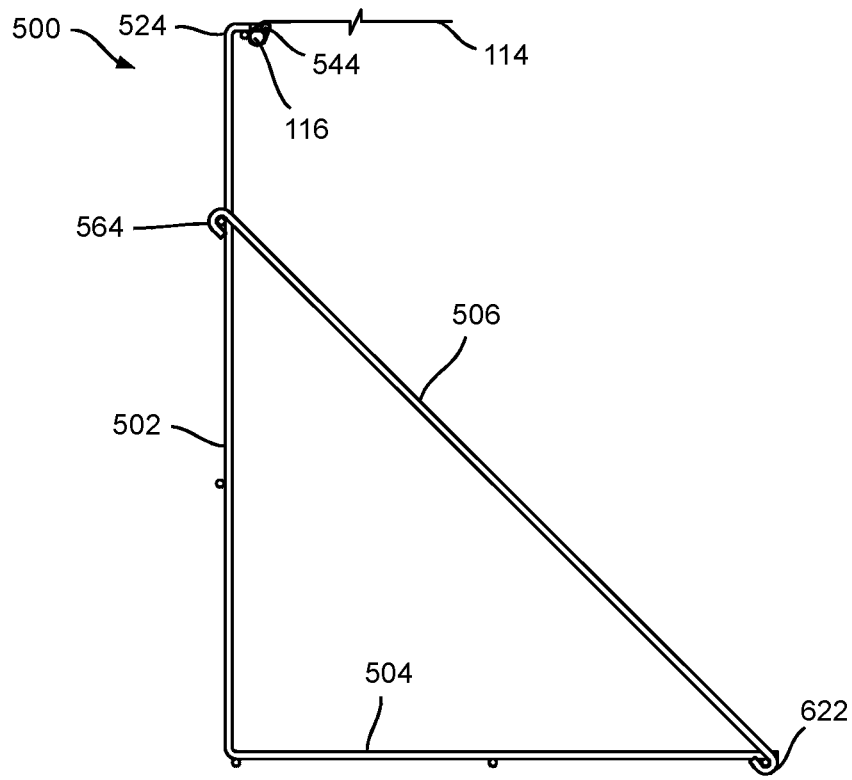
FIG. 32B is a schematic cross-sectional view of the cage shown in FIG. 32A.

In some embodiments as shown in FIGS. 32A and 32B, the cage 500 may not comprise a front wire on the horizontal structure 504. Rather, the cage 500 in these embodiments may comprise a front wire 544 on the front end of the seating structure 524 for forming a slot for tying a flexible reinforcement sheet 114 to the front wire 544 using a securing rod 116.

Figure 33:
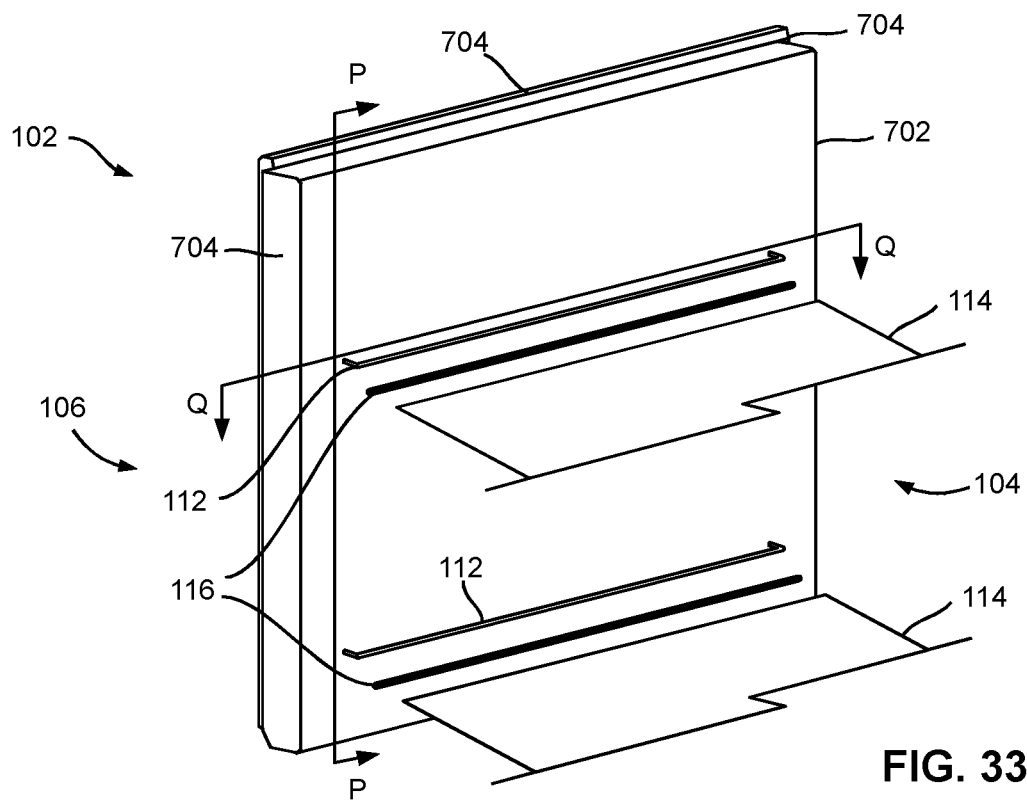
FIG. 33 is a perspective view of a MSE retaining-wall panel system, according to some embodiments of this disclosure.
Figure 34:
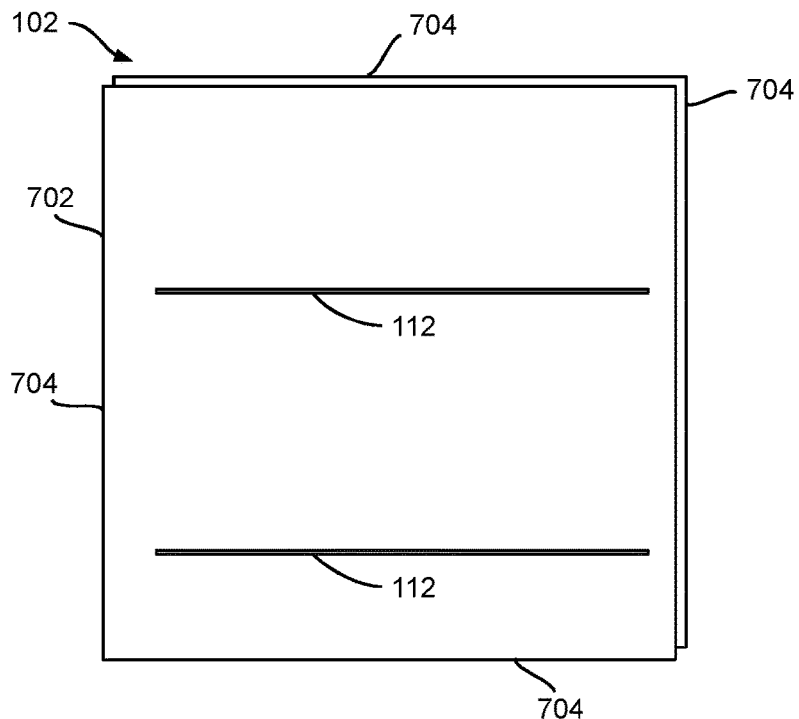
FIG. 34 is a front view of the MSE retaining-wall panel system shown in FIG. 33.
Figure 35:
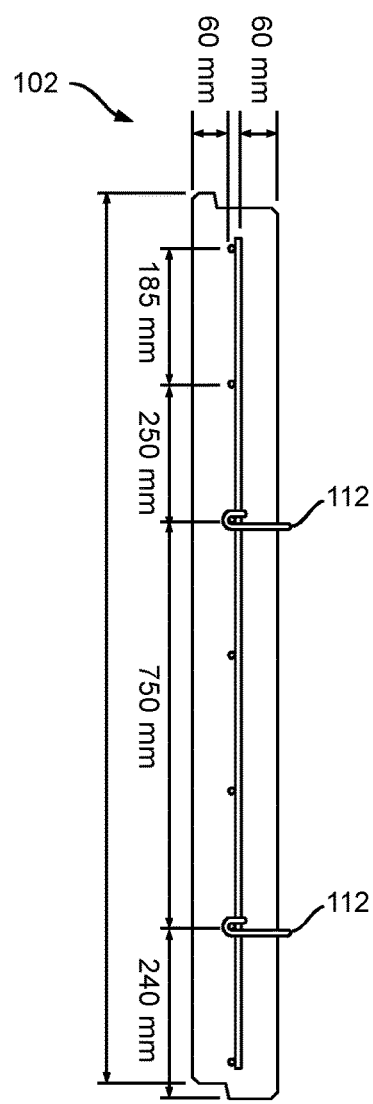
FIG. 35 is a cross-sectional view of the MSE retaining-wall panel system shown in FIG. 33 along the cross-section line P-P.
Figure 36:
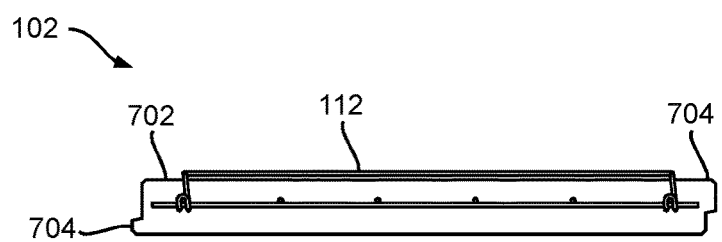
FIG. 36 is a cross-sectional view of the MSE retaining-wall panel system shown in FIG. 33 along the cross-section line Q-Q.

FIG. 33 shows a rigid retaining-wall panel 102 according to some embodiments of this disclosure. FIG. 34 is the front view of the rigid retaining-wall panel 102, FIG. 35 is the cross-sectional view of the rigid retaining-wall panel 102 along the cross-section line P-P, and FIG. 36 is the cross-sectional view of the rigid retaining-wall panel 102 along the cross-section line Q-Q, showing the dimension of the rigid retaining-wall panel 102.

Similar to the rigid retaining-wall panels described above, the rigid retaining-wall panel 102 in these embodiments comprises a wall body 702 with one or more anchor rods 112 secured on the interior side 104 thereof for fastening one or more flexible reinforcement sheets 114 such as geotextile sheets made of suitable geosynthetic materials and/or the like, via one or more securing rods 116.

Figure 37:
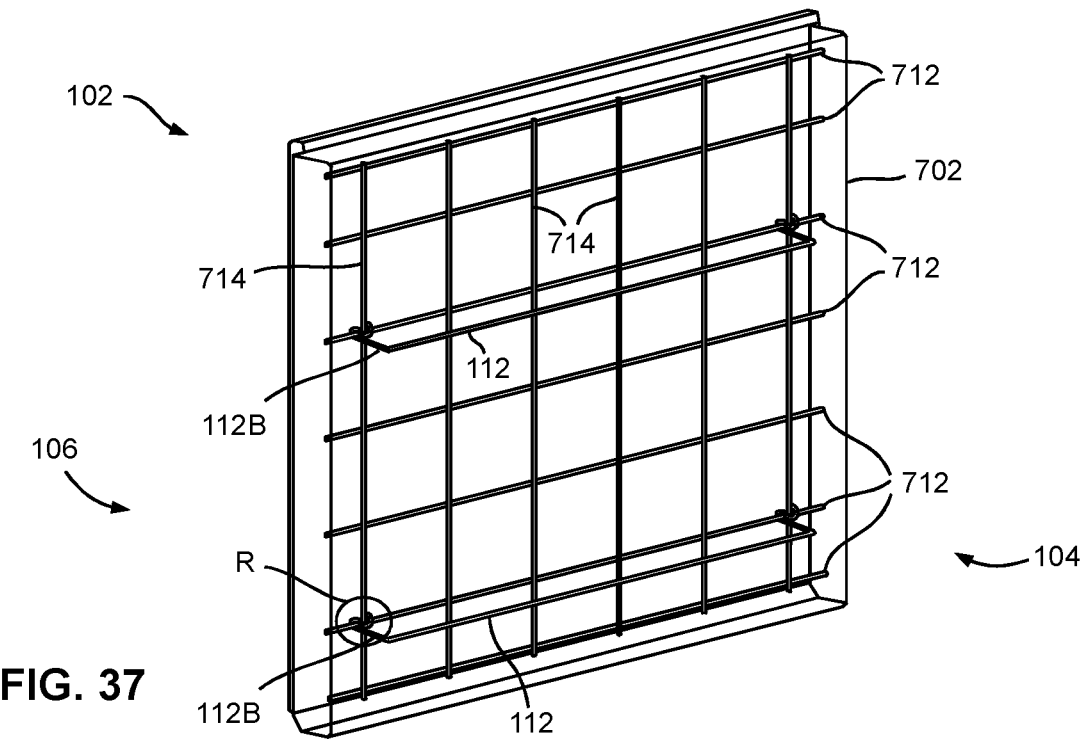
FIG. 37 is a schematic perspective view of the MSE retaining-wall panel of the MSE retaining-wall panel system shown in FIG. 33, illustrating the reinforcement structure of the MSE retaining-wall panel.

As shown in FIGS. 33 to 36, the rigid retaining-wall panel 102 in these embodiments comprises complementary extrusions 704 on the peripheral sides thereof for facilitating vertical and horizontal engagement thereof (described in more detail later). Moreover, as shown in FIG. 37, which illustrates the structure of the rigid retaining-wall panel 102, the body 702 of the rigid retaining-wall panel 102 in these embodiments is made of suitable material such as conventional concrete, lightweight concrete (low-density concrete made with lightweight coarse aggregates such as shale, clay, and/or slate), plastic (for example, recycled plastic) reinforced by a rigid reinforcement structure such as a steel reinforcement structure embedded therein.

More specifically, the rigid reinforcement structure comprises a plurality of spaced-apart horizontal bars 712 and a plurality of spaced-apart vertical bars 714 coupled with each other using suitable coupling means such as welding, wire-tying, and/or the like. The leg sections 112B of the anchor rods 112 are wrapped about both the horizontal bars 712 and vertical bars 714 and secured thereto for improved strength.

Preferably, the leg sections 112B of the anchor rods 112 are wrapped about both the horizontal bars 712 and vertical bars 714 in a way such that, when a pulling force is applied to the anchor rod 112, each leg section 112B thereof applies forces to the corresponding horizontal and vertical bars 712 and 714 to press them against each other (rather than to pull them apart) for achieving improvement strength.

Figure 38A:
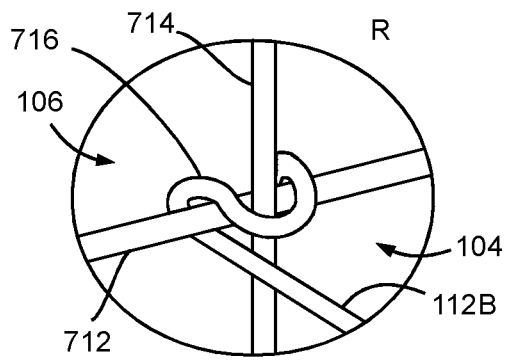
FIG. 38A is an enlarged view of the detail R of the MSE retaining-wall panel shown in FIG. 37.
Figure 38B:
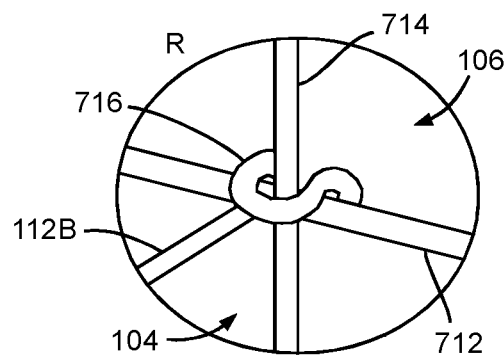
FIG. 38B is an enlarged view of the detail R of the MSE retaining-wall panel shown in FIG. 37, viewed from another viewing angle.

For example, FIGS. 38A and 38B show the detail R of a leg section 112B of the anchor rod 112 in some embodiments. As shown, the leg section 112B of the anchor rod 112 is located at a position about the connection point of a horizontal bar 712 and a vertical bar 714. More specifically, the leg section 112B of the anchor rod 112 extends under the horizontal bar 712 from the load-bearing side 104 to the exterior side 106 thereof, vertically wraps back to the load-bearing side 104 about the horizontal bar 712 at a position thereabove, and then wraps about the vertical bar 714 back to the exterior side 106 thereof and preferably for more than half round (for example, about ¾ round) such that an end portion 716 of the leg section 112B of the anchor rod 112 engages the exterior side 106 of the vertical bar 714.

Figure 38C:
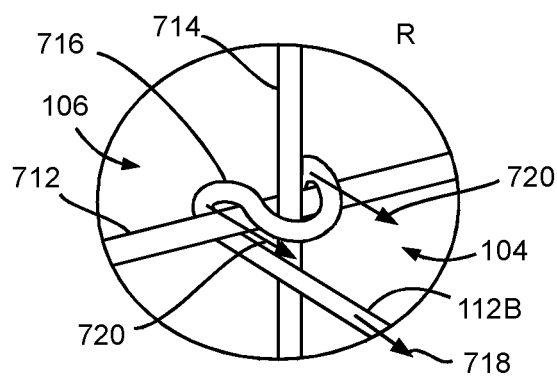
FIG. 38C is a schematic view of the detail R shown in FIG. 38A with illustration of pulling forces applied to the reinforcement structure of the MSE retaining-wall panel.

Noting the vertical bar 714 is on the load-bearing side of the horizontal bar 712, the wrapping of the leg section 112B of the anchor rod 112 provides improved strength in that, as shown in FIG. 38C, when a pulling force 718 from the load-bearing side 104 is applied to the anchor rod 112 (for example, from the flexible reinforcement sheets 114 (not shown)), the pulling force 718 causes the leg section 112B of the anchor rod 112 to press the horizontal bar 712 (indicated by the arrows 720) against the vertical bar 714, thereby distributing the pulling force 718 to the entire reinforcement structure and thus improving the strength of the rigid retaining-wall panel 102 and the anchor rod 112. In some embodiments, the strength of the leg sections 112B of the anchor rods 112 may be further improved by welding the wrapping portion of each leg section 112B onto the corresponding horizontal and vertical bars 712 and 714.

Figure 39:
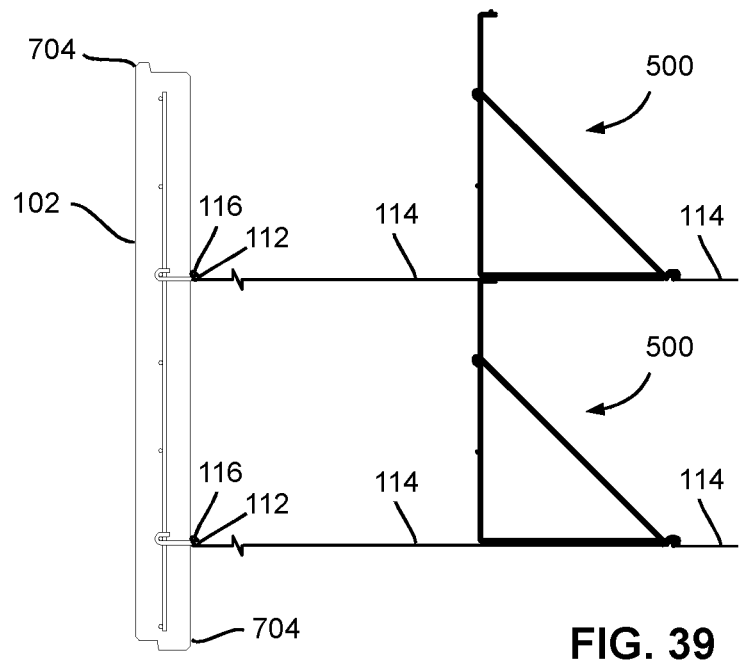
FIG. 39 is a schematic cross-sectional view of a MSE retaining-wall panel system according to some embodiments of this disclosure.

As shown in FIG. 39, the rigid retaining-wall panels 102 in these embodiments may be tied with one or more flexible reinforcement sheets 114 using one or more securing rods 116 as described above. Some of the one or more flexible reinforcement sheets 114 are then tied to respective cages 500 as described above and further extended forwardly. Some flexible reinforcement sheets may extend from the rigid panel 102 and are not tied to any cage 500. Rocks, gravels, and/or earth may be filled onto the load-bearing side.

Those skilled in the art will appreciate that the leg sections 112B of the anchor rods 112 may be wrapped to the horizontal and vertical bars 712 and 714 in any other suitable manners. For example, as shown in FIG. 40A, the section 112B may extend under the horizontal bar 712 from the load-bearing side 104 to the exterior side 106 thereof, vertically extend upward to a position above the horizontal bar 712, and then wrap about the vertical bar 714 from the exterior side 106 to the load-bearing side 104 thereof.

Those skilled in the art will appreciate that, the wrapping of the leg section 112B of the anchor rod 112 to the horizontal and vertical bars 712 and 714 is in such a manner that, when a pulling force from the load-bearing side 104 is applied to the anchor rod 112, the pulling force will cause the leg section 112B of the anchor rod 112 to press the horizontal and vertical bars 712 and 714 against each other for distributing the pulling force to the entire reinforcement structure and improving the strength of the rigid retaining-wall panel 102 and the anchor rod 112. Thus, the wrapping of the leg section 112B of the anchor rod 112 to the horizontal and vertical bars 712 and 714 may be dependent on the space relationship of the horizontal and vertical bars 712 and 714.

Figure 40A:
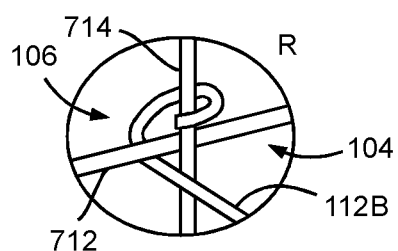
FIG. 40A is an enlarged view of the detail R of the MSE retaining-wall panel shown in FIG. 37, showing the wrapping of a leg section of an anchor rod about a horizontal bar and a vertical bar of the reinforcement structure of the MSE retaining-wall panel shown in FIG. 37, according to some embodiments of this disclosure.
Figure 40B:
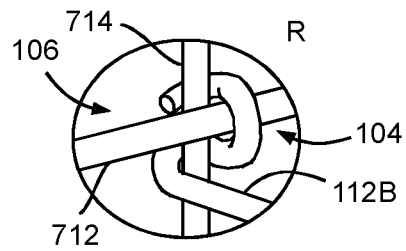
FIG. 40B is an enlarged view of the detail R of the MSE retaining-wall panel shown in FIG. 37, showing the wrapping of a leg section of an anchor rod about a horizontal bar and a vertical bar of the reinforcement structure of the MSE retaining-wall panel shown in FIG. 37, according to yet some embodiments of this disclosure.

For example, in some embodiments as shown in FIG. 40B, the horizontal bar 712 is on the load-bearing side of the vertical bar 714 (compared to the embodiments shown in FIGS. 38A and 40A where the vertical bar 714 is on the load-bearing side of the horizontal bar 712). Then, the leg section 112B of the anchor rod 112 in these embodiments may extend from the load-bearing side 104 to the exterior side 106 of the vertical bar 714 and horizontally wrap back to the load-bearing side 104 about the vertical bar 714 at a first side of the horizontal bar 712 (for example, at the lower side of the horizontal bar 712). Then, the leg section 112B of the anchor rod 112 may vertically wrap about the horizontal bar 712 from the first side of the horizontal bar 712 to a second, opposite side thereof (for example, from the lower side to the upper side thereof) preferably for more than half round (for example, about ¾ round). In this way, each leg section 112B is tied to a pair of horizontal and vertical bars 712 and 714 with improved strength against the pulling force of the flexible reinforcement sheets 114 from the load-bearing side when in use.

As those skilled in the art will appreciate, the rigid retaining-wall panel 102 may be made by using a mold with suitable shape with the reinforcement structure embedded therein (with the anchor rods 112 mounted to the reinforcement structure) and then injecting a suitable body material in the liquid form into the mold. Once the body material is solidified and bound or otherwise coupled to the reinforcement structure, the mold is removed and the rigid retaining-wall panel 102 is then formed.

Figure 41:
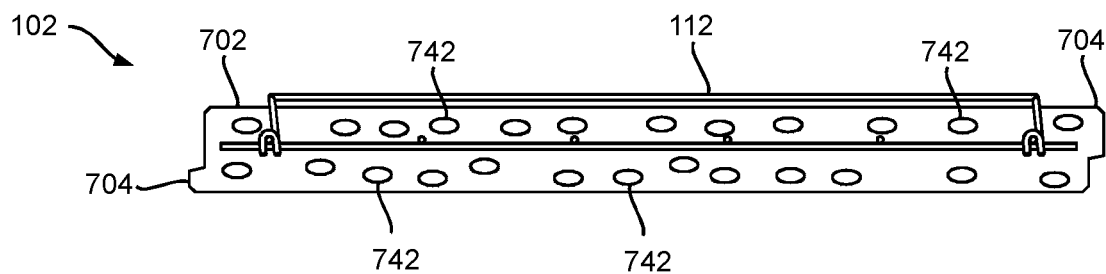
FIG. 41 is a schematic cross-sectional view of the MSE retaining-wall panel system shown in FIG. 33, according to some embodiments of this disclosure.

In some embodiments wherein the body 702 of the rigid retaining-wall panel 102 is made of a material such as plastic that may have relatively large thermal expansion (that is, its shape, area, volume, and/or density may experience relatively large change with temperature changes), the body 702 of the rigid retaining-wall panel 102 may comprises a plurality of compressible components 742 distributed therein; see FIG. 41. The compressible components 742 may be air bubbles, air capsules, recycled empty water bottles, expanded polystyrene (EPS) foams, and/or the like.

In some embodiments, the rigid retaining-wall panel 102 may not comprise any anchor rods 112 and therefore may not be used for tying the flexible reinforcement sheets 114.

Those skilled in the art will appreciate that the rigid retaining-wall panels 102 with the body 702 made of plastic and/or other suitable materials may be used as water-proof retaining-wall panels.

Figure 42:
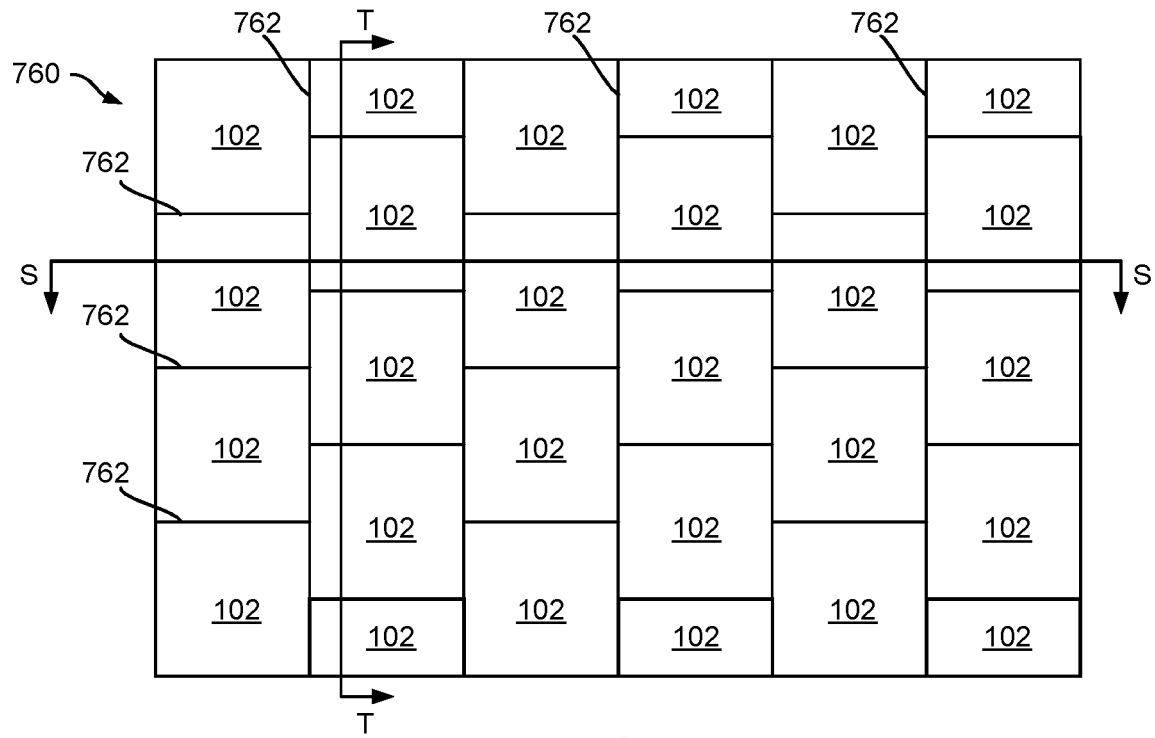
FIG. 42 shows a retaining wall made of a plurality of the MSE retaining-wall panel system shown in FIG. 33, according to some embodiments of this disclosure.
Figure 43:
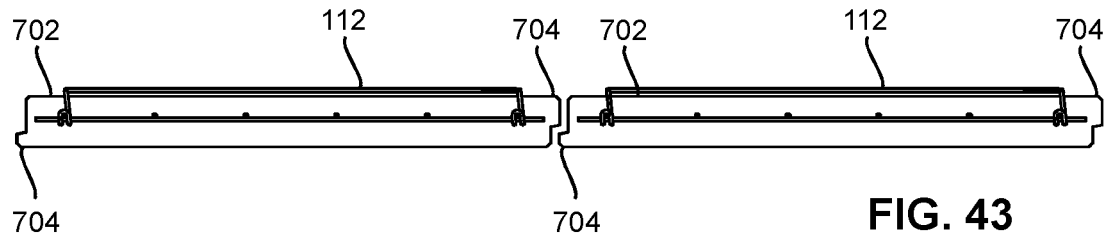
FIG. 43 is a schematic cross-sectional view of a portion of the retaining wall shown in FIG. 42 along the cross-section line S-S.
Figure 44:
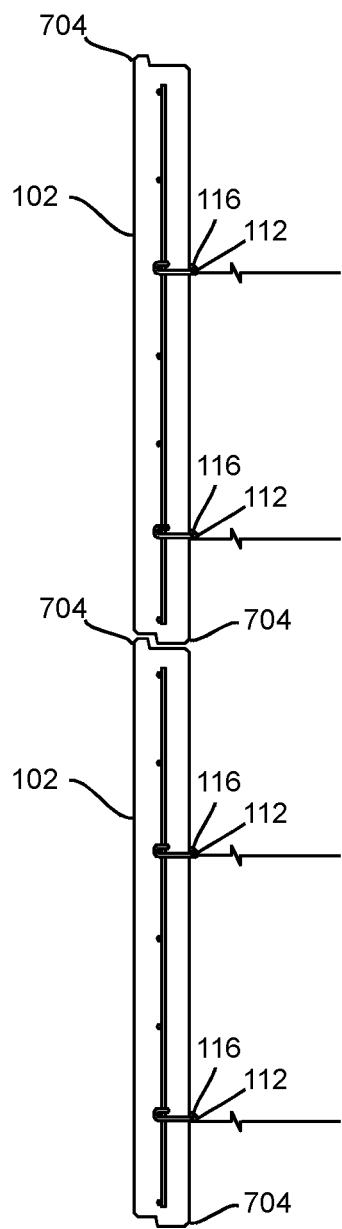
FIG. 44 is a schematic cross-sectional view of a portion of the retaining wall shown in FIG. 42 along the cross-section line T-T.

In some embodiments, a plurality of rigid retaining-wall panels 102 as shown in FIGS. 33 to 41 with a same size or various sizes may be vertically and horizontally stacked as shown in FIG. 42 to form a retaining wall 760. With suitable lengths and/or widths, the rigid retaining-wall panels 102 may be arranged in any suitable manner, for example, with misaligned horizontal and/or vertical seams 762 therebetween to improve stability of the retaining wall 760. As shown in FIGS. 43 and 44, the complementary extrusions 704 of the rigid retaining-wall panels 102 facilitate the engagement thereof.

In some embodiments, the horizontal and/or vertical seams 762 between the rigid retaining-wall panels 102 may be about 20 mm.

Figure 45:
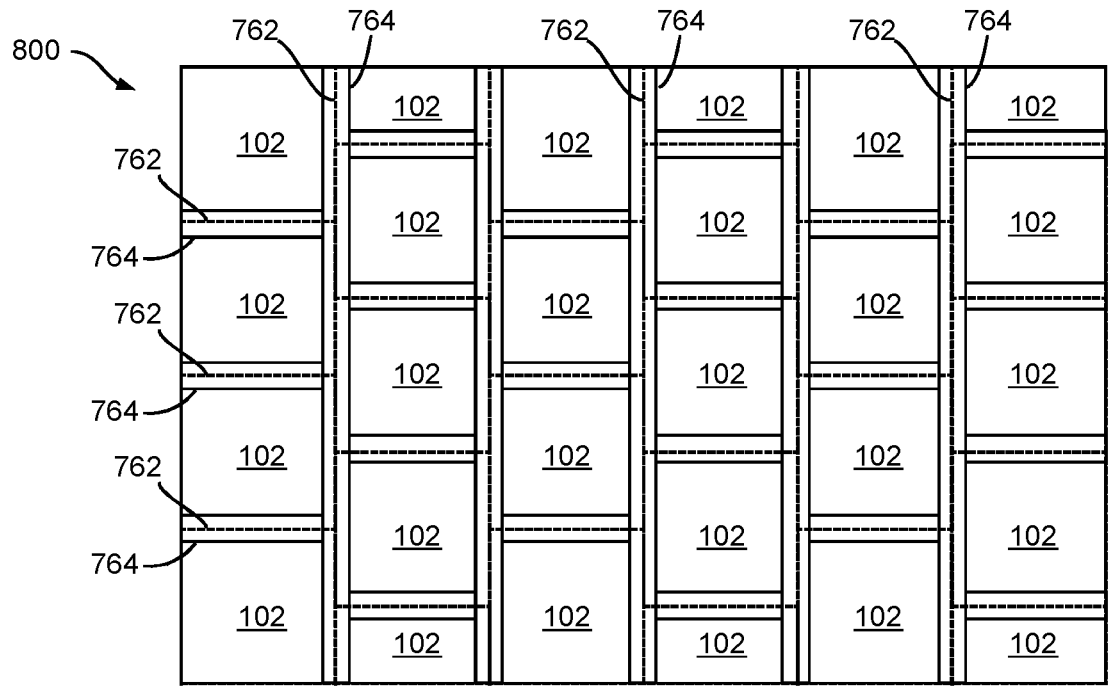
FIG. 45 shows a retaining wall made of a plurality of the MSE retaining-wall panel system shown in FIG. 33, according to yet some embodiments of this disclosure, wherein water-proof tapes are used for sealing the gaps between the MSE retaining-wall panels.

In some embodiments as shown in FIG. 45, the horizontal and/or vertical seams 762 between the rigid retaining-wall panels 102 may be sealed by covering suitable tapes 764 thereonto. In some embodiments, the tapes 764 may have a width of about 30 centimeters (cm).

Figure 46:
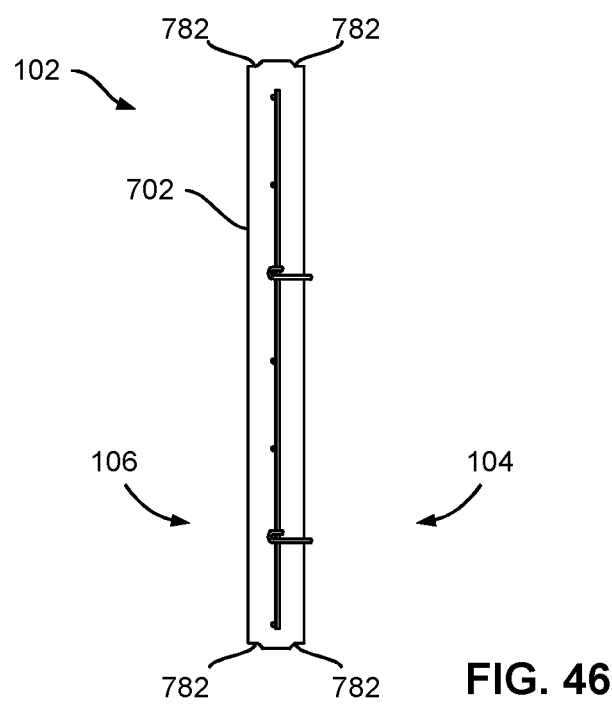
FIG. 46 is a schematic cross-sectional view of a MSE retaining-wall panel, according to some embodiments of this disclosure.
Figure 47:
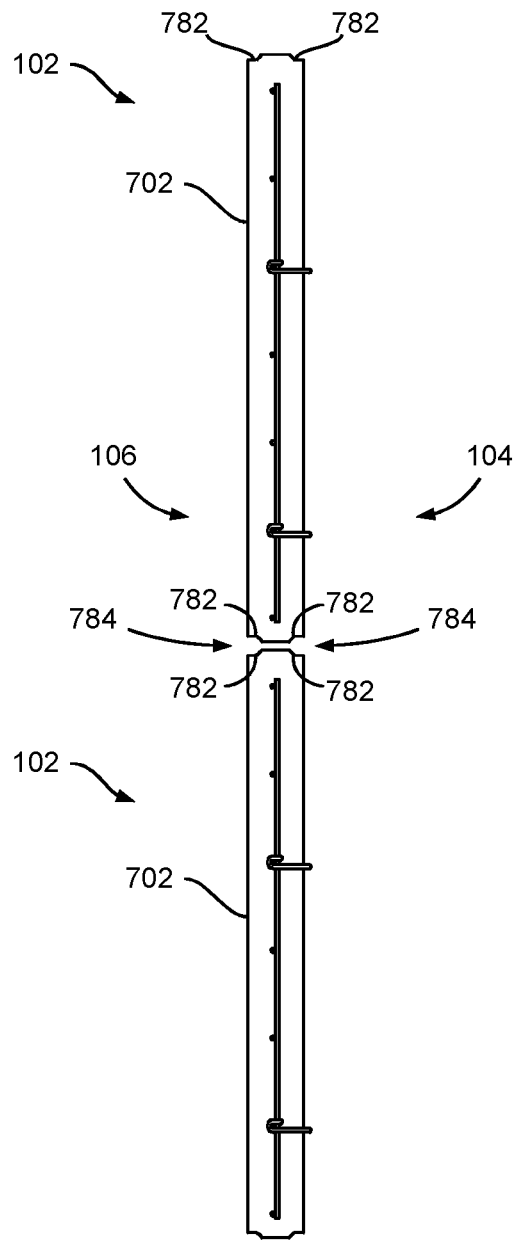
FIG. 47 is a schematic cross-sectional view of two vertically stacked MSE retaining-wall panels shown in FIG. 46.

In some embodiments as shown in FIG. 46, the body 702 of the rigid retaining-wall panel 102 comprises recessed or chamfered top and bottom edges 782 on the load-bearing side 104 and the exterior side 106 (also called the front side 104 and the rear side 106). As shown in FIG. 47, when two rigid retaining-wall panels 102 are vertically stacked, the adjacent recessed edges 782 form a plurality of elongated recesses 784 along the seams between the two rigid retaining-wall panels 102 on the load-bearing side 104 and the exterior side 106 thereof. Each elongated recess 784 may receive a sealing sleeve for sealing the seam between the two rigid retaining-wall panels 102.

Figure 48:
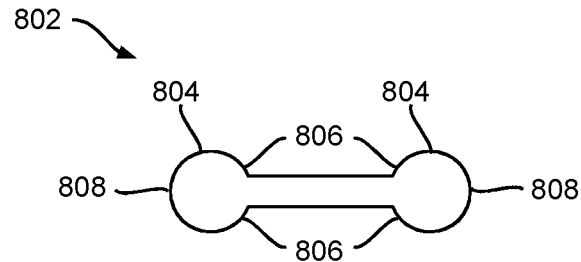
FIG. 48 is a schematic cross-sectional view of a sealing sleeve, according to some embodiments of this disclosure.

The sealing sleeve may be made of any suitable flexible sealing material such as rubber, soft polymer, soft plastic, and/or the like. FIG. 48 shows an example of the sealing sleeve 802 which comprises outwardly expanded lateral end portions 804 each having an inner transition portion 806 substantially matching the profile of elongated recess 784.

Figure 49:
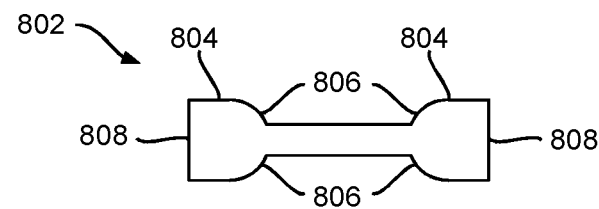
FIG. 49 is a schematic cross-sectional view of a sealing sleeve, according to yet some embodiments of this disclosure.

FIG. 49 shows another example of the sealing sleeve 802 in some alternative embodiments. The sealing sleeve 802 in these embodiments is similar to that shown in FIG. 48 except that their lateral ends 808 may have different shapes.

Figure 50:
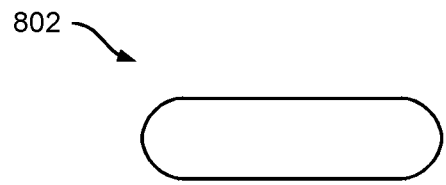
FIG. 50 is a schematic cross-sectional view of a sealing sleeve, according to still some embodiments of this disclosure.

FIG. 50 shows yet another example of the sealing sleeve 802 in some alternative embodiments. The sealing sleeve 802 in these embodiments is made of an elastic material such as rubber and has a cross-section substantially of a round-corner rectangular shape.

Figure 51:
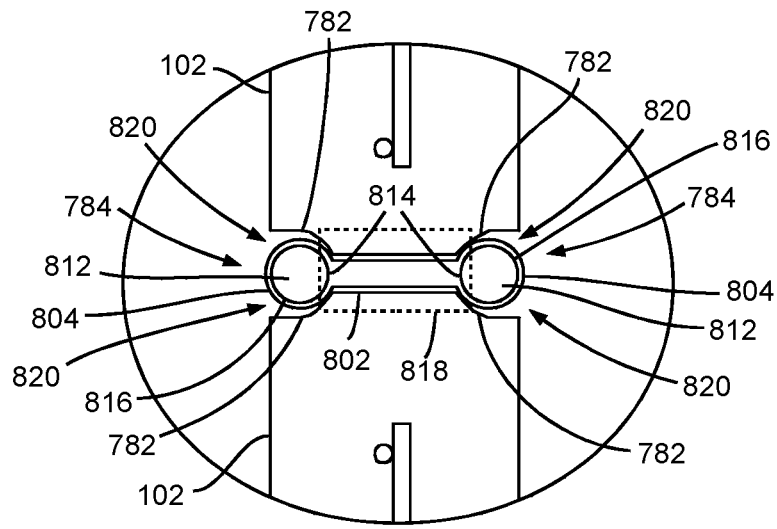
FIG. 51 shows a portion of two vertically stacked rigid retaining-wall panels shown in FIG. 46 with a sealing sleeve shown in FIG. 48 sandwiched therebetween, according to some embodiments of this disclosure.

FIG. 51 shows two vertically stacked rigid retaining-wall panels 102 with a sealing sleeve 802 shown in FIG. 48 sandwiched therebetween. As shown, the lateral end portions 804 of the sealing sleeve 802 extend in the respective elongated recesses 784. Each of the lateral end portion 804 receives therein an elongated rigid rod 812, such as a rigid rod made of HDPE, fitting in the respective elongated recess 784. The inner side 814 of the cross-section of the elongated rigid rod 812 has a profile substantially matching that of the inner side of the respective elongated recess 784. The outer side 816 of the elongated rigid rod 812 has a height substantially smaller than the opening of the respective elongated recess 784. Subsequently, when the sealing sleeve 802 and the elongated rigid rods 812 are sandwiched between the vertically stacked rigid retaining-wall panels 102, the interface 818 between the vertically stacked rigid retaining-wall panels 102 are sealed by the sealing sleeve 802 with the support of the elongated rigid rods 812 fitting in the elongated recesses 784 (the interface 818 in FIG. 51 is shown with gaps for illustrative purposed only) for preventing water (such as rain) from penetrating from one side (such as the exterior side) to the other side (such as the load-bearing side). Meanwhile, gaps 820 are maintained at the openings opening of the respective elongated recess 784 for allowing water (such as rain) to flow away from the interface 818 between the vertically stacked rigid retaining-wall panels 102.

Figure 52:
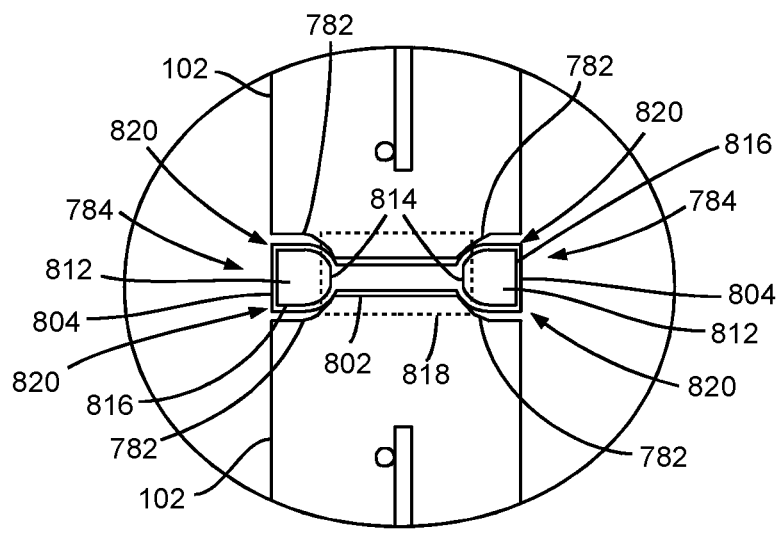
FIG. 52 shows a portion of two vertically stacked rigid retaining-wall panels shown in FIG. 46 with a sealing sleeve shown in FIG. 49 sandwiched therebetween, according to some embodiments of this disclosure.

FIG. 52 shows two vertically stacked rigid retaining-wall panels 102 with a sealing sleeve 802 shown in FIG. 49 sandwiched therebetween. A pair of elongated rigid rods 812 with D-shaped cross-sections are received in the lateral end portion 804 of the sealing sleeve 802 and fitting in the respective elongated recess 784 for preventing water from penetrating from one side to the other side.

Figure 53:
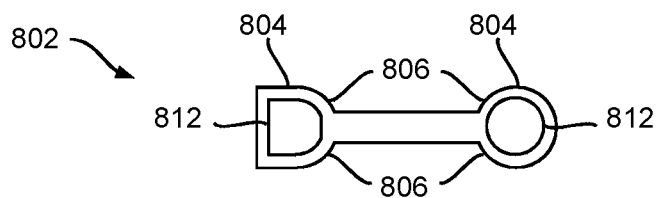
FIG. 53 is a schematic cross-sectional view of a sealing sleeve, according to still some embodiments of this disclosure.

In some embodiments as shown in FIG. 53, the expanded lateral end portions 804 of the sealing sleeve 802 may have different cross-section profiles such as a D-shape and a circular cross-section profile. Correspondingly, the elongated rigid rods 812 also have different cross-section profiles to match those of the corresponding lateral end portions 804 of the sealing sleeve 802.

Figure 54:
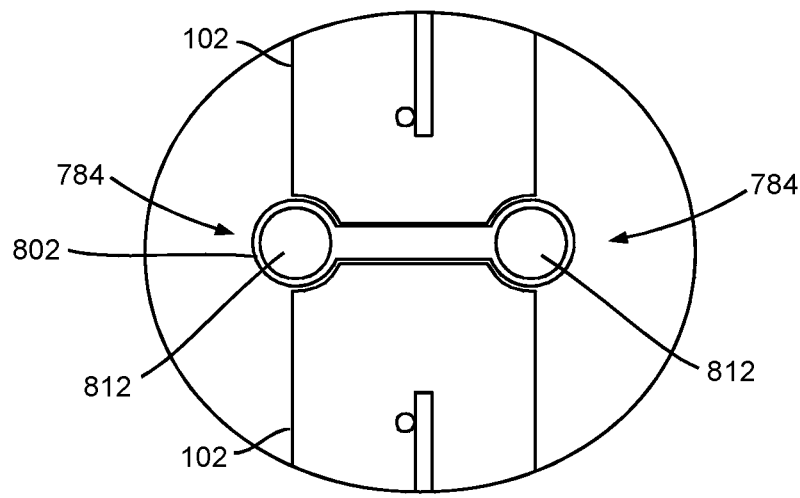
FIG. 54 shows a portion of two vertically stacked rigid retaining-wall panels shown in FIG. 46 with a sealing sleeve shown in FIG. 48 sandwiched therebetween, according to some embodiments of this disclosure.

In some embodiments as shown in FIG. 54, the sealing sleeve 802 may have a suitable size such that one of both of the lateral end portions 804 thereof at least partially extend out of the respective elongated recesses 784 at the interface of two vertically stacked rigid retaining-wall panels 102. With the support of the elongated rigid rods 812, the lateral end portion 804 of the sealing sleeve 802 that is at least partially extend out of the respective elongated recess 784 thus fully seals the recess 784.

In some embodiments, instead of using the sealing sleeve 802, an elongated solid-core sealing shim made of a flexible material such as rubber may be sandwiched between two vertically stacked rigid retaining-wall panels 102 for sealing the seam therebetween. The solid-core sealing shim may have a suitable cross-section such as a cross-section similar to that shown in FIG. 48 or 49.

Figure 55A:
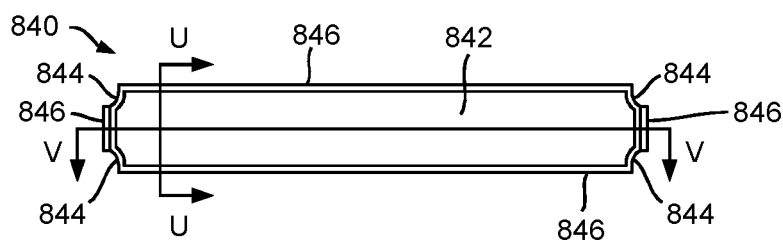
FIG. 55A is a plan view of a sealing shim, according to still some embodiments of this disclosure.
Figure 55B:
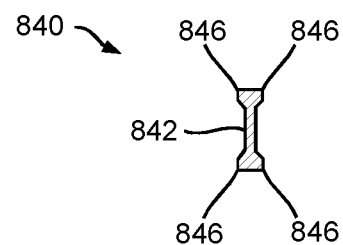
FIG. 55B is a cross-sectional view of the sealing shim shown in FIG. 55 along the cross-section line U-U.
Figure 55C:
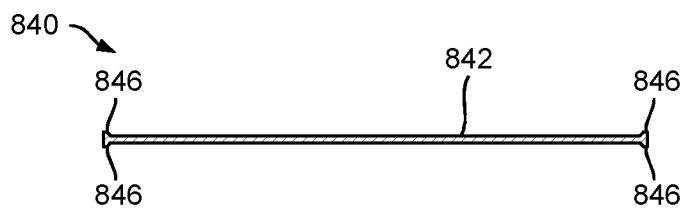
FIG. 55C is a cross-sectional view of the sealing shim shown in FIG. 55 along the cross-section line V-V.

For example, FIGS. 55A to 55C show a sealing shim 840 in some embodiments. As shown, the sealing shim 840 comprises an elongated, substantially rectangular body 842 having four cut-out corners 844 and expanded edges 846. More specifically, the edges 846 of the sealing shim 840 are expanded outwardly along opposite directions perpendicular to the plane of the body 842. As will be described below, the outwardly expanded edges 846 facilitate the sealing of the seams 762.

Figure 56:
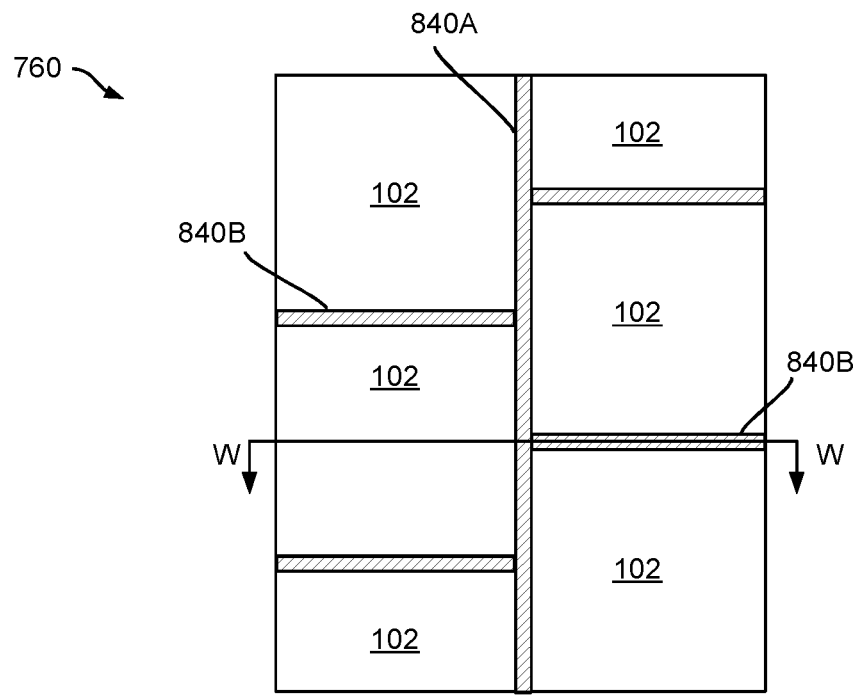
FIG. 56 shows a portion of a retaining wall made of a plurality of the MSE retaining-wall panel system shown in FIG. 46, according to some embodiments of this disclosure.

FIG. 56 shows a portion of a retaining wall 760 comprising a plurality of vertically and horizontally engaged rigid retaining-wall panels 102. Each rigid retaining-wall panel 102 has chamfered or recess edges on the front and rear sides thereof. Each pair of rigid retaining-wall panels 102 sandwich therebetween a sealing shim 840 at the interface thereof. The sealing shims 840 comprise among which a first sealing shim 840A vertically extending between adjacent columns of rigid retaining-wall panels 102, and a plurality of second sealing shims 840B horizontally each extending between two vertically stacked rigid retaining-wall panels 102.

Figure 57A:
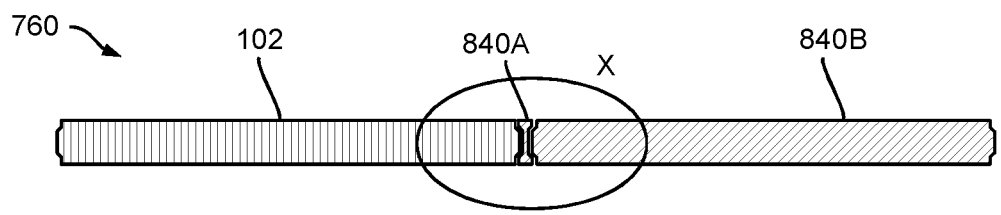
FIG. 57A is a cross-sectional view of the portion of the retaining wall shown in FIG. 56 along the cross-section line W-W.
Figure 57B:
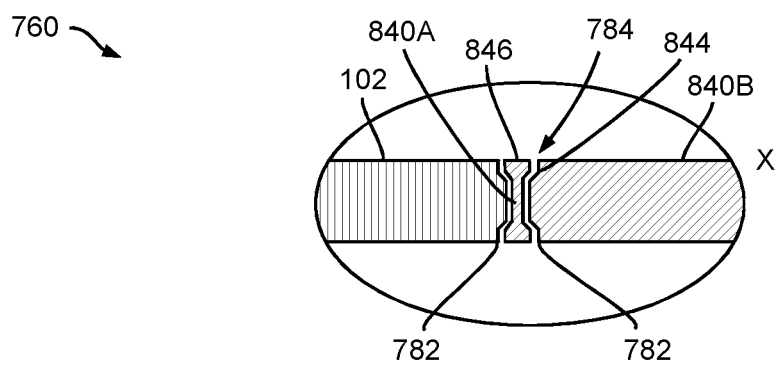
FIG. 57B is an enlarged view of the detail X of the retaining wall shown in FIG. 57A.

As shown in FIGS. 57A and 57B, each rigid retaining-wall panel 102 has chamfered top and bottom edges 782 on the exterior and load-bearing sides thereof, which, when two rigid retaining-wall panels 102 are vertically or horizontally engaged, forming a plurality of elongated recesses 784. The outwardly expanded edges 846 of the sealing shim 840 has a profile matching the chamfered edges 782 of the rigid retaining-wall panels 102 such that, when the sealing shim 840 is sandwiched between the two rigid retaining-wall panels 102, the outwardly expanded edges 846 thereof completely fill the elongated recesses 784 for sealing the seam between the two rigid retaining-wall panels 102.

Moreover, the cut-off edges 844 of the sealing shim 840B have a profile matching that of the outwardly expanded edges 846 of the sealing shim 840A at the interface thereof, thereby providing a full engagement between the sealing shims 840A and 840B without warping any of the sealing shims 840A and 840B, and therefore providing full seals of the seams between the rigid retaining-wall panels 102.

In some embodiments, the above-described sealing sleeve 802 and sealing shim 840 may be used together for sealing the seams of a retaining wall formed by vertically and/or horizontally engaged rigid retaining-wall panels 102. For example, one or more sealing sleeves 802 may be used for sealing the horizontal seams of the retaining wall and one or more sealing shims 840 may be used for sealing the vertical seams of the retaining wall. In these embodiments, the sealing sleeves 802 may also comprise cut-out corners similar to the cut-out corners 844 of the sealing shims 840 shown in FIGS. 55A to 55C.

Although embodiments have been described above with reference to the accompanying drawings, those of skill in the art will appreciate that variations and modifications may be made without departing from the scope thereof as defined by the appended claims.

What is claimed is:

1. A retaining-wall panel system for retaining a landfilling material, the retaining-wall panel system comprising:
    a first rigid load-retention panel, the first rigid load-retention panel comprising a first anchor rod coupled to a load-bearing side thereof and forming a horizontal first slot therebetween;
    a flexible sheet having a proximal end and a distal end; and
    a first securing rod having a diameter greater than or equal to a width of the slot, the first securing rod seated against the first rigid load-retention panel and the first anchor rod on a first side of the first slot and partially in the first slot or adjacent thereto for coupling the flexible sheet to the first anchor rod;
    wherein a first section of the flexible sheet between the proximal end and distal end thereof extends between the first anchor rod and the first securing rod and at least partially wraps about the first anchor rod and the first securing rod on opposite sides thereof such that the first anchor rod is in pressurized contact with the first securing rod via a portion of the first section of the flexible sheet sandwiched therebetween; and
    wherein the distal end of the flexible sheet is extendible away from the first rigid load-retention panel into and within the landfilling material.

2. The retaining-wall panel system of claim 1, wherein the flexible sheet further wraps about a combination of the first anchor rod, the first securing rod, and the first section of the flexible sheet with the proximal and distal ends extending through the first slot from the first side thereof and out of the first slot from a second side thereof opposite to the first side of the first slot.

3. The retaining-wall panel system of claim 1, wherein the first side of the first slot is a top side of the first slot or a bottom side of the first slot.

4. The retaining-wall panel system of claim 1, wherein the proximal end of the flexible sheet is extendible along the first rigid load-retention panel or is extendible away from the first rigid load-retention panel into and within the landfilling material.

5. The retaining-wall panel system of claim 1, wherein the flexible sheet comprises at least one geotextile sheet made of a geosynthetic material.

6. The retaining-wall panel system of claim 1, wherein the first anchor rod comprises a main anchor-rod section extending along the first slot and a pair of leg sections integrated with the main anchor-rod section and extending into the first rigid load-retention panel.

7. The retaining-wall panel system of claim 1 further comprising a second anchor rod coupled to an anchor on the load-bearing side of the first rigid load-retention panel and at a distance thereto, the second anchor rod and the anchor forming a horizontal second slot; and
    a second securing rod seated against the second anchor rod on a first side of the second slot and partially in the second slot or adjacent thereto for coupling the flexible sheet to the second anchor rod;
    wherein a second section of the flexible sheet between the proximal end and distal end thereof extends between the second anchor rod and the second securing rod and at least partially wraps about the second anchor rod and the second securing rod on opposite sides thereof such that the second anchor rod is in pressurized contact with the second securing rod via a portion of the second section of the flexible sheet sandwiched therebetween.

8. The retaining-wall panel system of claim 7, wherein the anchor is earth, rock, or a second rigid load-retention panel.

9. A method for securing a flexible sheet to a rigid load-retention panel of a retaining-wall panel system, for reinforcing the rigid load-retention panel to retain therebehind a landfilling material, the rigid load-retention panel comprising an anchor rod coupled to a load-bearing side thereof and forming a horizontal slot therebetween, the method comprising steps of:
    (i) extending a proximal portion of a flexible sheet through the slot from a first side thereof, the proximal portion of the flexible sheet adjacent a proximal end thereof;
    (ii) wrapping the proximal portion of the flexible sheet at least partially about a securing rod on the first side of the slot, the securing rod having a diameter greater than or equal to a width of the slot;
    (iii) extending the proximal portion of the flexible sheet through the slot and wrapping at least partially about the anchor rod; and
    (iv) pulling at least the proximal end of the flexible sheet away from the slot to tightly engage the securing rod and the proximal portion of the flexible sheet with the anchor rod and the first rigid load-retention panel and the first anchor rod such that the first securing rod is seated against the first rigid load-retention panel and the first anchor rod for securing the flexible sheet to the rigid load-retention panel.

10. The method of claim 9 further comprising a step (a) after step (iii) and before step (iv); wherein the step (a) comprises:
extending the proximal portion of the flexible sheet through the slot from a second side thereof and between the rigid load-retention panel and the securing rod, the second side opposite to the first side.

11. The method of claim 9, wherein the first side is a top side of the slot or a bottom side of the slot.

12. The method of claim 9 further comprising:
extending the proximal end of the flexible sheet along the first rigid load-retention panel or away from the first rigid load-retention panel.

13. A retaining-wall panel system comprising:
a first rigid load-retention panel, the first rigid load-retention panel comprising a first anchor rod coupled to a load-bearing side thereof and forming a first slot therebetween; and
a first securing rod having a diameter greater than or equal to a width of the first slot for seating against and pressurized contacting with the first rigid load-retention panel and the first anchor rod on a first side of the first slot for sandwiching therebetween a portion of a first section of a flexible sheet at least partially wrapping about the first anchor rod and the first securing rod on opposite sides thereof, the first section of the flexible sheet having a proximal end and a distal end.

14. The retaining-wall panel system of claim 13, wherein the flexible sheet further wraps about a combination of the first anchor rod, the first securing rod, and the first section of the flexible sheet with the proximal and distal ends thereof extending through the first slot from the first side thereof and out of the first slot from a second side thereof opposite to the first side of the first slot.

15. The retaining-wall panel system of claim 13, wherein the first side of the first slot is a top side of the first slot or a bottom side of the first slot.

16. The retaining-wall panel system of claim 13, wherein the proximal end of the flexible sheet is extendible along the first rigid load-retention panel or is extendible away from the first rigid load-retention panel into and within the landfilling material.

17. The retaining-wall panel system of claim 13, wherein the flexible sheet comprises at least one geotextile sheet made of a geosynthetic material.

18. The retaining-wall panel system of claim 13, wherein the first anchor rod comprises a main anchor-rod section extending along the first slot and a pair of leg sections integrated with the main anchor-rod section and extending into the first rigid load-retention panel.

19. The retaining-wall panel system of claim 13 further comprising a second anchor rod coupled to an anchor on the load-bearing side of the first rigid load-retention panel and at a distance thereto, the second anchor rod and the anchor forming a second slot; and
a second securing rod having a diameter greater than or equal to a width of the second slot for seating against and pressurized contacting with the second anchor rod on a first side of the second slot sandwiching therebetween a portion of a second section of the flexible sheet at least partially wrapping about the second anchor rod and the second securing rod on opposite sides thereof.

20. The retaining-wall panel system of claim 19, wherein the anchor is earth, rock, or a second rigid load-retention panel.

* * * * *